United States Patent [19]
Tanizawa et al.

[11] Patent Number: 6,068,575
[45] Date of Patent: May 30, 2000

[54] CONTROL APPARATUS FOR HYDRAULICALLY OPERATED VEHICULAR TRANSMISSION

[75] Inventors: Shoichi Tanizawa; Shinichi Nishio; Takehiro Katakura; Kazuo Okada; Tatsuyuki Ohashi; Kouji Shibuya; Norio Nakauchi; Osahide Miyamoto; Akio Tsuura, all of Saitama-ken, Japan

[73] Assignee: Honda Giken Kogyo Kabushiki Kaisha, Tokyo, Japan

[21] Appl. No.: 08/935,941

[22] Filed: Sep. 23, 1997

[30] Foreign Application Priority Data

Sep. 25, 1996 [JP] Japan .................................. 8-253628
Sep. 25, 1996 [JP] Japan .................................. 8-253632
Sep. 25, 1996 [JP] Japan .................................. 8-253633

[51] Int. Cl.⁷ .................................................. F16H 61/08
[52] U.S. Cl. ......................... 477/144; 477/139; 477/141
[58] Field of Search .................................. 477/133, 136, 477/139, 141, 144, 148, 154

[56] References Cited

U.S. PATENT DOCUMENTS

| 4,563,917 | 1/1986 | Higashi et al. | 477/133 |
| 4,569,253 | 2/1986 | Higashi et al. | 477/133 |
| 4,688,452 | 8/1987 | Aoyama et al. | 477/136 |
| 5,168,777 | 12/1992 | Isono et al. | 477/154 X |
| 5,188,006 | 2/1993 | Goto et al. | |
| 5,339,709 | 8/1994 | Suzuki et al. | 477/145 |
| 5,431,604 | 7/1995 | Marusue et al. | 477/143 X |
| 5,460,583 | 10/1995 | Kitada et al. | 477/148 X |
| 5,624,351 | 4/1997 | Fujita et al. | 477/148 |
| 5,647,819 | 7/1997 | Fujita et al. | 477/143 |
| 5,810,693 | 9/1998 | Nakayama et al. | 477/148 X |
| 5,848,951 | 12/1998 | Lee | 477/133 |
| 5,863,276 | 1/1999 | Lee | 477/144 |

FOREIGN PATENT DOCUMENTS

| 0 322 111 A2 | 6/1989 | European Pat. Off. . |
| 0 354 493 A2 | 2/1990 | European Pat. Off. . |
| 0 498 480 A1 | 8/1992 | European Pat. Off. . |
| 0 633 410 A1 | 1/1995 | European Pat. Off. . |
| 44 05 806 A1 | 8/1995 | Germany . |
| 44 24 456 A1 | 1/1996 | Germany . |
| 62-247931 | 10/1987 | Japan . |
| 63-6260 | 1/1988 | Japan . |
| 63-74732 | 4/1988 | Japan . |
| 2-163563 | 6/1990 | Japan . |
| 2-203067 | 8/1990 | Japan . |
| 4-365645 | 12/1992 | Japan . |
| 6-272744 | 9/1994 | Japan . |

Primary Examiner—Charles A. Marmor
Assistant Examiner—Scott Lund
Attorney, Agent, or Firm—Armstrong, Westerman, Hattori, McLeland & Naughton

[57] ABSTRACT

At downshifting, hydraulic pressure of hydraulic clutch on engaging side (ON clutch pressure) is increased when an input and output speed ratio ("Gratio") has fallen below a predetermined value YGDNS. YGDNS is variably set depending on the vehicle speed and the engine temperature so that it becomes a lower value at a high vehicle speed than at a low vehicle speed, and a higher value at a low engine temperature than at a high temperature. When a downshifting command to a still lower speed stage is issued during downshifting control (when FTBD=1), a downshifting completion processing is performed in the course of the downshifting control (step in S111). Oil pressure in a hydraulic engaging element on the disengaging side QDNOFF and oil pressure in a hydraulic engaging element on the engaging side QDNON are switched to the oil pressures at the time of completion of downshifting, to thereby complete the first step downshifting control at an early time. In order to prevent unnecessary speed changing at the time of tire locking, downshifting is prohibited when deceleration of the vehicle speed has exceeded a predetermined value (when a setting of FLOCK=1 is made).

5 Claims, 29 Drawing Sheets

FIG. 5 A

| MAT | | CONTROL MODE |
|---|---|---|
| Hi | Lo | |
| A | 0 | 1ST SOLENOID PROPORTIONAL VALVE $17_1$ HIGH<br>2ND SOLENOID PROPORTIONAL VALVE $17_2$ LOW |
| 0 | B | 1ST SOLENOID PROPORTIONAL VALVE $17_1$ LOW<br>2ND SOLENOID PROPORTIONAL VALVE $17_2$ HIGH |
| A | B | UNDER SHIFT CHANGING |
| 2 | 0 | IN-GEAR RESPONSE PRESSURE MODE |
| 4 | 0 | IN-GEAR ADDITION MODE |
| 6 | 0 | IN-GEAR END MODE |

FIG. 5 B

| MUP | | CONTROL MODE |
|---|---|---|
| ON | OFF | |
| 0 | 0 | OTHER THAN UPSHIFTING |
| 1 | — | RESPONSE PRESSURE MODE |
| 2 | — | ADDITION MODE (FORMER) |
| 3 | — | ADDITION MODE (LATTER) |
| 4 | — | BOTTOM UP MODE (FORMER) |
| 5 | — | BOTTOM UP MODE (LATTER) |
| 7 | — | END MODE |
| — | 1 | INITIAL PRESSURE MODE |
| — | 2 | SUBTRACTION MODE (FORMER) |
| — | 3 | SUBTRACTION MODE (LATTER) |
| — | 4 | BOTTOM DOWN MODE |
| — | 5 | TAIL MODE |
| — | 7 | END MODE |

FIG. 5C

| MDN  |      | CONTROL MODE |
|------|------|--------------|
| ON   | OFF  |              |
| 0    | 0    | OTHER THAN DOWNSHIFTING |
| 1    | —    | RESPONSE PRESSURE MODE |
| 2    | —    | LOW PRESSURE CORRECTION MODE |
| 3    | —    | SYNCHRONOUS MODE |
| 4    | —    | END MODE |
| —    | 1    | INITIAL PRESSURE MODE |
| —    | 2    | LOW PRESSURE HOLDING MODE |
| —    | 3    | TAIL MODE |
| —    | 4    | END MODE |

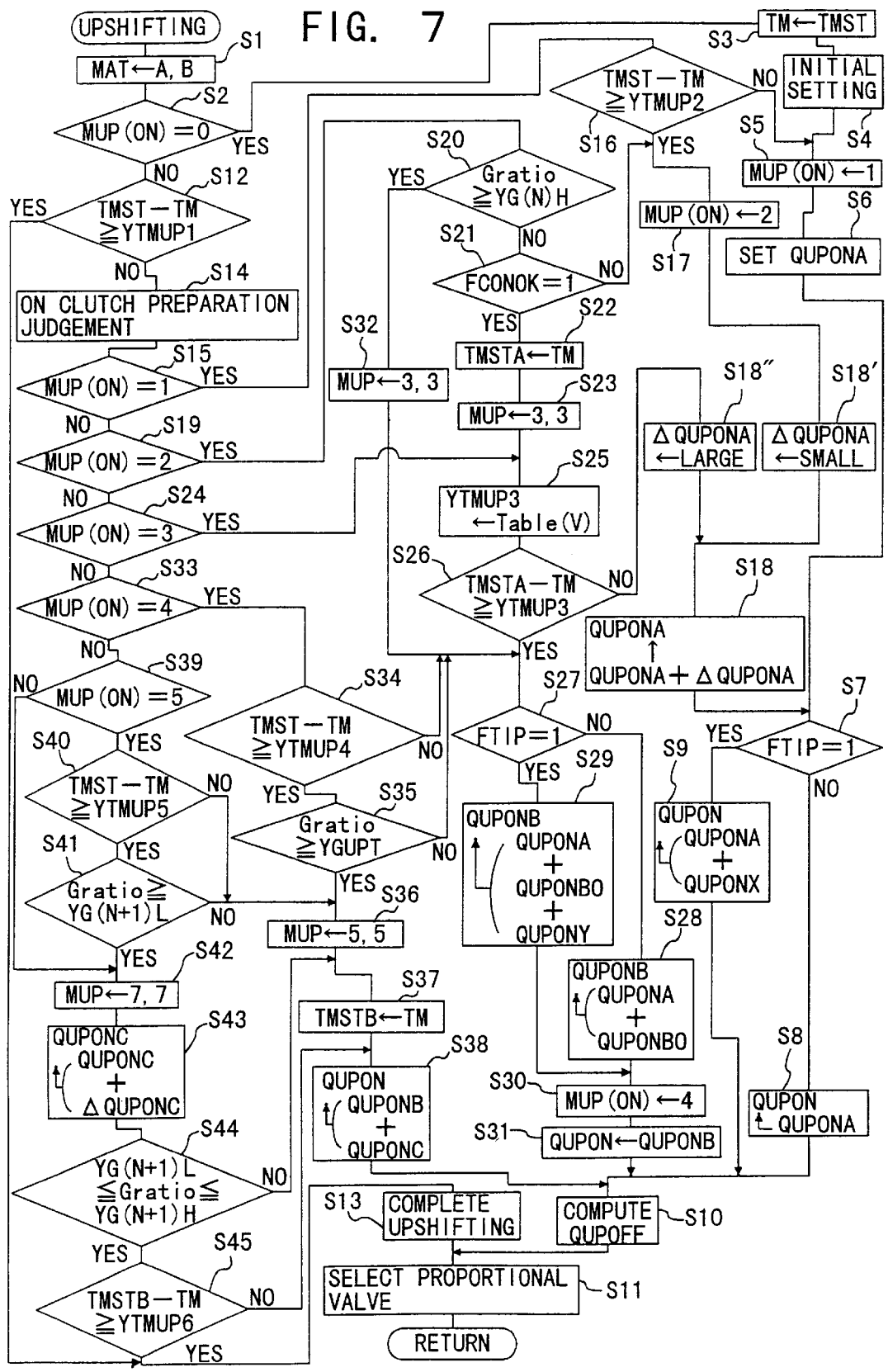

CONTROL APPARATUS FOR HYDRAULICALLY OPERATED VEHICULAR TRANSMISSION

BACKGROUND OF THE INVENTION

1. Field of the Invention

The present invention relates to a control apparatus for a hydraulically operated vehicular transmission having a plurality of transmission trains to be established by a selecting operation of a plurality of hydraulic engaging elements. In this specification, the term "vehicular transmission" means a transmission for a vehicle such as a motor vehicle.

2. Description of the Related Art

As this kind of control apparatus, there has hitherto been known the following one. Namely, the hydraulic pressure of a hydraulic engaging element on disengaging side to be disengaged at the time of speed changing (disengaging pressure) and the hydraulic pressure of a hydraulic engaging element on engaging side to be engaged at the time of speed changing (engaging pressure) are electronically controlled by using solenoid proportional valves. An input and output speed ratio (rotational speed of output shaft/rotational speed of input shaft) of a transmission is detected. The state of development of speed changing is discriminated by the input and output speed ratio. The disengaging pressure and the engaging pressure are thereby controlled.

In this kind of apparatus, there is also known an apparatus in which, at the time of downshifting, the disengaging pressure is first lowered to cause the engine to race by the slipping of the hydraulic engaging element on the disengaging side. When the input and output speed ratio has fallen below a predetermined value by the lowering thereof due to the racing of the engine, the engaging pressure is boosted or increased.

In order to perform the downshifting smoothly, it is necessary to engage the hydraulic engaging element on the engaging side when the input and output speed ratio of the transmission has lowered into a predetermined synchronous region which is set based on the gear ratio of the speed stage which is established by the engagement of the hydraulic engaging element on the engaging side. However, it takes time, though small in amount, for the hydraulic pressure of the hydraulic engaging element on the engaging side to actually rise since a boosting command of the engaging pressure has been issued. To allow for this response delay, it has conventionally been arranged to set the above-described predetermined value to a value higher than the synchronous region to thereby boost the engaging pressure before the input and output speed ratio lowers into the synchronous region.

The above-described response delay becomes short in a high vehicle speed and long in a low vehicle speed due to the influence of the centrifugal force. However, the change in response delay with the vehicle speed is not conventionally taken into consideration. As a result, the hydraulic engaging element on the engaging side is sometimes engaged behind the synchronous point of time at a high vehicle speed or engaged before the synchronous point of time at a low vehicle speed. Shocks are thus likely to occur.

Further, when the engine temperature is low, a fast idle operation is performed and, therefore, the engine output becomes large. If the engine output is large, the rate of increase in the rotational speed of the input shaft becomes large when slipping occurs to the hydraulic engaging element on the disengaging side, resulting in a rapid decrease in the input and output speed ratio. As a consequence, when the engine temperature is low, the decrease in the input and output speed ratio becomes rapid. In the conventional system, however, no consideration is taken of the change in the decrease speed in the input and output speed ratio due to the engine temperature. Therefore, at the time of low temperature, the hydraulic engaging element on the engaging side is engaged behind the synchronous point of time, and shocks are likely to occur.

In view of the above point, the present invention has a first object of providing a control apparatus in which the hydraulic engaging element on the engaging side is engaged at the synchronous point of time so that smooth downshifting can be performed.

Further, as a control apparatus for a hydraulically operated vehicular transmission, there is conventionally known one having means for controlling stepwise speed changing for downshifting one stage at a time such that during downshifting control to one speed stage which is a stage lower, upon receipt of a downshifting command to another speed stage which is a stage lower than said one speed stage, a start of downshifting control to said another speed stage is delayed until the downshifting control to said one speed stage is completed.

In this kind of control system for stepwise speed changing, downshifting to a two-stage lower speed stage which is required by the driver of the vehicle, e.g., from the fourth speed stage to the second speed stage, is performed in two downshifting operations of fourth speed→to third speed and third speed→second speed. It has therefore an advantage in that the shocks can be reduced and the control system can be simplified.

On the other hand, since the downshifting is performed one step at a time, a longer time is required than the one in which downshifting is made directly to the two-stage lower speed stage. This conventional system sometimes causes the driver to feel that the time lag for switching the driving force is large.

In view of the above point, the present invention has a second object of shortening the time of downshifting in a control system for stepwise speed changing.

SUMMARY OF THE INVENTION

In order to attain the above-described first object, according to a first aspect of the present invention, there is provided a control apparatus for a hydraulically operated vehicular transmission having a plurality of speed stages to be established by a selective operation of a plurality of hydraulic engaging elements comprising: detecting means for detecting an input and output speed ratio of the transmission; and boosting means for boosting a hydraulic pressure of a hydraulic engaging element on engaging side to be engaged at the time of downshifting, the boosting being made when the input and output speed ratio has fallen below a predetermined value during downshifting; characterized in: that means is provided for variably setting the predetermined value so as to become a lower value with an increase in a vehicle speed. Or else, there is provided means for variably setting the predetermined value so as to become a lower value with an increase in an engine temperature. Or else, there may be provided both means for variably setting the predetermined value so as to become a lower value with an increase in the vehicle speed and means for variably setting the predetermined value so as to become a lower value with an increase in the engine temperature.

According to the above-described arrangement, even if the response delay in boosting the pressure of the hydraulic engaging element on the engaging side varies with the vehicle speed, this change can be canceled by variably setting the above-described predetermined value depending on the vehicle speed. In this manner, the hydraulic engaging element on the engaging side can be engaged at the synchronous point of time regardless of the vehicle speed. In addition, at the time of low engine temperature in which the input and output speed ratio decreases relatively rapidly, the above-described predetermined value is set relatively high. Therefore, the boosting of the hydraulic engaging element on the engaging side is started at an early time. Therefore, the hydraulic engaging element can be engaged at the synchronous point of time.

In the embodiment to be described hereinafter, what corresponds to the boosting means is the processing in step S120 through S127 in FIG. 12. What corresponds to the means for variably setting the predetermined value is step S104' in FIG. 12. YGDNS corresponds to the above-described predetermined value. What corresponds to the above-described detecting means is speed sensors 23, 24 and an electronic control circuit 20.

Further, in order to attain the above-described second object, according to another aspect of the present invention, there is provided a control apparatus for a hydraulically operated vehicular transmission having a plurality of speed stages to be established by a selective operation of a plurality of hydraulic engaging elements, comprising: means for controlling stepwise speed changing for downshifting one stage at a time such that during downshifting control to one speed stage which is one stage lower, upon receipt of a downshifting command to another speed stage which is one stage lower than said one speed stage, a start of downshifting control to said another speed stage is delayed until the downshifting control to said one speed stage is completed; characterized in that: there is provided means for switching a control mode which performs a control to accelerate the time of completion of the downshifting control to said one speed stage, the control being made upon receipt of that downshifting command to said another speed stage which is issued during the downshifting control to said one speed stage.

According to this arrangement, since the downshifting to the above-described one speed stage is completed at an early time, the time required to complete the downshifting to said another speed stage can be shortened.

In order to accelerate the time of completion of downshifting control to said one speed stage, the speed of reducing the hydraulic pressure in that hydraulic engaging element on the disengaging side which is disengaged at the time of downshifting to said one speed stage (disengaging pressure) and the speed of boosting the hydraulic pressure in that hydraulic engaging element on the engaging side which is engaged at the time of downshifting to said one speed stage (engaging pressure) may be accelerated (or made large). However, if there is performed a control of switching, in the course of downshifting control, the disengaging pressure and the engaging pressure to those values at the time of completion of downshifting, the time of completion of the downshifting control can advantageously be accelerated to the best extent possible. However, if this kind of control of switching the hydraulic pressure at an initial stage of downshifting to said one speed stage, the input and output speed ratio of the transmission rapidly changes from the value before the downshifting to the value after the downshifting, resulting in a large shock. Therefore, it is preferable to provide delay means for delaying the control of switching the hydraulic pressure by the means for switching the control mode, until an input and output speed ratio of the transmission changes to a predetermined value between a value before the downshifting to said one speed stage and a value after the downshifting, to thereby reduce the shocks. In this case, the discrimination as to whether the input and output speed ratio has changed to the predetermined values shall preferably be performed by actually detecting the input speed and the output speed. However, if the downshifting control is being performed normally, the speed changing progresses with the lapse of time, and the input and output speed ratio changes to the predetermined value at the lapse of a predetermined time. Therefore, a discrimination as to whether the input and output speed ratio has changed to a predetermined value or not may also be made based on the time of lapse from the start of downshifting.

In the embodiment to be described in detail hereinafter, what corresponds to the above-described means for controlling stepwise speed changing is the downshifting control shown in FIG. 12. What corresponds to the above-described means for switching the control mode are steps S126, S132, in which a checking is made of the value of a flag FTBD which is set to "1" when a downshifting command to said another speed stage G(N-2) is issued during the downshifting control to said one speed stage G(N-1) by the processing shown in FIG. 27, and S111 in FIG. 12. What corresponds to the above-described delay means is the processing in steps S120 through S126.

In the above-described control apparatus for a hydraulically operated vehicular transmission, it is so arranged that the speed stage to be established is determined based on the vehicle speed which is detected by a vehicle speed sensor. The vehicle sensor is constituted to detect the vehicle speed from the rotational speed of the wheels.

When a brake is applied on a low-$\mu$ road with a smaller coefficient of friction, tires are sometimes locked. In this case, though the vehicle speed actually decrease little or nothing, the vehicle speed to be detected by the vehicle speed sensor lowers down to zero. As a result, downshifting is once made to a low speed stage and an upshifting is made after recovery of the gripping force of the tires, resulting in an unnecessary speed changing.

Further, in a transmission having a manual speed change mode for performing speed changing of one stage at a time by an operation of a lever, the following arrangement is made. Namely, even if a high speed stage is being established in the manual speed change mode, a downshifting is automatically made to a low speed stage in preparation for re-starting when the vehicle speed becomes an extremely low speed. Therefore, also in the manual speed change mode, downshifting to a low speed stage is performed when tire locking has occurred. As a result, after the recovery of the gripping force of the tires, the driver is forced to perform an upshifting operation to a speed stage which suits the vehicle speed.

In order to prevent this kind of unnecessary speed changing at the time of tire locking, it is preferable to provide means for discriminating deceleration of a vehicle speed to be detected by a vehicle speed sensor, and means for prohibiting downshifting for a predetermined period of time after a discrimination has been made that the deceleration is above a predetermined value.

At the time of tire locking, the speed of the wheels, i.e., the vehicle speed to be detected by the vehicle speed sensor, lowers at a deceleration above a predetermined value. In this manner, according to the above-described arrangement, downshifting will no longer be performed at the time of tire locking. As a result, upshifting after the recovery of the gripping force of the tires will neither be performed any longer, thereby preventing unnecessary speed changing. Especially, in the manual speed change mode, it is advantageous because upshifting operation after the recovery of the gripping force of the tires is no longer forced on the driver. In the transmission having the manual speed change mode, it may be so arranged that downshifting is prohibited only at the time of manual speed change mode and that, in the automatic speed change mode, the prohibition of downshifting may be released.

It is when the vehicle is running at a speed above a certain value that the downshifting by the tire locking becomes the problem. When the tire locking has occurred while the vehicle is running at a low speed, it is desired to downshift right away so that engine braking can be applied. In this case, if the means for discriminating deceleration is constituted to measure a time required for the vehicle speed to lower from a first predetermined vehicle speed which is set relatively high to a second predetermined vehicle speed which is set relatively low, and to discriminate whether the deceleration of the vehicle is above the predetermined value or not based on this time, downshifting is not prohibited even if tire locking has occurred when the vehicle is running at a speed lower than the first predetermined vehicle speed. This will suit the above-described desire.

In the embodiment to be described hereinafter, what corresponds to the means for discriminating deceleration is steps S1001, S1002, S1004 and S1006 in FIG. 21B. YVH corresponds to the first predetermined vehicle speed and YVL corresponds to the second predetermined vehicle speed. What corresponds to the means for prohibiting downshifting is step S1005, S1007, S1008 and S1003 in FIG. 21B and step S404 in FIG. 19.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 5A–5C are diagrams to show the relationship among various monitor values to be used in speed change control and control mode;

FIG. 7 is a flow chart to show the control at the time of upshifting;

Figure 12:
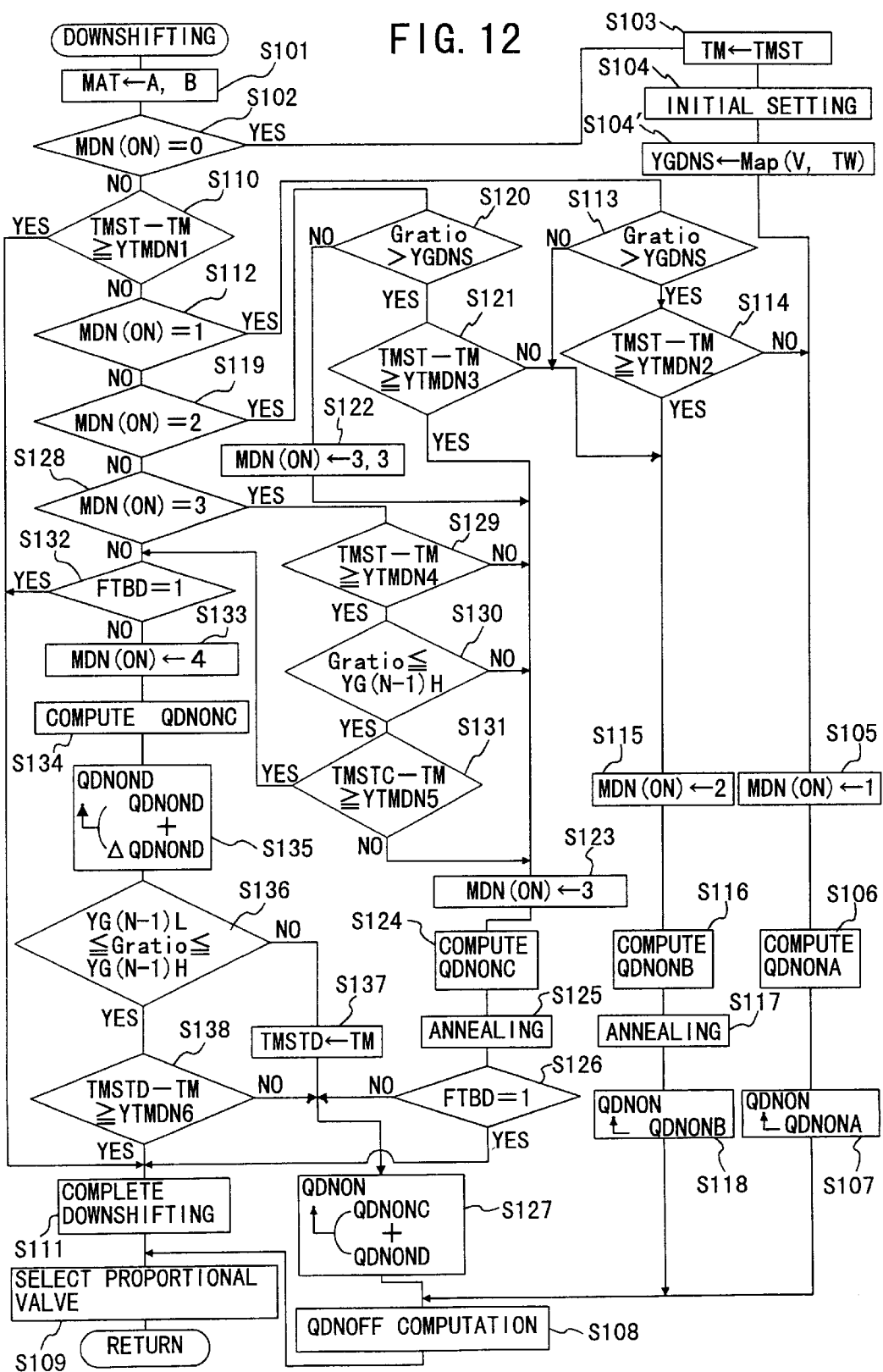
FIG. 12 is a flow chart to show the downshifting control.
Figure 14:
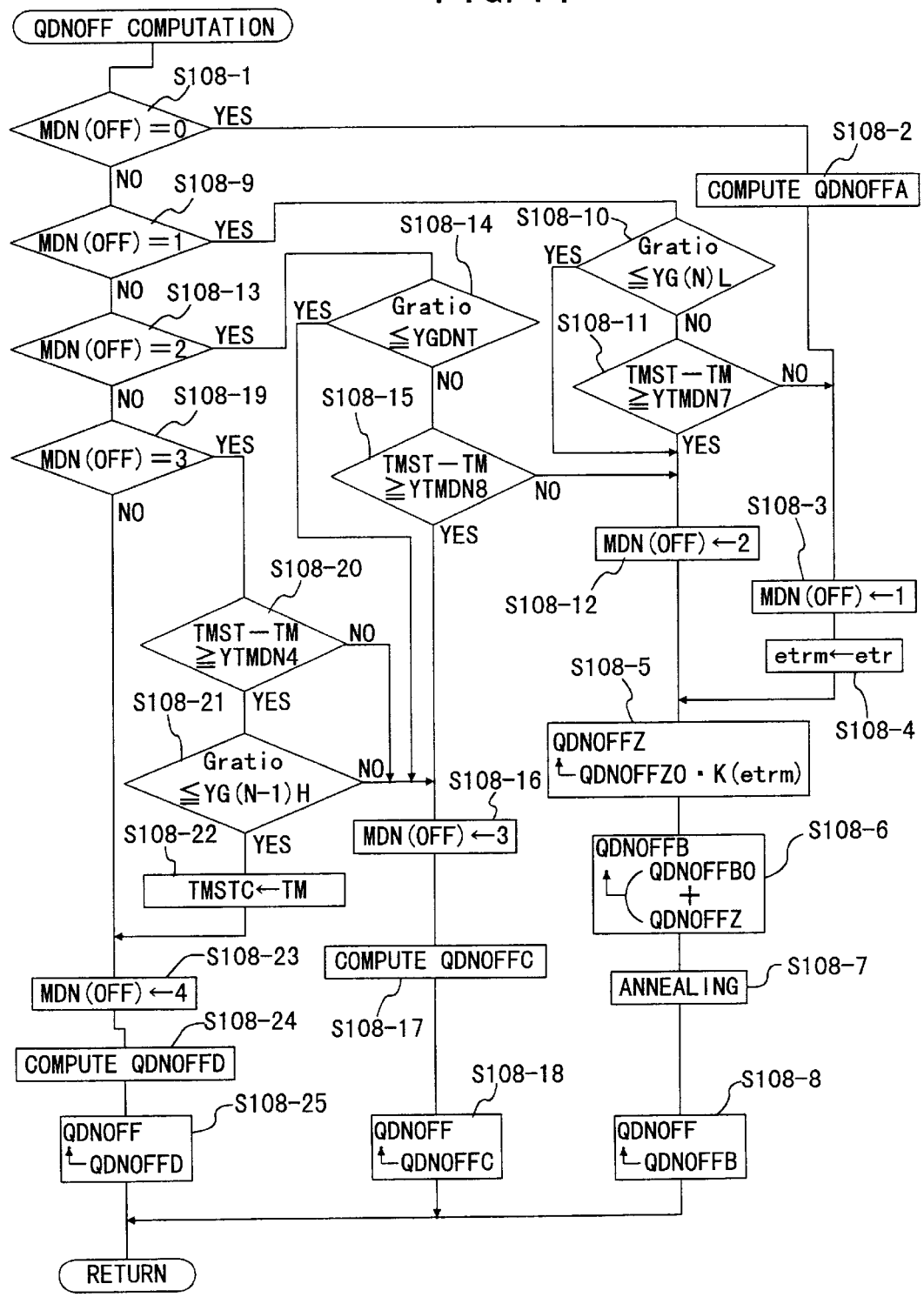
Figure 15:
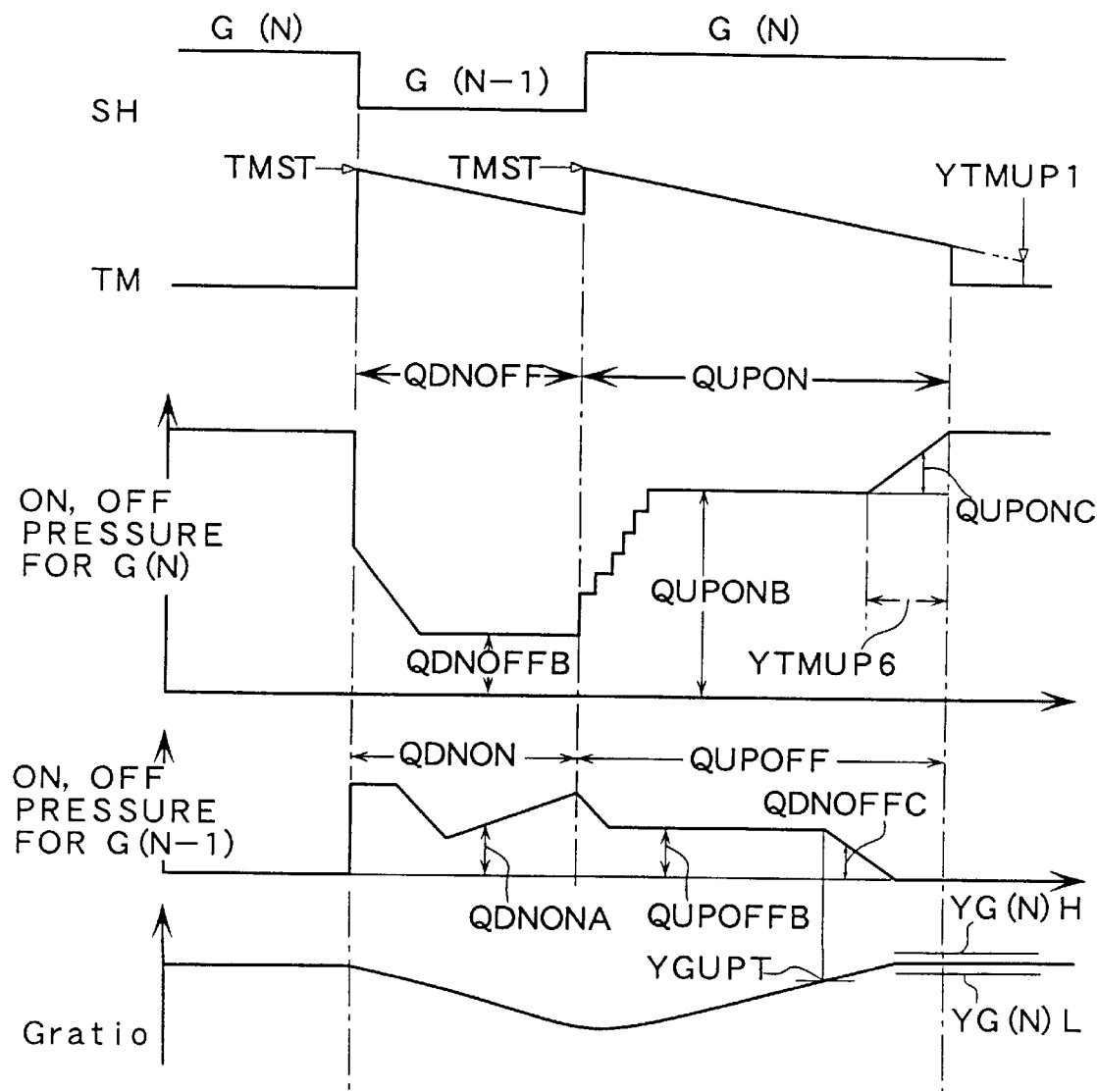
Figure 16:
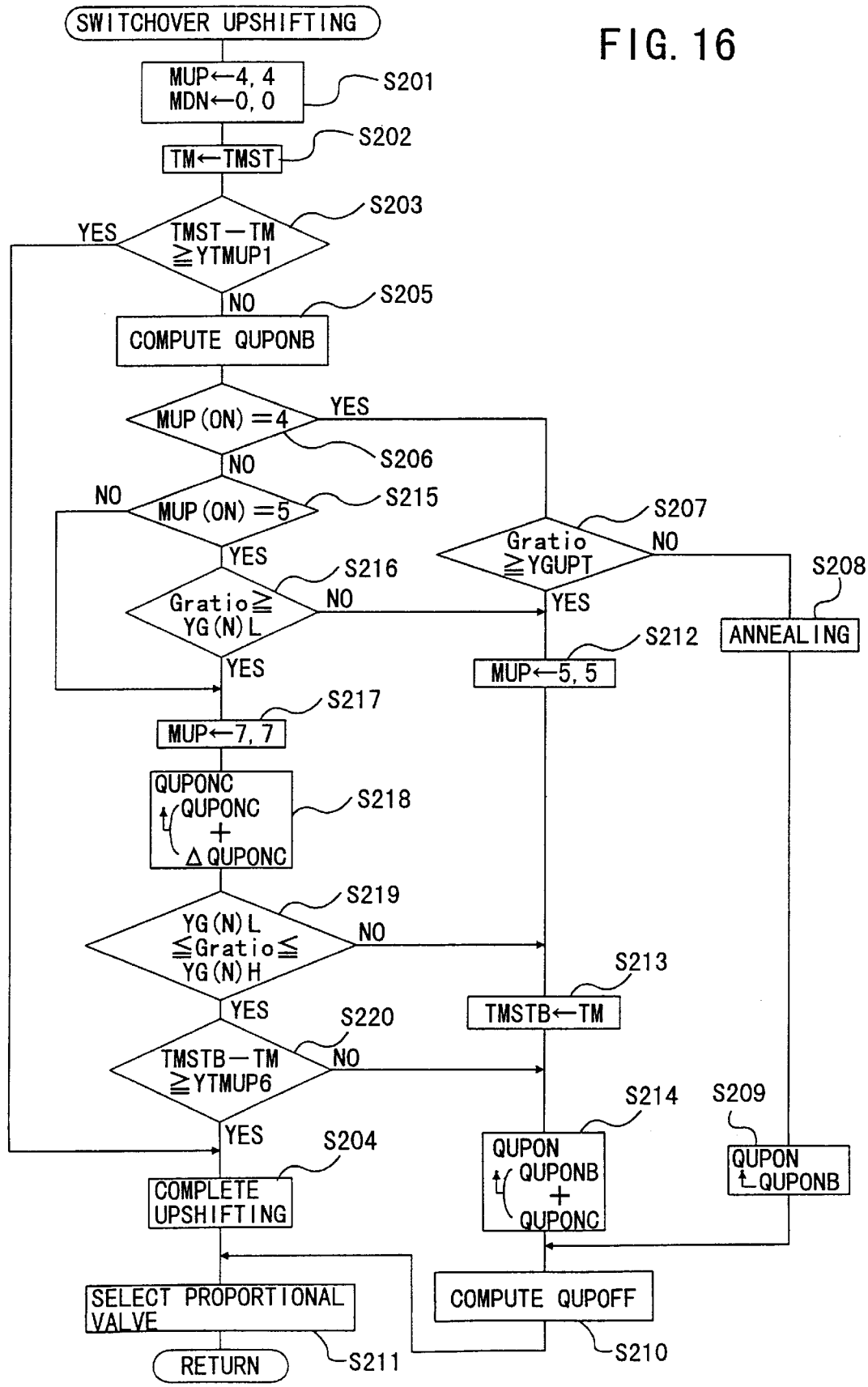
Figure 17:
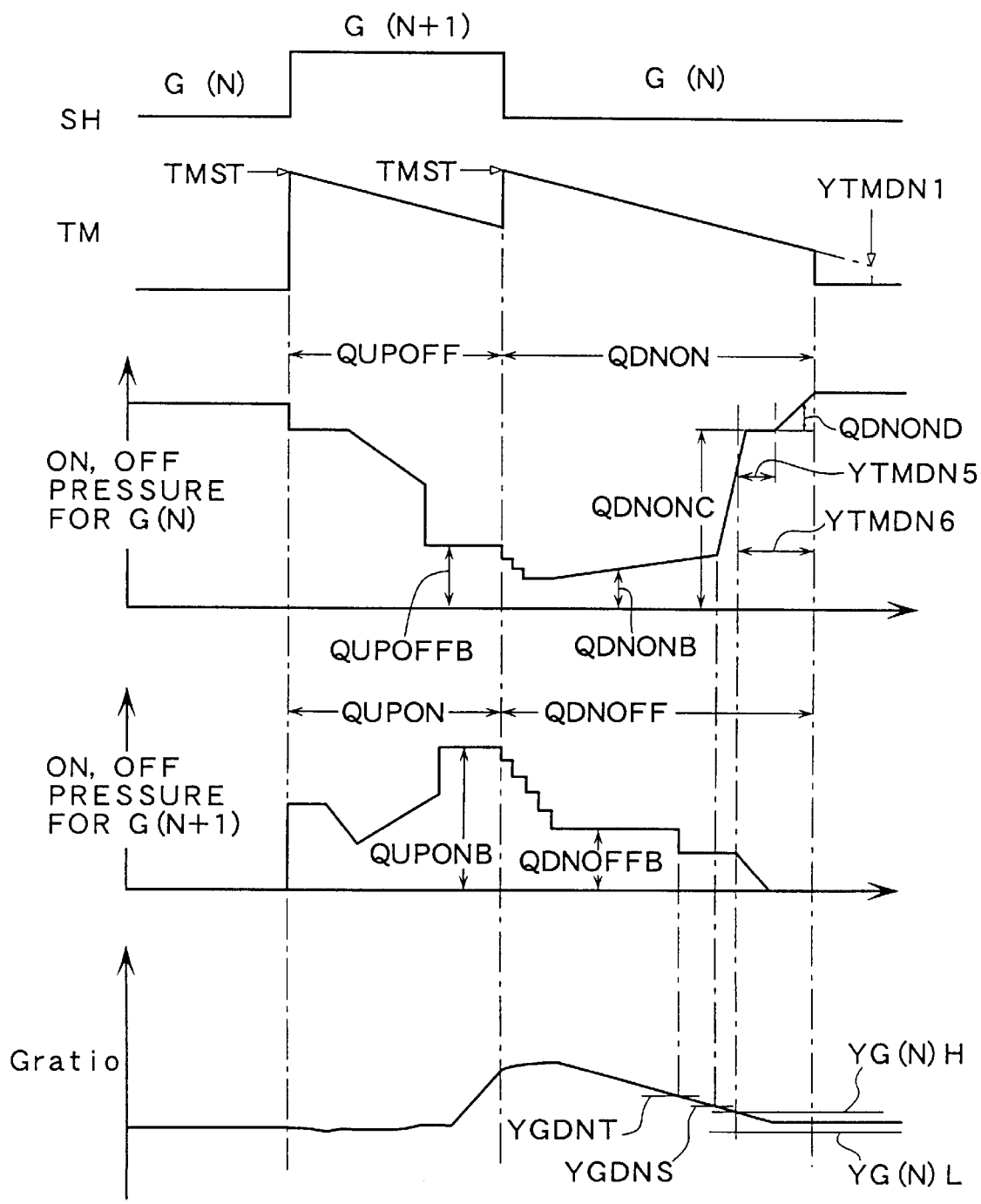
Figure 18:
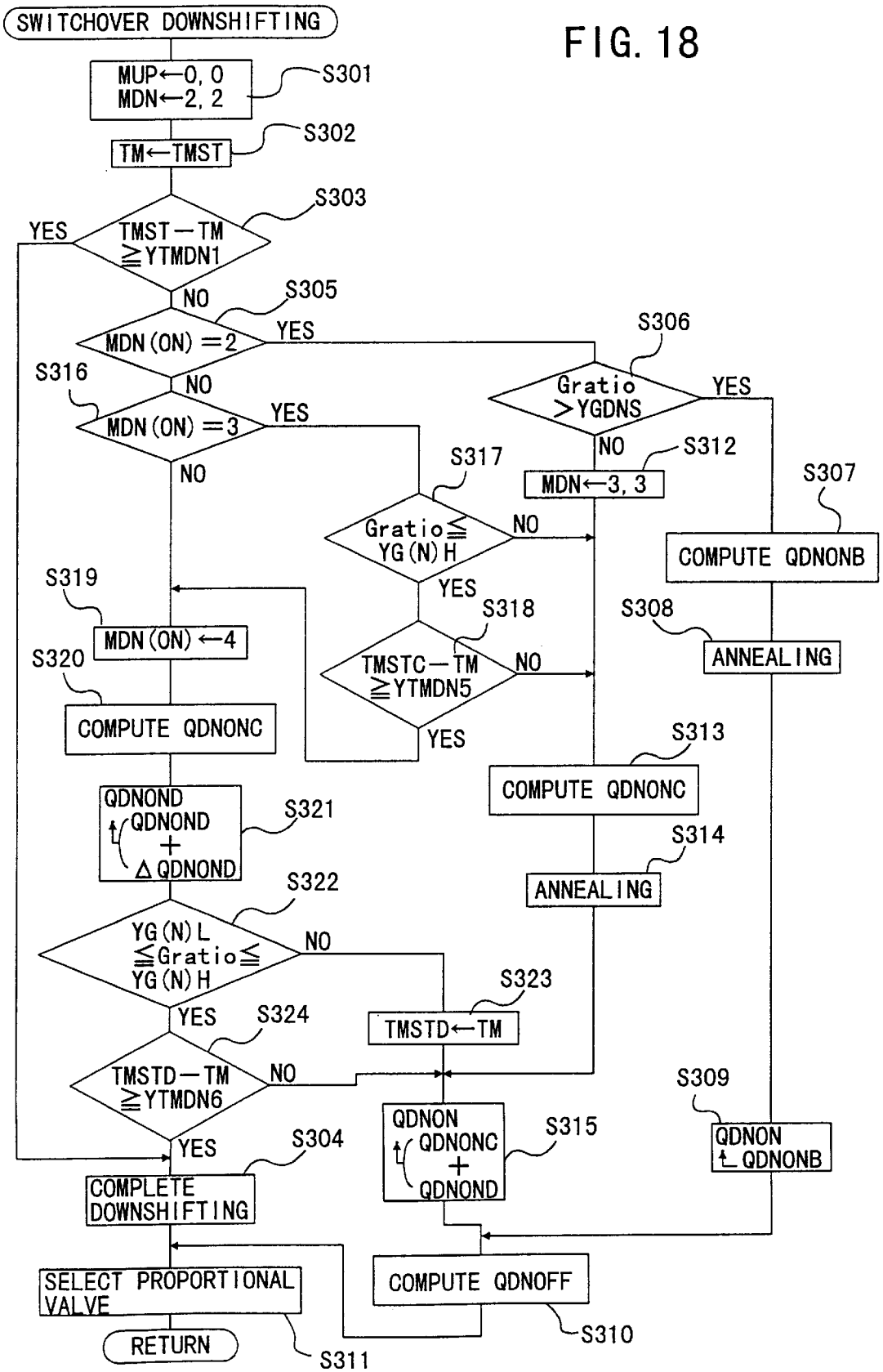
Figure 19:
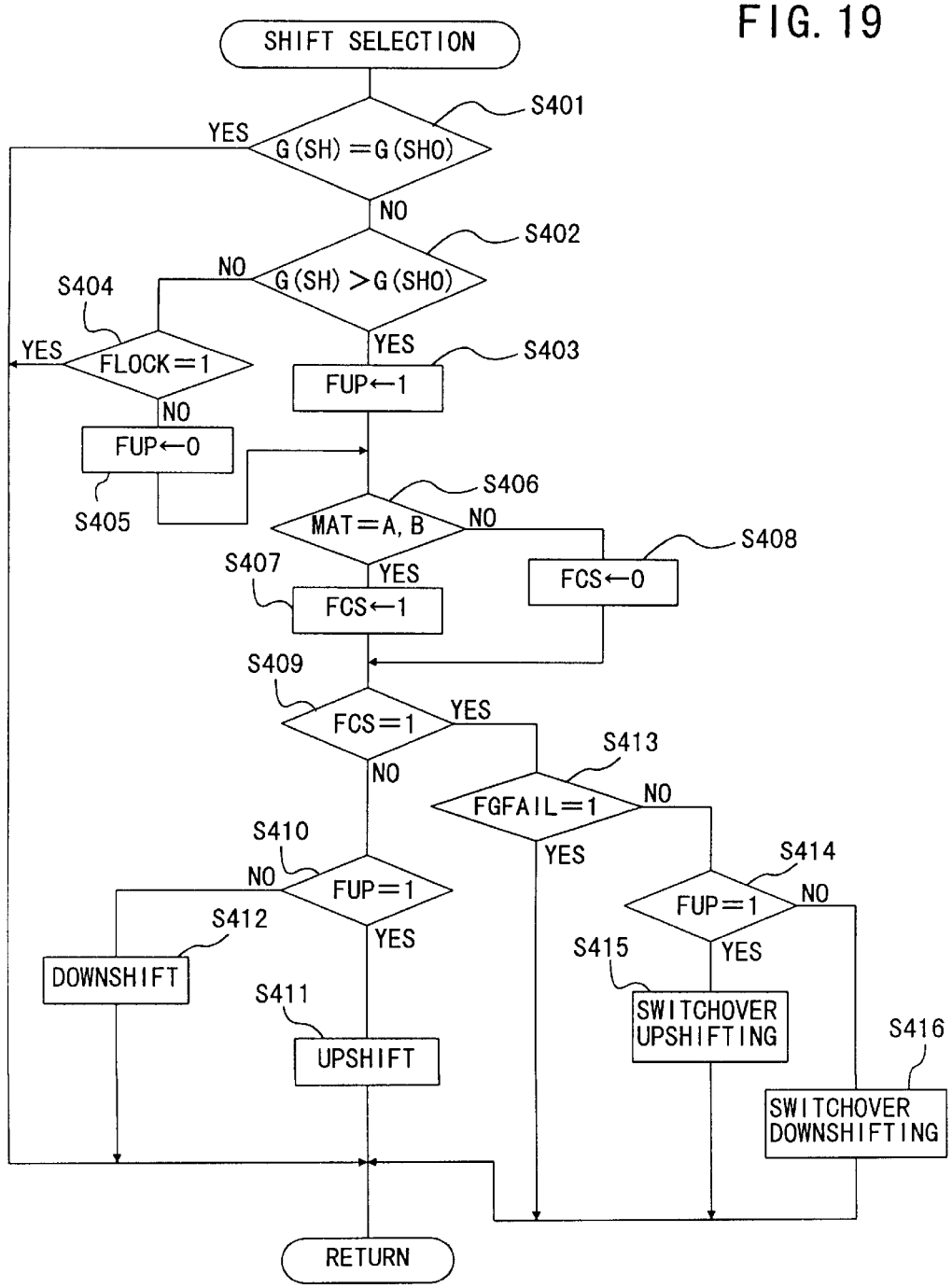
Figure 20A:
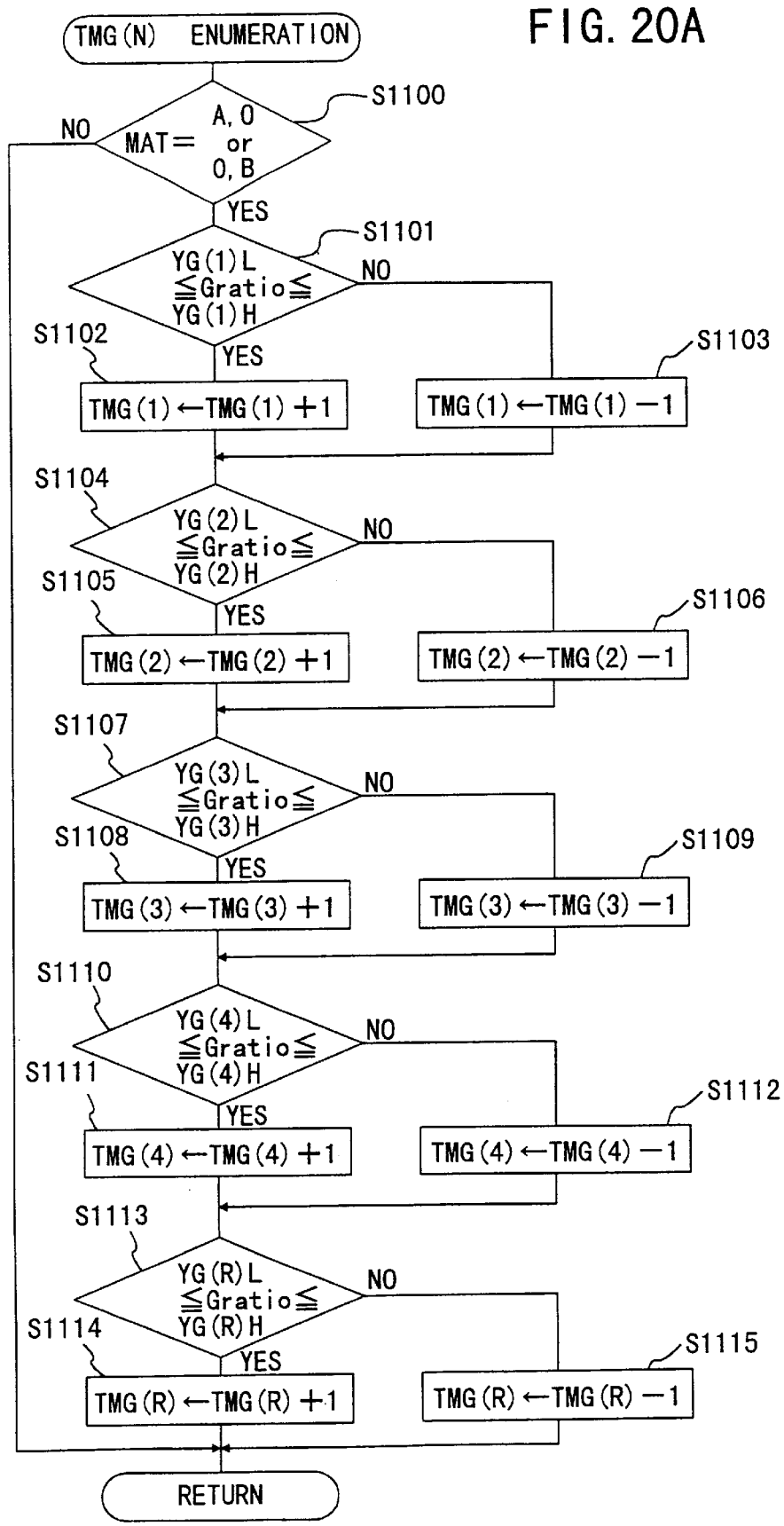
Figure 20B:
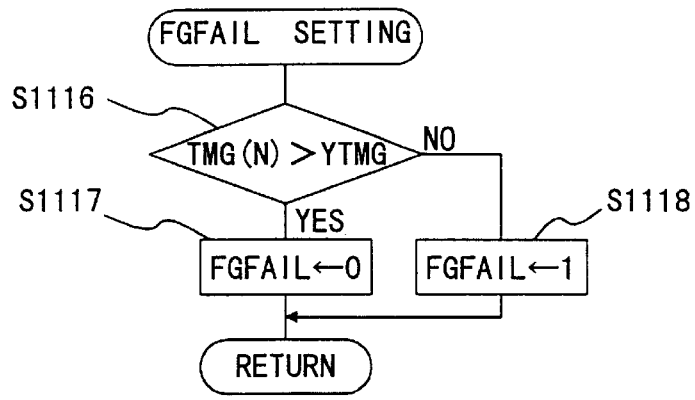
Figure 21B:
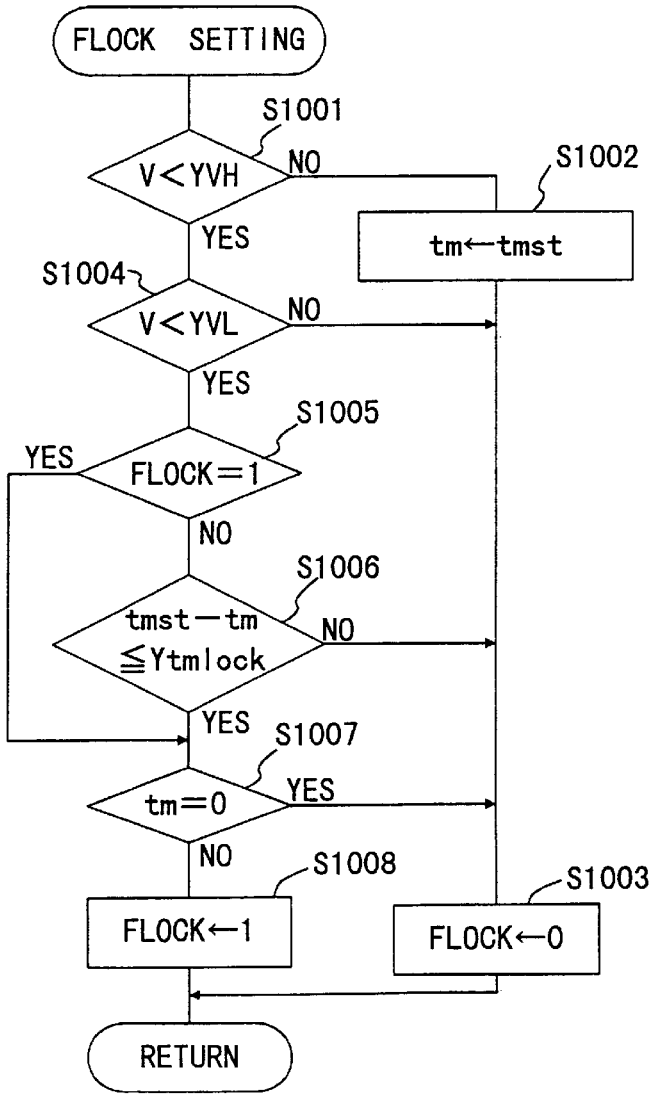
Figure 21A:
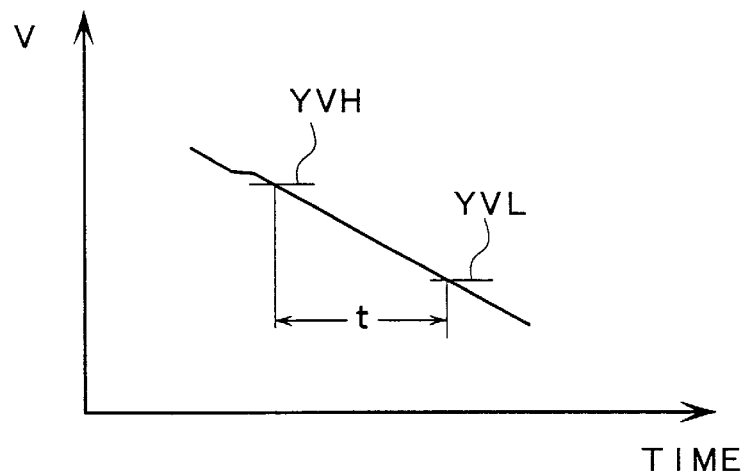
Figure 22:
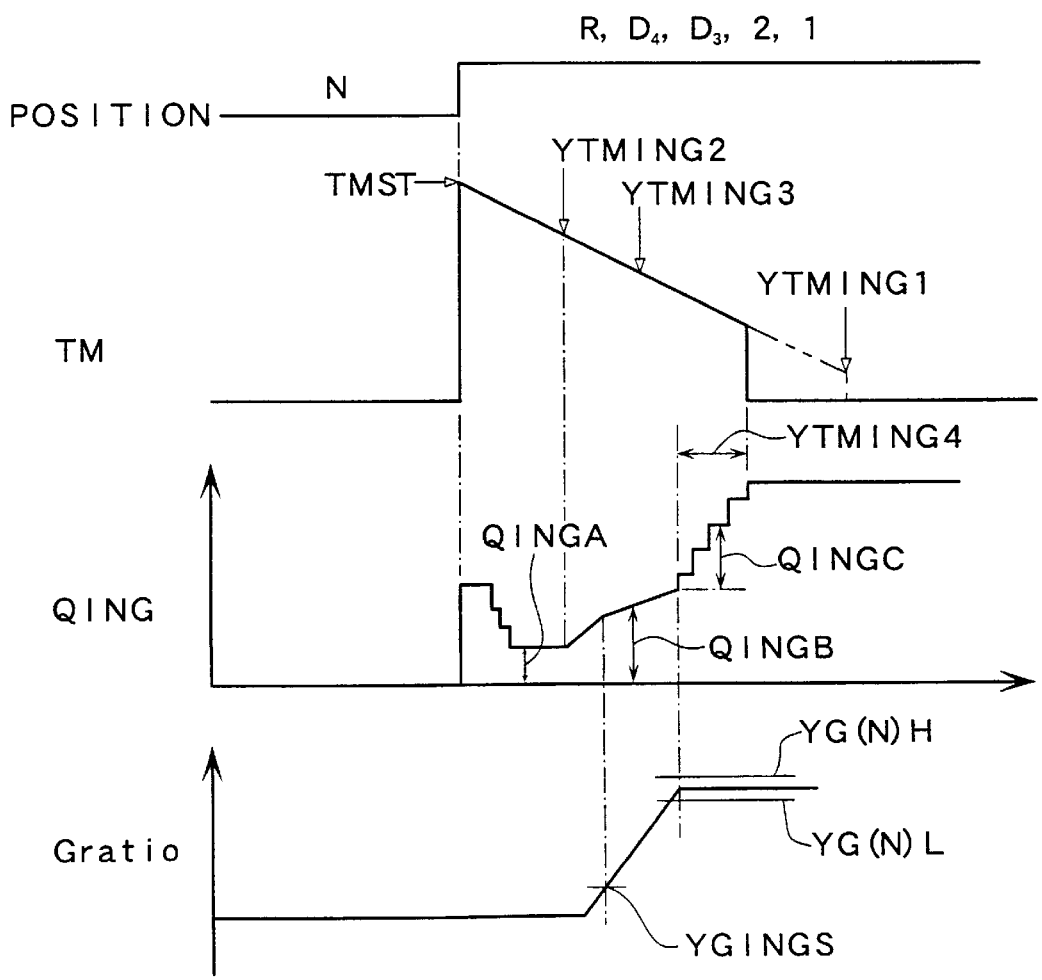
Figure 23:
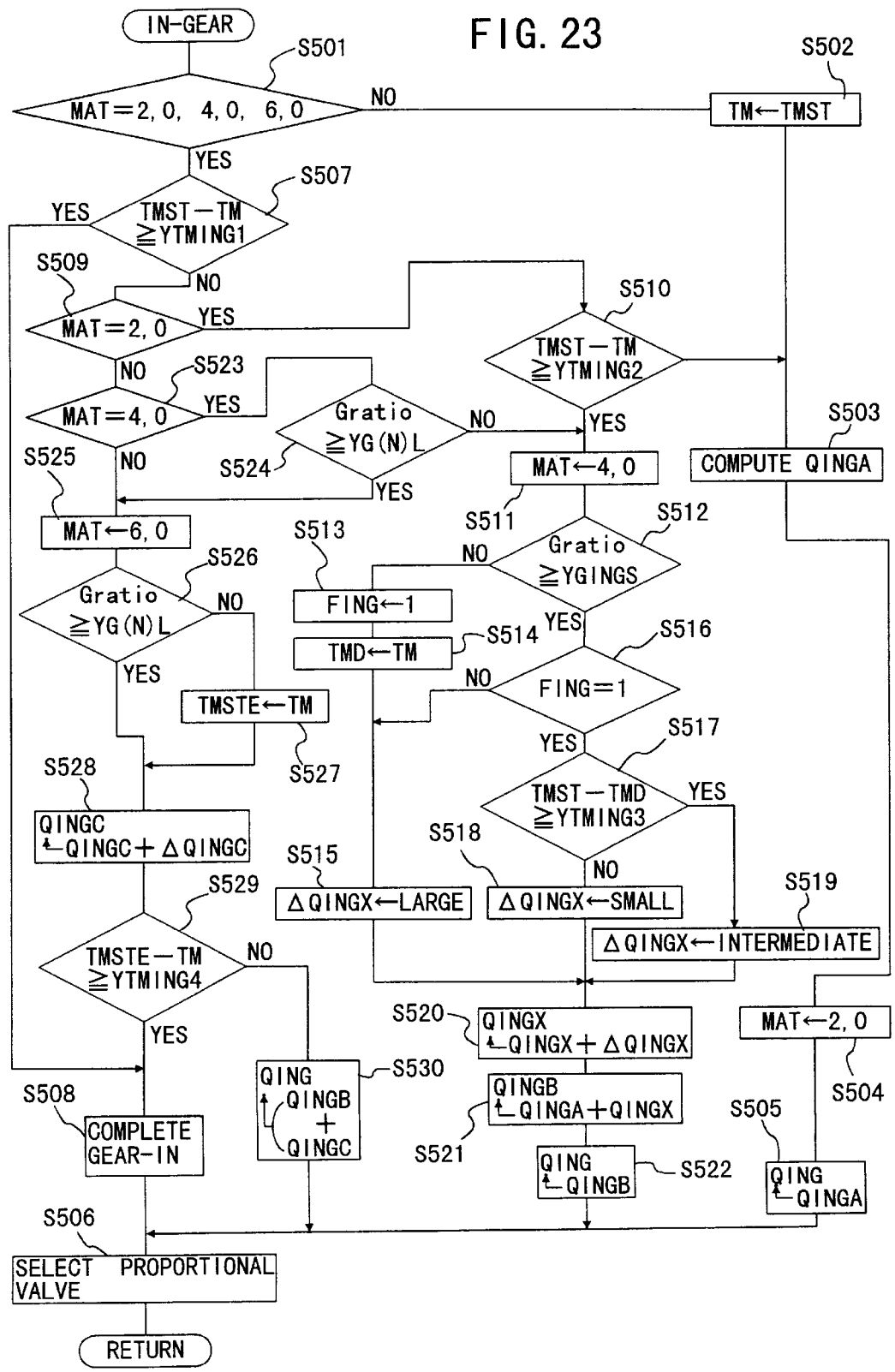
Figure 24:
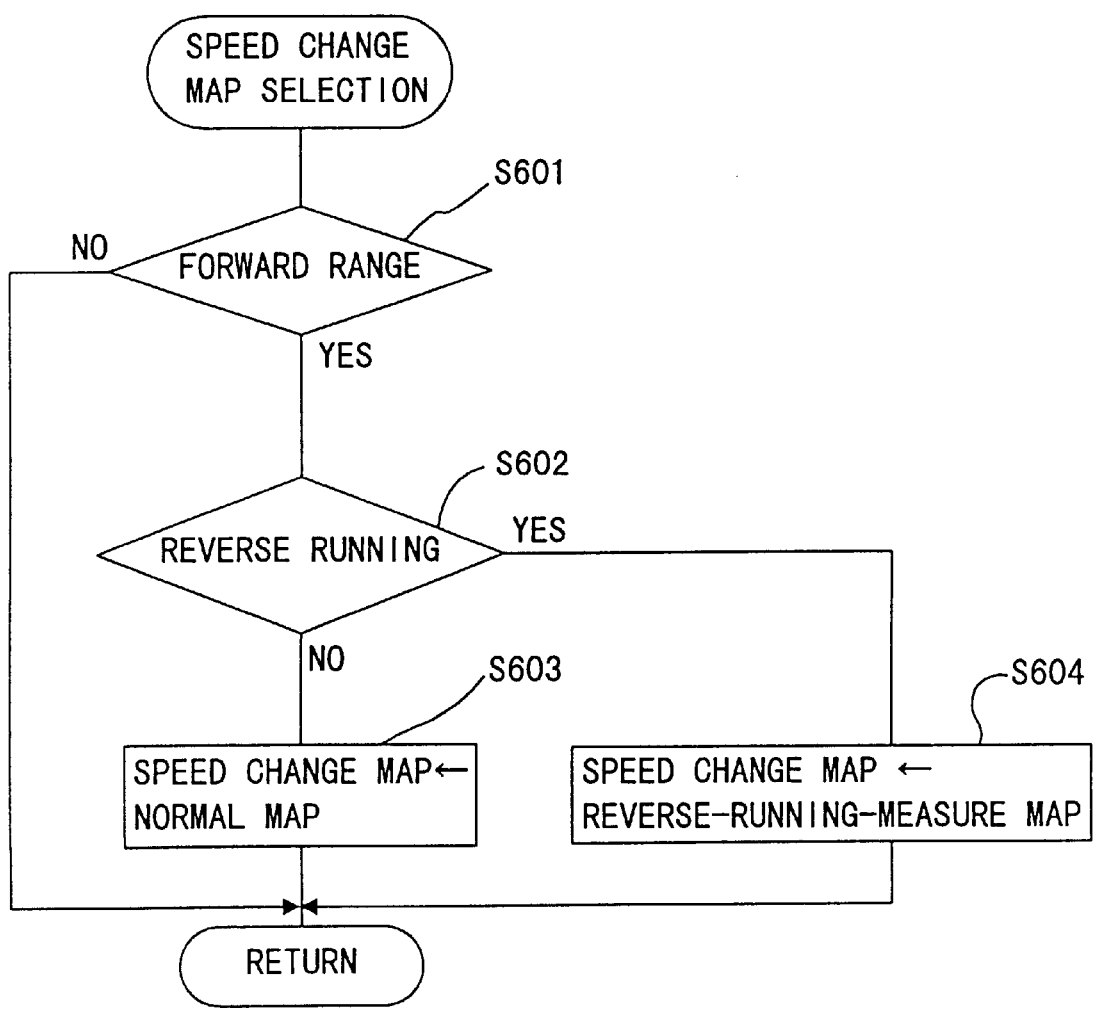
Figure 25A:
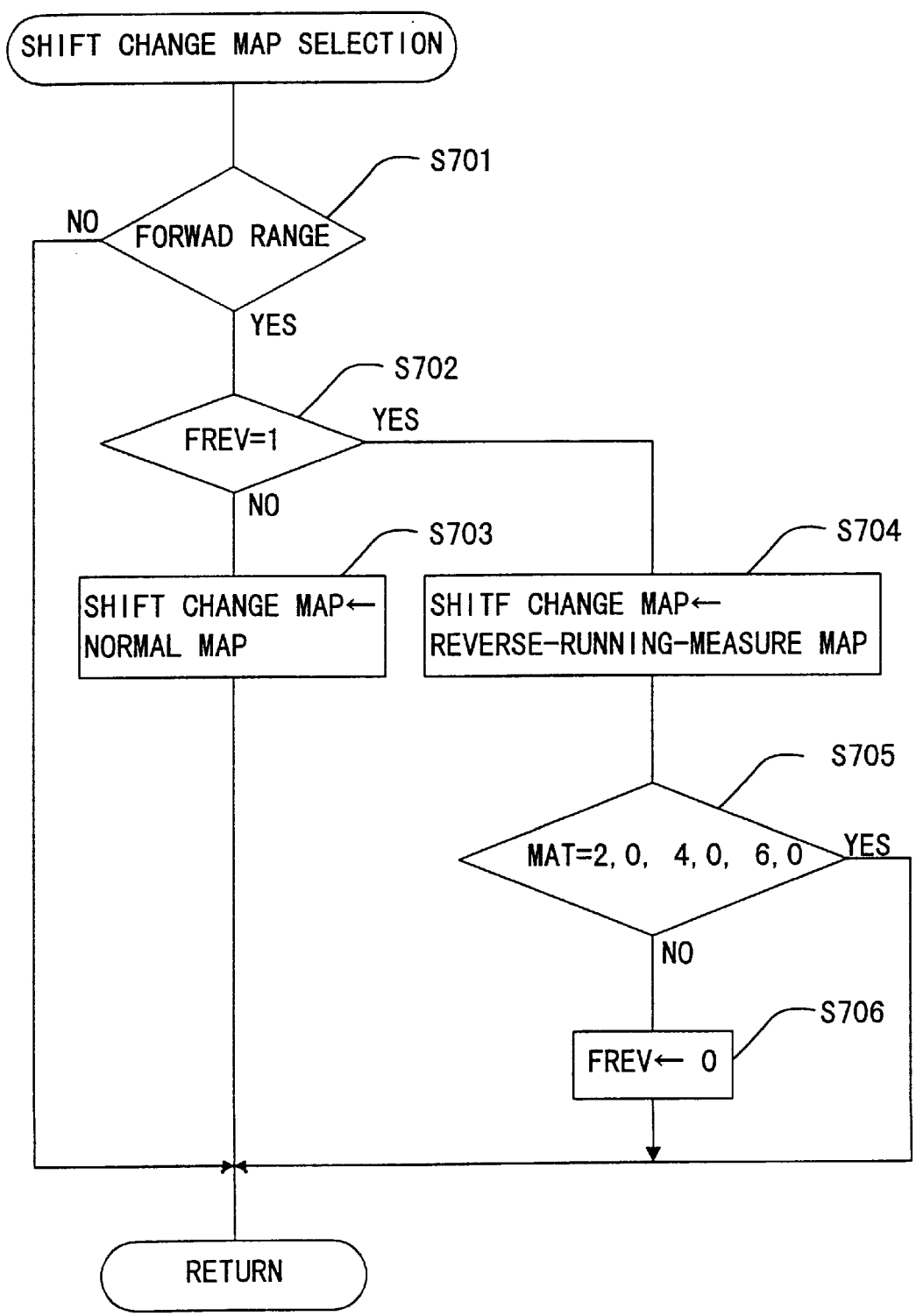
Figure 25B:
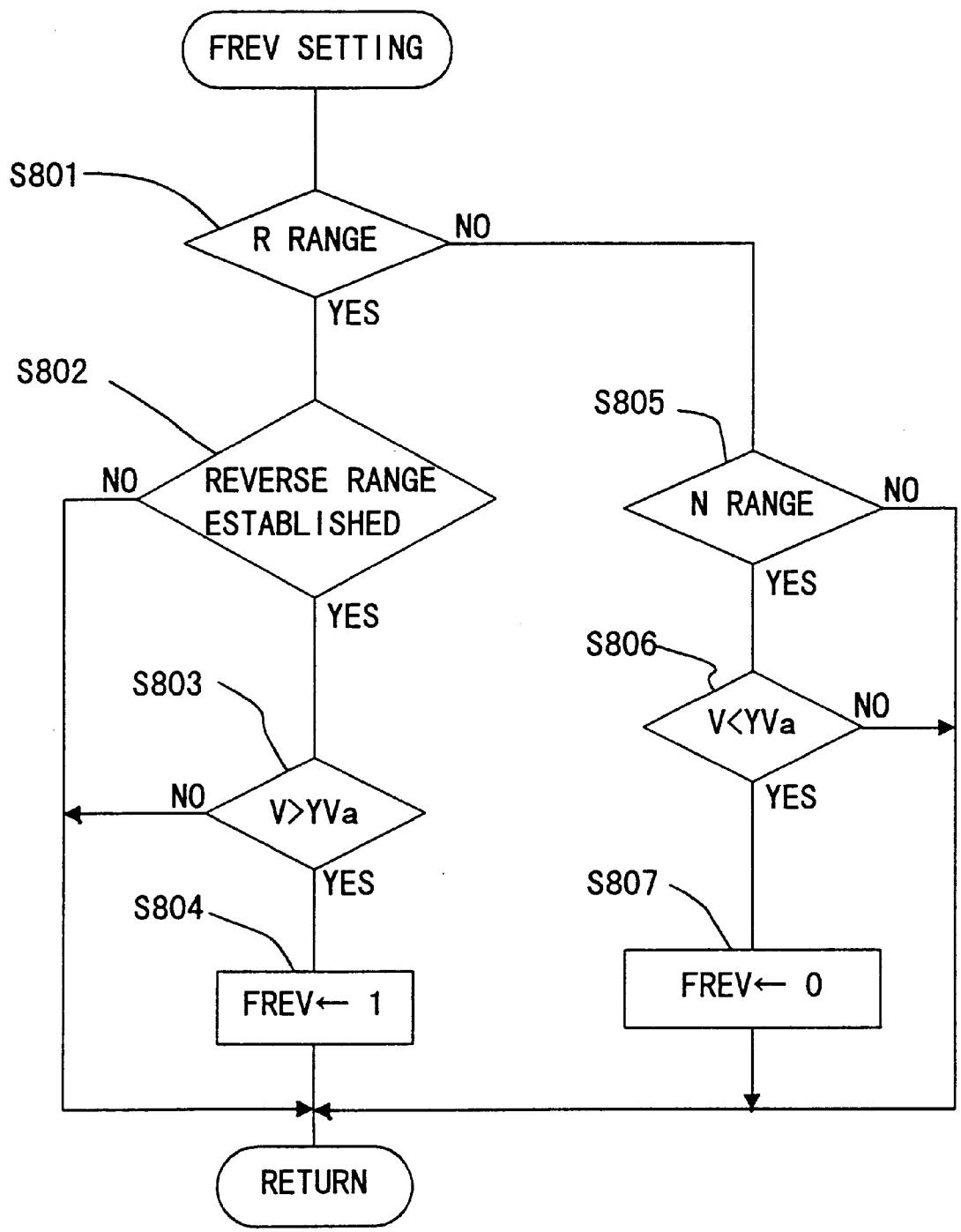
Figure 26:
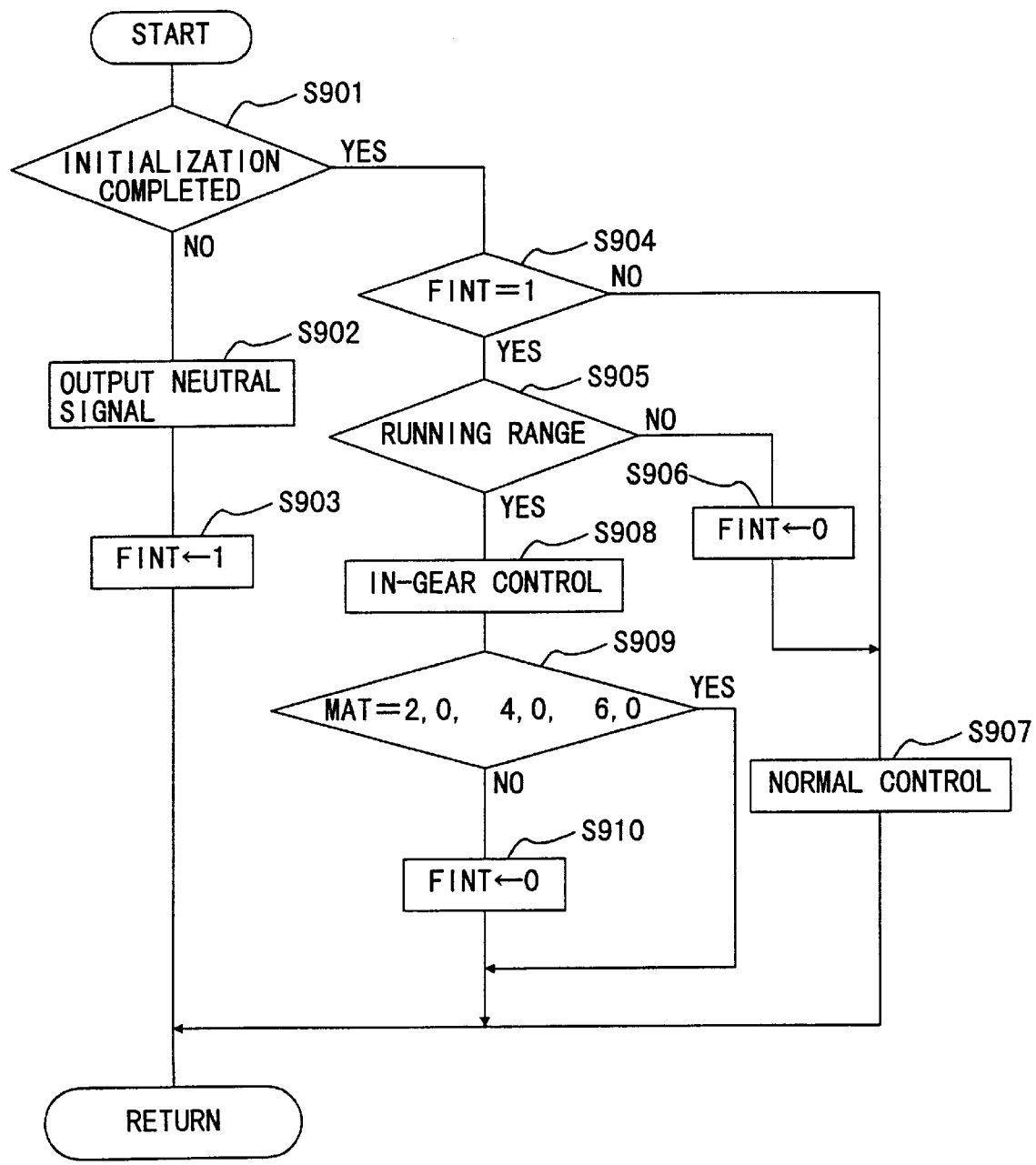
Figure 27:
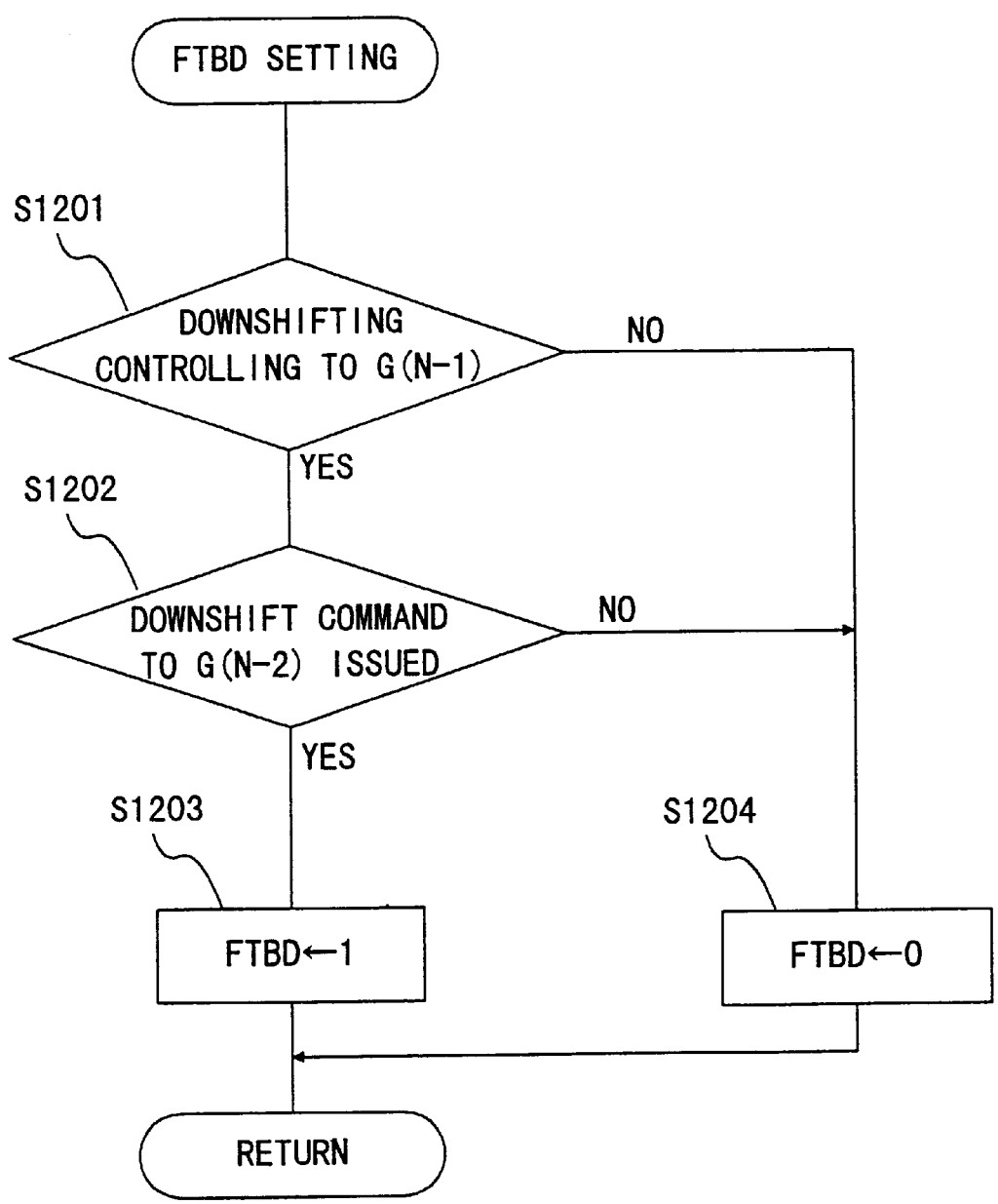

GIG. 13B is a graph to show the setting of YGDNS depending on the water temperature;

FIG. 14 is a flow chart to shown the contents of control in step S108 in FIG. 12;

FIG. 15 is a time chart to show the changes in ON pressure, OFF pressure, and "Gratio" at the time of switchover upshifting;

FIG. 16 is a flow chart to show the control of switchover upshifting;

FIG. 17 is a time chart to show the changes in ON pressure, OFF pressure, and "Gratio" at the time of switchover downshifting;

FIG. 18 is a flow chart to show the control of switchover downshifting;

FIG. 19 is a flow chart to show the shift selection control;

FIG. 20A is a flow chart to show the enumeration processing of a timer value TMG(N) to be used in the setting processing of flag FGFAIL which is used in the control in FIG. 19;

FIG. 20B is a flow chart to show the setting processing of FGFAIL;

FIG. 21A is a graph to show the principle of setting FLOCK to be used in the control of FIG. 19A;

FIG. 21B is a flow chart to show the setting processing of FLOCK;

FIG. 22 is a time chart to show the changes in ON pressure and "Gratio" at the time of gear-in;

FIG. 23 is a flow chart to show the in-gear control;

FIG. 24 is a flow chart to show an example of selecting processing of speed change map;

FIG. 25A is a flow chart to show another example of selecting processing of speed change map;

FIG. 25B is a flow chart to show the setting processing of flag FREV to be used in the processing in FIG. 25A;

FIG. 26 is a flow chart to show the control during and after initialization of ECU; and FIG. 27 is a flow chart to show the setting processing of FTBD to be used in the control in FIG. 12.

DETAILED DESCRIPTION OF PREFERRED EMBODIMENTS

Figure 1:
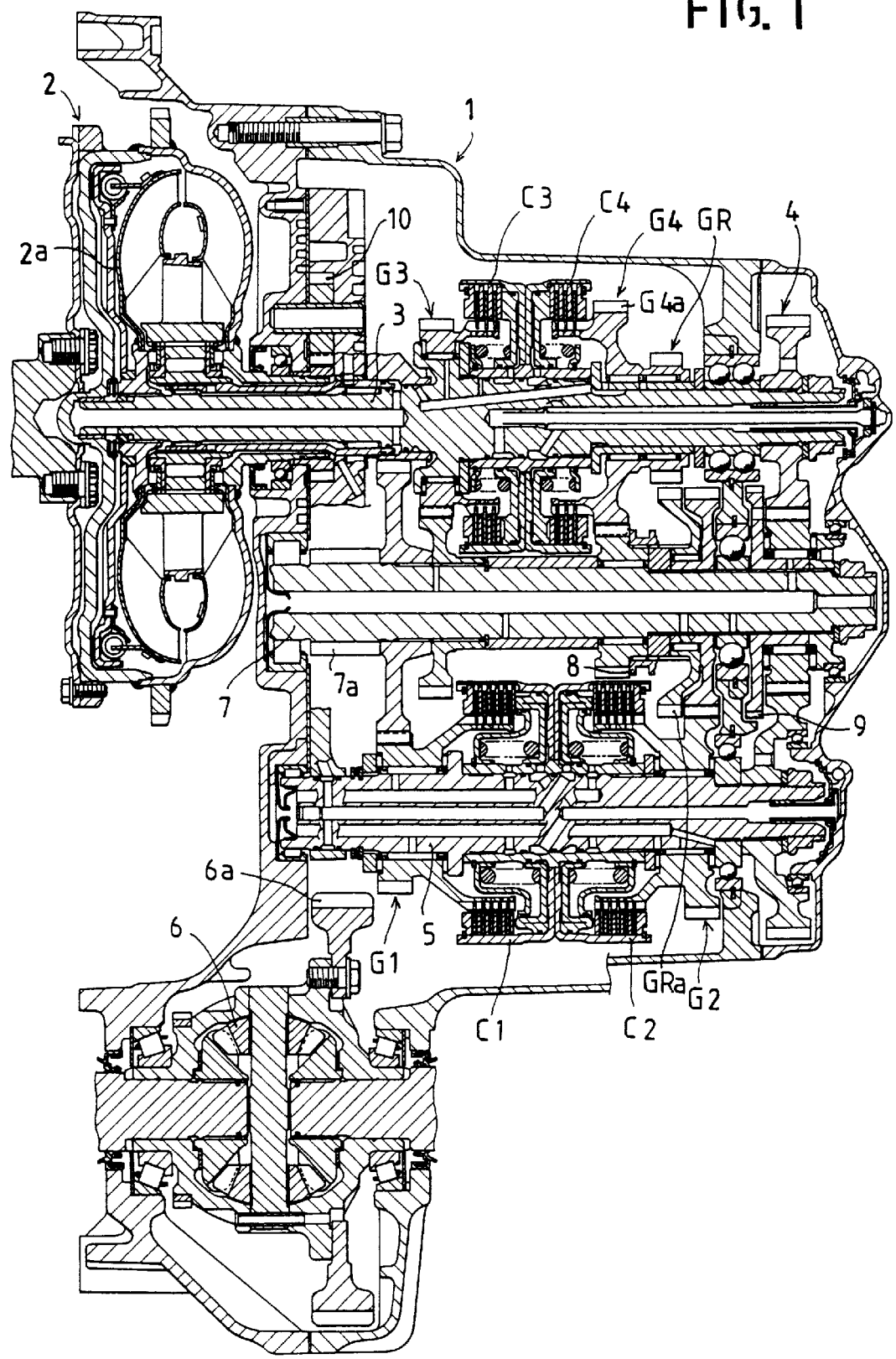
FIG. 1 is a cross-sectional view of a transmission to which the apparatus of the present invention is applied.

With reference to FIG. 1, numeral 1 denotes a hydraulically operated vehicular transmission for carrying out speed changing of four forward transmission trains and one reverse transmission train. The transmission 1 is provided with an input shaft 3 which is connected to an engine via a fluid torque converter 2; an intermediate shaft 5 which is always connected to the input shaft 3 via a gear train 4; and an output shaft 7 having a shaft end output gear 7a which is engaged with a final gear 6a on a differential 6 which is connected to driving wheels of a vehicle such as a motor vehicle. In the figure, the final gear 6a and the output gear 7a are illustrated in a manner separated from each other. This is because the figure is drawn in a development view, and both the gears 6a, 7a are actually in mesh with each other.

A first speed transmission train G1 and a second speed transmission train G2 are provided in parallel between the intermediate shaft 5 and the output shaft 7. A third speed transmission train G3, and a fourth speed transmission train G4 and a reverse transmission train GR are provided in parallel between the input shaft 3 and the output shaft 7. On the intermediate shaft 5 there are provided a first speed hydraulic clutch C1 and a second speed clutch C2, which are both defined as hydraulic engaging elements, interposed in the fist speed and the second speed transmission trains G1, G2, respectively. On the input shaft 5 there are provided a third speed hydraulic clutch C3 and a fourth speed hydraulic clutch C4, both of which are defined as hydraulic engaging elements, interposed in the third speed and the fourth speed transmission trains G3, G4, respectively. It is thus so arranged that, when each of the hydraulic clutches C1, C2, C3, C4 is engaged, the corresponding transmission train G1, G2, G3, G4 can be selectively established. The reverse transmission train GR is constituted or arranged to commonly use the fourth speed hydraulic clutch C4 with the fourth transmission train G4. By a switching (or changeover) operation of a selector gear 8 on the input shaft 7 between a forward running (or a forward drive) side on the left side as seen in FIG. 1 and a reverse running (or a reverse drive) side on the right side therein, the selector gear 8 is engaged with a driven gear G4a, GRa of the fourth speed transmission train G4 and the reverse transmission train GR, respectively. The fourth speed transmission train G4 and the reverse transmission train GR are thus selectively established. In the reverse transmission train GR, an idle gear (not illustrated) is interposed. Reference numeral 9 in the figure denotes a parking gear provided on the output shaft 7.

Figure 2:
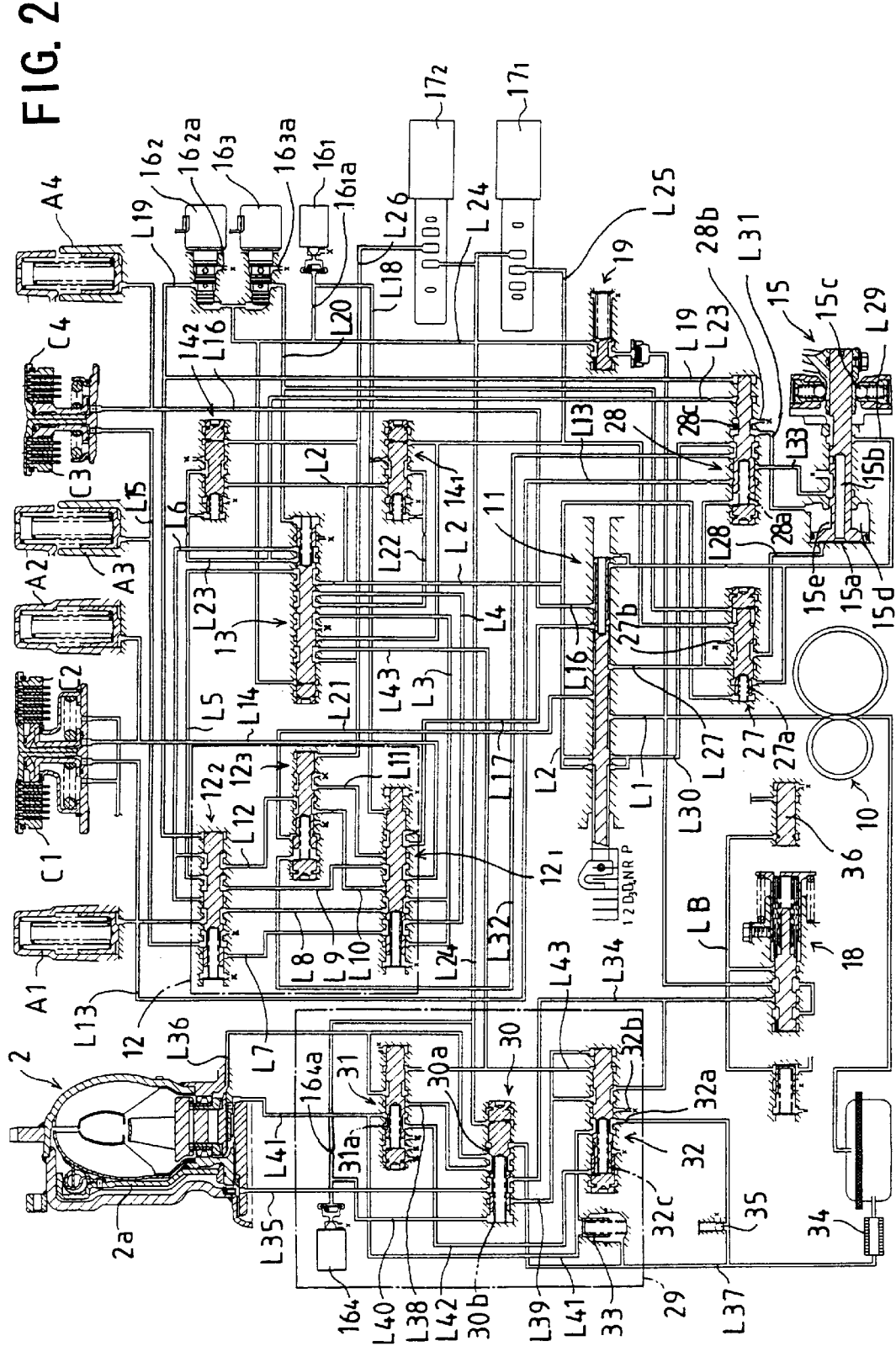
FIG. 2 is a diagram showing a hydraulic oil circuit of the transmission in FIG. 1.

Supply and discharge of hydraulic oil to and from each of the above-described hydraulic clutches C1–C4 are controlled by a hydraulic circuit as shown in FIG. 2. The hydraulic circuit is provided with: a hydraulic pressure source 10 which is made up of a gear pump driven by the engine via a casing of the fluid torque converter 2; a manual valve 11 which is operated for switching in interlocking with a selector lever inside a vehicle compartment; a shift valve unit 12; a changeover valve 13 on an upstream side of the shift valve unit 12; a pair of first and second pressure regulating valves $14_1$, $14_2$ which are connected to the changeover valve 13; a servo valve 15 which switches between the forward running and the reverse running and to which is connected a fork 8a to be engaged with the selector gear 8; three sets of first through third solenoid valves $16_1$, $16_2$, $16_3$ for controlling to switch the shift valve unit 12 and the changeover valve 13; and a pair of first and second solenoid proportional valves $17_1$, $17_2$ for controlling to regulate the hydraulic pressure in the first and the second pressure regulating valves $14_1$, $14_2$. Reference numerals A1 through A4 denote accumulators provided to absorb sudden pressure changes in each of the hydraulic clutches C1 through C4, respectively.

The manual valve 11 is switchable to a total of seven positions (or ranges), i.e., a parking position "P", a reverse position "R", a neutral position "N", an automatic speed changing position "$D_4$" for the first through the fourth speeds, an automatic speed changing position "$D_3$" for the first through the third speeds, a second speed retaining position "2", and a first speed retaining position "1".

Figure 3:
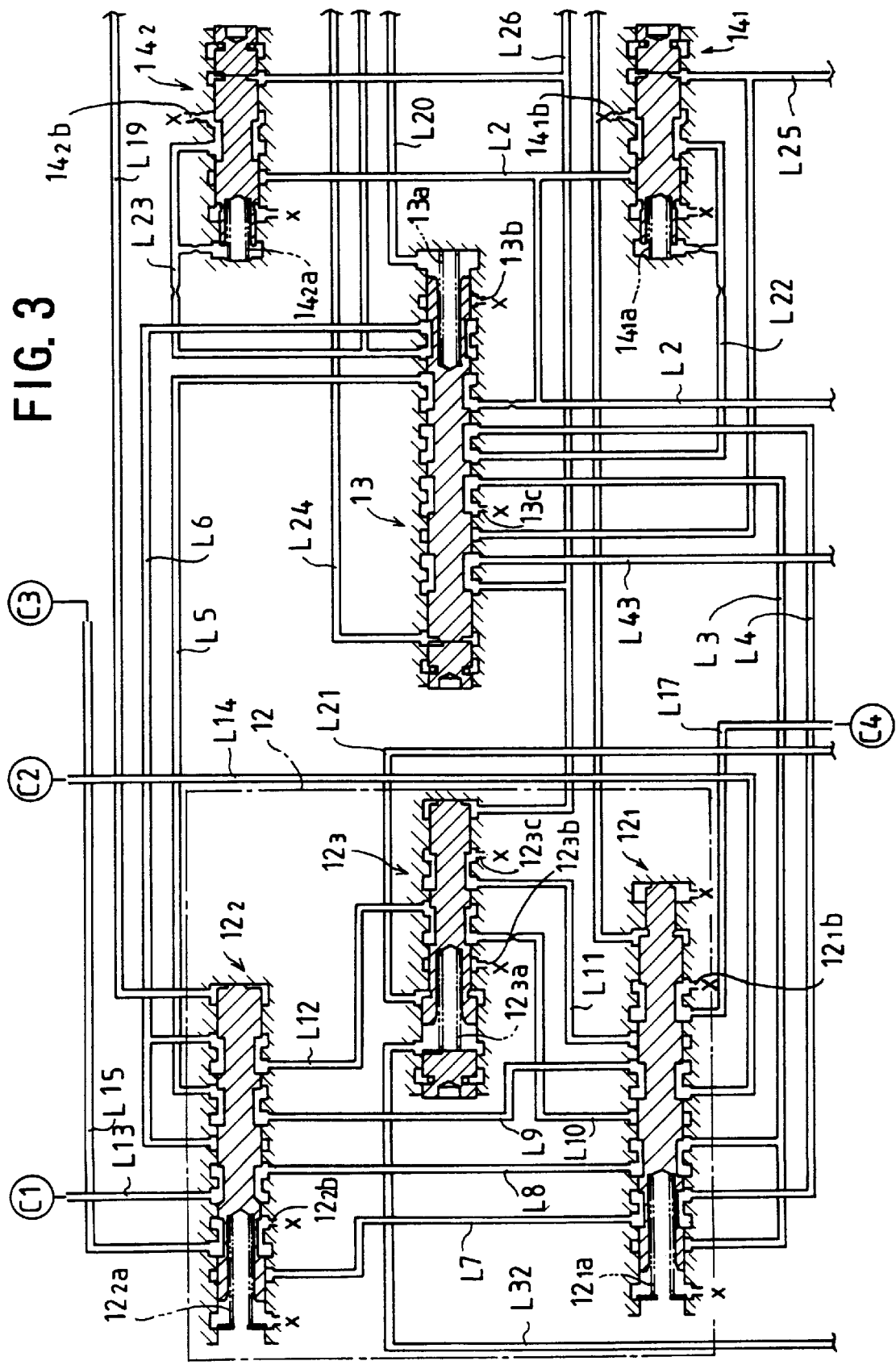
FIG. 3 is an enlarged diagram of an important portion of the hydraulic oil circuit.

In the "$D_4$" position of the manual valve 11, No. 1 oil passage L1 which is in communication with the hydraulic pressure source 10 is connected to No. 2 oil passage L2 which is in communication with the changeover valve 13. Pressurized hydraulic oil that has been regulated by a regulator 18 to a certain line pressure is supplied from No. 1 oil passage LI to No. 2 oil passage L2. This pressurized oil is selectively supplied to the first speed through the fourth speed hydraulic clutches C1 through C4 via the changeover valve 13 and the shift valve unit 12 to thereby carry out the speed changing of the first speed through the fourth speed. Detailed explanations will be made hereinafter about the shift valve unit 12, the changeover valve 13, and the pressure regulating valves $14_1$, $14_2$ with reference to FIG. 3.

The shift valve unit 12 is constituted by three sets of first through third shift valves $12_1$, $12_2$, $12_3$. The first shift valve $12_1$ is connected to the changeover valve 13 via two, i.e., No. 3 and No. 4, oil passages L3, L4. The second shift valve $12_2$ is connected to the changeover valve 13 via two, i.e., No. 5 and No. 6, oil passages L5, L6. The first and the second shift valves $12_1$, $12_2$ are connected to each other via three, i.e., No. 7 through No. 9, oil passages L7, L8, L9. Further, the third shift valve $12_3$ is connected to the first shift valve $12_1$ via two, i.e., No. 10 and No. 11, oil passages L10, L11 and is also connected to the second shift valve $12_2$ via No. 12 oil passage L12.

The first speed hydraulic clutch C1 is connected to the second shift valve $12_2$ via No. 13 oil passage L13. The second speed hydraulic clutch C2 is connected to the first shift valve $12_1$ via No. 14 oil passage L14. The third speed hydraulic clutch C3 is connected to the second shift valve $12_2$ via No. 15 oil passage L15. The fourth speed hydraulic clutch C4 is connected to the first shift valve $12_1$ via No. 17 oil passage L17 which is connected, in the "$D_4$", "$D_3$", "2" and "1" positions of the manual valve 11, to No. 16 oil passage L16 that is connected to the fourth speed hydraulic clutch C4.

The first shift valve 121 is urged to the right position by a spring $12_1a$ and is also urged to the left position by the hydraulic pressure in No. 18 oil passage L18 which is controlled by the first solenoid valve $16_1$. The second shift valve $12_2$ is urged to the right position by a spring $12_2a$ and is also urged to the left position by the hydraulic pressure in No. 19 oil passage L19 which is controlled by the second solenoid valve $16_2$. The third shift valve $12_3$ is urged to the right by a spring $12_3a$ and is also urged to the left by the hydraulic pressure in No. 21 oil passage L21 which is connected to No. 1 oil passage L1 in a position of the manual valve 11 other than the "2" and "1" positions. In the "$D_4$" position of the manual valve 11, the third shift valve $12_3$ is held or retained in the left position by the line pressure to be inputted via No. 21 oil passage L21 so that No. 10 oil passage L10 is connected to an oil discharge port $12_3b$ of the third shift valve $12_3$, and No. 11 oil passage L11 and No. 12 oil passage L12 are connected together.

At the time of the first speed running (or the first speed drive) in the "$D_4$" position of the manual valve 11, the first shift valve $12_1$ is switched to the left position and the second shift valve $12_2$ is switched to the right position. According to these operations, No. 13 oil passage L13 for the first speed hydraulic clutch C1 is connected to No. 4 oil passage L4 which is defined as a second connecting oil passage to the changeover valve 13. At this time, No. 14 oil passage L14 for the second speed hydraulic clutch C2 is connected to that oil discharge port $12_3b$ of the third shift valve $12_3$ which is defined as an oil discharge passage, via the first shift valve $12_1$ and No. 10 oil passage L10. No. 15 oil passage L15 for the third speed hydraulic clutch C3 is connected to that oil discharge port $12_2b$ of the second shift valve $12_2$ which is defined as an oil discharge passage. No. 16 oil passage L16 for the fourth speed hydraulic clutch C4 is connected to No. 6 oil passage L6, which is defined as a fourth connecting oil passage to the changeover valve 13, via No. 17 oil passage L17, the first shift valve $12_1$, No. 11. oil passage L11, the third shift valve $12_3$, No. 12 oil passage L12, and the second shift valve $12_2$.

At the time of the second speed running, the first shift valve $12_1$ is switched to the right position while holding the second shift valve $12_2$ in the right position. According to these operations, No. 14 oil passage L14 for the second speed hydraulic clutch C2 is connected to No. 5 oil passage L5, which is defined as a third connecting oil passage to the changeover valve 13, via the first shift valve $12_1$, No. 9 oil passage L9, and the second shift valve $12_2$. No. 13 oil passage L13 for the first speed hydraulic clutch C1 is connected to No. 3 oil passage L3, which is defined as a first connecting oil passage to the changeover valve 13, via the second shift valve $12_2$, No. 8 oil passage L8, and the first shift valve $12_1$. At this time, No. 15 oil passage L15 for the third speed hydraulic clutch C3 is connected to the oil discharge port $12_2b$ of the second shift valve $12_2$ like at the time of the first speed running. No. 16 oil passage L16 for the fourth speed hydraulic clutch C4 is connected to that oil discharge port $12_1b$ of the first shift valve $12_1$ which is defined as a discharge oil passage, via No. 17 oil passage L17.

At the time of the third speed running, the second shift valve $12_2$ is switched to the left position while holding the first shift valve $12_1$ in the right position. According to these operations, No. 15 oil passage L15 for the third speed hydraulic clutch C3 is connected to No. 4 oil passage L4 via the second shift valve $12_2$, No. 7 oil passage L7 and the first shift valve $12_1$. No. 14 oil passage L14 for the second speed hydraulic clutch C2 is connected to No. 6 oil passage L6 via the first shift valve $12_1$, No. 9 oil passage L9 and the second shift valve $12_2$. At this time, No. 13 oil passage L13 for the first speed hydraulic clutch C1 is connected to the oil discharge port $12_2b$ of the second shift valve $12_2$. No. 16 oil passage L16 for the fourth hydraulic clutch C4 is connected to the oil discharge port $12_1b$ of the first shift valve $12_1$ via No. 17 oil passage L17, like at the time of the second speed running.

At the time of the fourth speed running, the first shift valve $12_1$ is switched to the left position while holding the second shift valve $12_2$ in the left position. According to these operations, No. 16 oil passage L16 for the fourth speed hydraulic clutch C4 is connected to No. 5 oil passage L5 via No. 17 oil passage L17, the first shift valve $12_1$, No. 11 oil passage L11, the third shift valve $12_3$, No. 12 oil passage L12 and the second shift valve $12_2$. No. 15 oil passage L15 for the third speed hydraulic clutch C3 is connected to No. 3 oil passage L3 via the second shift valve $12_2$, No. 7 oil passage L7 and the first shift valve $12_1$. At this time, No. 13 oil passage L13 for the first speed hydraulic clutch C1 is connected to the oil discharge port $12_2b$ of the second shift valve $12_2$, like at the time of the third speed running. No. 14 oil passage L14 for the second speed hydraulic clutch C2 is connected to the oil discharge port $12_3b$ of the third shift valve $12_3$ via the first shift valve $12_1$ and No. 10 oil passage L10, like at the time of the first speed running.

To the changeover valve 13 there are connected: No. 2 oil passage L2 which is defined as an oil passage at a line pressure; No. 3 through No. 6 oil passages L3, L4, L5, L6 as the first through the fourth connecting oil passages; No. 22 oil passage L22 which is defined as a first pressure-regulated oil passage whose pressure is regulated by the first pressure regulating valve $14_1$; and No. 23 oil passage L23 which is defined as a second pressure-regulated oil passage whose pressure is regulated by the second pressure regulating valve $14_2$. The changeover valve 13 is urged to the right position, which is defined as a first switchover position, by a predetermined pressure lower than the line pressure (hereinafter called a modulator pressure) which is outputted to No. 24 oil passage L24 on the downstream side of a modulator valve 19 which is connected to No. 1 oil passage L1. The changeover valve 13 is urged to the left position, which is defined as a second switchover position, by a spring 13a and the hydraulic pressure in No. 20 oil passage L20 to be controlled by the third solenoid valve $16_3$.

When the changeover valve 13 is in the right position, No. 3 oil passage L3 is connected to No. 22 oil passage L22, and No. 5 oil passage L5 is connected to No. 23 oil passage L23. Therefore, it becomes possible to regulate the hydraulic pressure in each of No. 3 and No. 5 oil passages L3, L5 by the first and the second pressure regulating valves $14_1$, $14_2$, respectively. At this time, No. 4 oil passage L4 is connected to No. 2 oil passage L2, and No. 6 oil passage L6 is connected to that oil discharge port 13b of the changeover valve 13 which is defined as an oil discharge passage.

When the changeover valve 13 is in the left position, No. 4 oil passage L4 is connected to No. 22 oil passage L22, and No. 6 oil passage L6 is connected to No. 23 oil passage L23. Therefore, it becomes possible to regulate the hydraulic pressure in each of No. 4 and No. 6 oil passages L4, L6 by the first and the second pressure regulating valves $14_1$, $14_2$, respectively. At this time, No. 3 oil passage L3 is connected to that oil discharge port 13c of the changeover valve 13 which is defined as the oil discharge passage, and No. 5 oil passage L5 is connected to No. 2 oil passage L2.

At the time of the first speed in which the first shift valve $12_1$ is in the left position, the second shift valve $12_2$ is in the right position, and the first speed hydraulic clutch C1 is connected to No. 4 oil passage L4, the changeover valve 13 is switched and held in the right position, and No. 4 oil passage L4 is connected to No. 2 oil passage L2. In this way, the hydraulic pressure in the first speed hydraulic clutch C1 (hereinafter called a first speed pressure) becomes the line pressure, whereby the first speed transmission train G1 is established through the engagement of the first speed hydraulic clutch C1.

At the time of the second speed in which both the first and the second shift valves $12_1$, $12_2$ are in the right position, and the first speed hydraulic clutch C1 is connected to No. 3 oil passage L3; and the second speed hydraulic clutch C2 is connected to No. 5 oil passage L5, respectively, the changeover valve 13 is switched and held in the left position, No. 3 oil passage L3 is connected to the oil discharge port 13c, and No. 5 oil passage L5 is connected to No. 2 oil passage L2. In this manner, the first speed pressure is lowered to the atmospheric pressure to thereby release the engagement of the first speed hydraulic clutch C1. On the other hand, the hydraulic pressure in the second speed hydraulic clutch C2 (hereinafter called a second speed pressure) becomes the line pressure, whereby the second speed transmission train G2 is established through the engagement of the second speed hydraulic clutch C2.

At the time of upshifting from the first speed to the second speed, both the first and the second shift valves $12_1$, $12_2$ are first switched to the condition of the second speed while holding the changeover valve 13 in the position at the time of the first speed, i.e., in the right position. In this case, No. 3 and No. 5 oil passages L3, L5 to be connected to the first and the second speed hydraulic clutches C1, C2, respectively, are connected to No. 22 and No. 23 oil passages L22, L23, respectively. Therefore, it becomes possible to control the pressure drop characteristics of the first speed pressure by the first pressure regulating valve $14_1$ and to control the pressure rise characteristics of the second speed pressure by the second pressure regulating valve $14_2$, whereby a smooth upshifting from the first speed to the second speed can be carried out. After the speed changing has been completed, the changeover valve 13 is switched to the left position. Hydraulic oil is discharged from the first speed hydraulic clutch C1 without passing through the first pressure regulating valve $14_1$, and the second speed hydraulic clutch C2 is supplied with pressurized oil at the line pressure without passing through the second pressure regulating valve $14_2$.

At the time of downshifting from the second speed to the first speed, the changeover valve 13 is first switched from the position at the time of the second speed to the position at the time of the first speed, i.e., from the left position to the right position, while holding both the shift valves $12_1$, $12_2$ to the condition at the time of the second speed. According to these operations, like at the time of upshifting from the first speed to the second speed, both the first speed and the second speed hydraulic clutches C1, C2 are connected to No. 22 and No. 23 oil passages L22, L23, respectively. Therefore, it becomes possible to control the pressure rise characteristics of the first speed pressure by the first pressure regulating valve $14_1$, and to control the pressure drop characteristics of the second speed pressure by the second pressure regulating valve $14_2$, whereby a smooth downshifting from the second speed to the first speed can be carried but. After the speed changing has been completed, both the first and the second shift valves $12_1$, $12_2$ are switched to the condition of the first speed running. The second speed hydraulic clutch C2 is connected to the oil discharge port $12_3b$ of the third shift valve $12_3$. The hydraulic oil is thus discharged from the second speed hydraulic clutch C2 without passing through the second pressure regulating valve $14_2$. And the first speed hydraulic clutch C1 is supplied with the pressurized oil at the line pressure without passing through the first pressure regulating valve $14_1$ like at the time of the first speed.

At the time of the third speed in which the first shift valve $12_1$ is in the right position, the second shift valve $12_2$ is in the left position, the second speed hydraulic clutch C2 is connected to No. 6 oil passage L6, and the third speed hydraulic clutch C3 is connected to No. 4 oil passage L4, respectively, the changeover valve 13 is switched and held in the right position. Like at the time of the first speed running, No. 6 oil passage L6 is connected to the oil discharge port 13b and No. 4 oil passage L4 is connected to No. 2 oil passage L2. In this manner, the second speed pressure is lowered to the atmospheric pressure and the engagement of the second speed hydraulic clutch C2 is thereby released. On the other hand, the hydraulic pressure in the third speed hydraulic clutch C3 (hereinafter called a third speed pressure) becomes the line pressure, whereby the third speed transmission train G3 is established through the engagement of the third speed hydraulic clutch C3.

At the time of upshifting from the second speed to the third speed, both the first and the second shift valves $12_1$, $12_2$ are switched to the condition of the third speed while holding the changeover valve 13 in the position of the second speed running, i.e., in the left position. In this case, No. 4 and No. 6 oil passages L4, L6 to be connected to the third and the second speed hydraulic clutches C3, C2 are connected to No. 22 and No. 23 oil passages L22, L23, respectively. Therefore, it becomes possible to control the pressure rise characteristics of the third speed pressure by the first pressure regulating valve $14_1$ and to control the pressure drop characteristics of the second speed pressure by the second pressure regulating valve $14_2$. Therefore, a smooth upshifting from the second speed to the third speed can be carried out. After the speed changing has been completed, the changeover valve 13 is switched to the right position. The hydraulic oil is discharged from the second speed hydraulic clutch C2 without passing through the second pressure regulating valve $14_2$, and the third speed hydraulic clutch C3 is supplied with the pressurized oil at the line pressure without passing through the first pressure regulating valve $14_1$.

At the time of downshifting from the third speed to the second speed, the changeover valve 13 is first switched from the position at the time of the third speed to the position at the time of second speed, i.e., from the right position to the left position, while holding both the first and the second shift valves $12_1$, $12_2$ to the condition of the third speed. According to these operations, like at the time of upshifting from the second speed to the third speed, both the third speed and the second speed hydraulic clutches C3, C2 are connected to No. 22 and No. 23 oil passages L22, L23, respectively. Therefore, it becomes possible to control the pressure drop characteristics of the third speed pressure by the first pressure regulating valve $14_1$, and to control the pressure rise characteristics of the second speed pressure by the second pressure regulating valve $14_2$, whereby a smooth downshifting from the third speed to the second speed can be carried out. After the speed changing has been completed, both the fist and the second shift valves $12_1$, $12_2$ are switched to the condition of the second speed and the third speed hydraulic clutch C3 is connected to the oil discharge port $12_2b$ of the second shift valve $12_2$. The hydraulic oil is thus discharged from the third speed hydraulic clutch C3 without passing through the first pressure regulating valve $14_1$ and the second speed hydraulic clutch C2 is supplied with the pressurized oil at the line pressure without passing through the second pressure regulating valve $14_2$ like at the time of the second speed.

At the time of the fourth speed in which both the first and the second shift valves $12_1$, $12_2$ are in the left position, and the third speed hydraulic clutch C3 is connected to No. 3 oil passage L3, and the fourth speed hydraulic clutch C4 is connected to No. 5 oil passage L5, respectively, the changeover valve 13 is switched and held at the left position. Like at the time of second speed, No. 3 oil passage L3 is connected to the oil discharge port 13c, and No. 5 oil passage L5 is connected to No. 2 oil passage L2. In this manner, the third speed pressure is lowered to the atmospheric pressure to thereby release the engagement of the third speed hydraulic clutch C3. On the other hand, the hydraulic pressure in the fourth speed hydraulic clutch C4 (hereinafter called a fourth speed pressure) becomes the line pressure, whereby the fourth speed transmission train G4 is established through the engagement of the fourth speed hydraulic clutch C4.

At the time of upshifting from the third speed to the fourth speed, both the first and the second shift valves $12_1$, $12_2$ are switched to the condition of the fourth speed while holding the changeover valve 13 in the position of the third speed, i.e., in the right position. In this case, No. 3 and No. 5 oil passages L3, L5 to be connected to the third and the fourth hydraulic clutches C3, C4 are connected to No. 22 and No. 23 oil passages L22, L23, respectively. Therefore, it becomes possible to control the pressure drop characteristics of the third speed pressure by the first pressure regulating valve $14_1$ and to control the pressure rise characteristics of the fourth speed pressure by the second regulating valve $14_2$. A smooth upshifting from the third speed to the fourth speed can thus be carried out. After the speed changing has been completed, the changeover valve 13 is switched to the left position. The hydraulic oil is discharged from the third speed hydraulic clutch C3 without passing through the first pressure regulating valve $14_1$. And the fourth speed hydraulic clutch C4 is supplied with the oil at the line pressure without passing through the second pressure regulating valve $14_2$.

At the time of downshifting from the fourth speed to the third speed, the changeover valve 13 is first switched from the position at the time of the fourth speed to the position at the time of the third speed, i.e., from the left position to the right position, while holding both the first and the second shift valves $12_1$, $12_2$ to the condition of the fourth speed. According to these operations, like at the time of upshifting from the third speed to the fourth speed, the third speed and the fourth speed hydraulic clutches C3, C4 are connected to No. 22 and No. 23 oil passages L22, L23, respectively. Therefore, it becomes possible to control the pressure rise characteristics of the third speed pressure by the first pressure regulating valve $14_1$, and to control the pressure drop characteristics of the fourth speed pressure by the second pressure regulating valve $14_2$, whereby a smooth downshifting from the fourth speed to the third speed can be carried out. After the speed changing has been completed, both the fist and the second shift valves $12_1$, $12_2$ are switched to the condition of the third speed. The fourth speed hydraulic clutch C4 is connected to the oil discharge port $12_1b$ of the first shift valve $12_1$. The hydraulic oil is thus discharged from the fourth speed hydraulic clutch C4 without passing through the second pressure regulating valve $14_2$. And the third speed hydraulic clutch C3 is supplied with the pressurized oil at the line pressure without passing through the first pressure regulating valve $14_1$.

Each of the first and the second pressure regulating valves $14_1$, $14_2$ is urged by each of springs $14_1a$, $14_2a$ and by the hydraulic pressure in each of No. 22 and No. 23 oil passages L22, L23 to the rightward oil discharge side in which each of No. 22 and No. 23 oil passages L22, L23 is connected to each of the oil discharge ports $14_1b$, $14_2b$, respectively. Further, the first and the second pressure regulating valves $14_1$, $14_2$ are urged by the respective hydraulic pressures in No. 25 and No. 26 oil passages L25, L26 on the output side of each of solenoid proportional valves $17_1$, $17_2$ to the leftward oil supply side in which No. 22 and No. 23 oil passages L22, L23 are respectively connected to No. 2 oil passages L2. In this manner, the hydraulic pressure in each of No., 22 and No. 23 oil passages L22, L23 is increased or decreased in proportion to the output pressure of each of the solenoid proportional valves $17_1$, $17_2$. In order to decrease the speed change shocks, it becomes necessary to perform a delicate control of the hydraulic pressure in a transient region of engagement of the hydraulic clutch on the disengaging side and the hydraulic clutch on the engaging side. In this embodiment, after the completion of the speed changing, the hydraulic oil supply to the hydraulic clutch on the engaging side and the hydraulic oil discharge from the hydraulic clutch on the disengaging side are made without passing through the pressure regulating valves $14_1$, $14_2$. Therefore, the pressure regulating valves $14_1$, $14_2$ need to bear the hydraulic pressure control only in the transient region of engagement at a relatively low hydraulic pressure. Therefore, the resolution of the pressure control can be made higher and the delicate control of the pressure rise characteristics of the hydraulic clutch on the engaging side and the pressure drop characteristics of the hydraulic clutch on the disengaging side can be performed at a higher accuracy.

Modulator pressure is inputted into both the first and the second solenoid proportional valves $17_1$, $17_2$ via No. 24 oil passage L24. Here, as the first solenoid proportional valve $17_1$, there is used one in which an output pressure becomes maximum (modulator pressure) at the time of non-energization. As the second solenoid proportional valve $17_2$, there is used one in which the output pressure becomes minimum (atmospheric pressure) at the time of non-energization.

The first solenoid valve $16_1$ is constituted by a two-way valve which opens to atmosphere No. 18 oil passage L18 which is connected to No. 24 oil passage L24 via a throttle $16_1a$. At the time of non-energization thereof, it is closed to thereby change the hydraulic pressure in No. 18 oil passage L18 to a high hydraulic pressure (modulator pressure).

Each of the second and the third solenoid valves $16_2$, $16_3$ is constituted by a three-way valve which is switchable between an oil supply position in which No. 19 and No. 20 oil passages L19, L20 on the output side of the respective solenoid valves are connected to No. 24 oil passage L24, and an oil discharge position in which this connection is shut off and connect each of the oil passages L19, L20 to each of oil discharge ports $16_2a$, $16_3a$, respectively. At the time of non-energization thereof, it is switched to the oil supply position and change the hydraulic pressure in each of No. 19 and No. 20 oil passages L19, L20 to a high hydraulic pressure (modulator pressure).

It may also be considered to constitute the second and the third solenoid valves $16_2$, $16_3$ by a two-way valve like the first solenoid valve $16_1$. However, the two-way valve has disadvantages in that an oil leak amount when opened becomes large and that the control response becomes poor because, at a low temperature, there remains a residual hydraulic pressure even when it is opened. Here, at the time of low speed running at the first speed or at the time when the vehicle is stopped, the revolution speed of the engine lowers so that the amount of oil supply from the hydraulic pressure source 10 decreases and, therefore, the oil leak amount must be minimized. In addition, at the first speed, since the second shift valve $12_2$ and the changeover valve 13 are moved to the right position, No. 19 and No. 20 oil passages L19, L20 must be made to the atmospheric pressure. If the second and the third solenoid valves $16_2$, $16_3$ are constituted by two-way valves, the leak amount becomes excessive. In view of the above disadvantages and in view of the fact that the switching operation of the changeover valve 13 that must be switched with a good response is carried out by the third solenoid valve $16_3$, the following arrangement has been employed in this embodiment. Namely, the second and the third solenoid vales $16_2$, $16_3$ are respectively constituted by a three-way valve and, in view of the space, only the first solenoid valve $16_1$ is constituted by a small-sized two-way valve.

In the "$D_4$" position of the manual valve 11, the state of energization or non-energization of the first through the third solenoid valves $16_1$, $16_2$, $16_3$; the position of the first and the second shift valves $12_1$, $12_2$; and the output pressures (pressures in No. 22 and No. 23 oil passages L22, L23 ) of the first and the second pressure regulating valves $14_1$, $14_2$; at the in-gear time (initial gear engagement), as well as at the first through the fourth speeds are as shown in the table given hereinbelow.

|  | 1st speed | 1st <=> 2nd speed | 2nd speed | 2nd <=> 3rd speed | 3rd speed | 3rd <=> 4th speed | 4th speed |
|---|---|---|---|---|---|---|---|
| 1st sol. valve (16₁) | X | ○ | ○ | ○ | ○ | X | X |
| 2nd sol. valve (16₂) | ○ | ○ | ○ | X | X | X | X |
| 3rd sol. valve (16₃) | ○ | ○ | X | X | ○ | ○ | X |
| 1st shift valve (12₁) | Left | Right | Right | Right | Right | Left | Left |
| 2nd shift valve (12₂) | Right | Right | Right | Left | Left | Left | Left |
| changeover valve (13) | Right | Right | Left | Left | Right | Right | Left |
| 1st p. reg. valve (14₁) | H | H <=> L | L | L <=> H | H | H <=> L | L |
| 2nd p. reg. valve (14₂) | L | L <=> H | H | H <=> L | L | L <=> H | H | sol. valve = solenoid valve;
p. reg. valve = pressure regulating valve;
L = Low;
H = High;
○ = energized;
X = not energized In this embodiment, between the first and the second pressure regulating valves $14_1$, $14_2$, the one that functioned as an oil supply pressure regulating valve for boosting the hydraulic pressure in the hydraulic clutch on the engaging side at the time of the last speed changing will function as an oil discharge pressure regulating valve (i.e., a pressure regulating valve for oil discharge) for dropping or lowering the hydraulic pressure in the hydraulic clutch on the disengaging side at the time of the next speed changing. Further, the one that functioned as an oil discharge pressure regulating valve at the time of the last speed changing will function as an oil supply pressure regulating valve (i.e., a pressure regulating valve for oil supply) at the time of the next speed changing. Therefore, the output pressure of each of the pressure regulating valves $14_1$, $14_2$ can be maintained as it is to thereby make it ready for the next speed changing. On the contrary, if one of the first and the second pressure regulating valves $14_1$, $14_2$ is used exclusively for oil supply and the other thereof is used exclusively for oil discharge, the following becomes necessary. Namely, the output pressure of the oil supply pressure regulating valve that was boosted at the time of speed changing must be lowered, and also the output pressure of the oil discharge pressure regulating valve that was lowered at the time of speed changing must be boosted to be prepared for the next speed changing. In this case, if the next speed changing is made at a low temperature within a short period of time, the speed changing will start when the pressure dropping of the output pressure in the oil supply pressure regulating valve or the boosting of the output pressure in the oil discharge pressure regulating valve has not been made sufficiently. As a consequence, the hydraulic pressure control at the time of speed changing gets out of order and the speed change shocks are likely to occur. Therefore, it is preferable to use, as in this embodiment, the first and the second pressure regulating valves $14_1$, $14_2$ alternately for oil supplying and for oil discharging at each speed changing.

Figure 4:
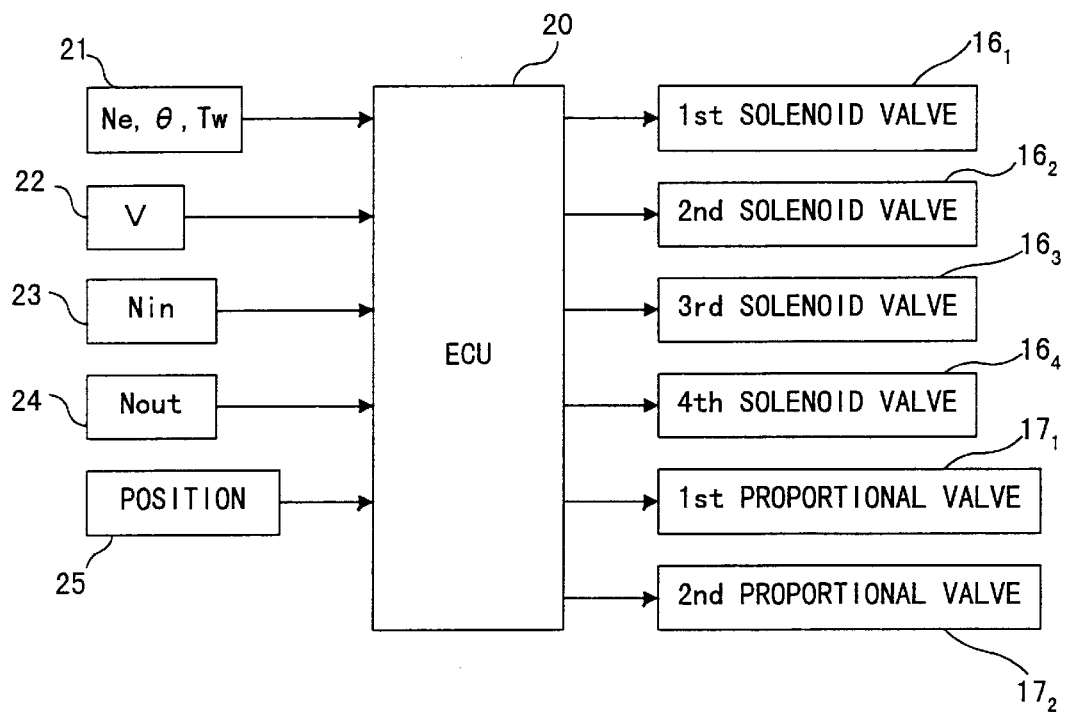
FIG. 4 is a block circuit diagram of a control system for solenoid valves provided in the hydraulic oil circuit.

The first through the third solenoid valves $16_1$, $16_2$, $16_3$ as well as the first and the second solenoid proportional valves $17_1$, $17_2$ are controlled, together with a fourth solenoid valve $16_4$ for a lockup clutch which is described later, by an electronic control unit 20 which is made up of a microcomputer as shown in FIG. 4.

In the electronic control unit (ECU) 20, there are inputted: a signal from a throttle sensor 21 for detecting a throttle opening e of the engine; a signal from a vehicle speed sensor 22 for detecting the vehicle speed V; a signal from a speed sensor 23 for detecting the rotational speed Nin of the input shaft 3 of the transmission; a signal from a speed sensor 24 for detecting the rotational speed Nout of the output shaft 7 of the transmission; and a signal from a position sensor 25 for the selector lever.

In the "$D_4$" position, a transmission train that suits the present throttle opening θ and the vehicle speed V is selected based on a speed change map for the first through the fourth speeds kept in memory in the ECU 20, thereby carrying out an automatic speed changing of the first through the fourth speeds.

Also in the "$D_3$" position, the same oil circuit arrangement applies as that in the "$D_4$" position. Automatic speed changing of the first through the third speeds is performed based on the speed change map for the first through the third speeds that is stored in the ECU 20.

In the "2" and "1" positions, a stepwise downshifting to the second speed or to the first speed is carried out based on the second speed map or the first speed map that is stored in the ECU 20. Thereafter, the speed is maintained in the second speed or the first speed. In the "2" and "1" positions, No. 21 oil passage L21 that was connected to No. 1 oil passage L1 is opened to atmosphere. The third shift valve $12_3$ can thus become switchable to the right position.

When the third shift valve $12_3$ is switched to the right position, No. 10 oil passage L10 that was connected, in the left position, to the oil discharge port $12_3b$ is connected to No. 12 oil passage L12. And No. 11 oil passage L11 that was connected, in the left position, to No. 12 oil passage L12 is connected to the oil discharge port $12_3c$ of the third shift valve $12_3$. No. 10 oil passage L10 and No. 11 oil passage L11 are connected, in the right position of the first shift valve $12_1$, to none of the oil passages for the hydraulic clutches. When the first shift valve $12_1$ is moved to the right position, the oil circuit arrangement will become the same as that when the first shift valve $12_1$ is moved to the right position in the "$D_4$" position. Therefore, when both the first and the second shift valves $12_1$, $12_2$ are switched to the right position (a condition of the second speed in the "$D_4$" position), the hydraulic oil is supplied to the second speed hydraulic clutch C2 to thereby establish the second speed transmission train G2. When the first shift valve $12_1$ is moved to the right position and the second shift valve $12_2$ is moved to the left position (a condition of the third speed in the "$D_3$ position), the hydraulic oil is supplied to the third speed hydraulic clutch C3 to thereby establish the third speed transmission train G3.

On the other hand, when the first shift valve $12_1$ is switched to the left position, No. 14 oil passage L14 for the second speed hydraulic clutch C2 is connected to No. 10 oil passage L10, and No. 17 oil passage L17 for the fourth speed hydraulic clutch C4 is connected to No. 11 oil passage L11, respectively, the oil circuit arrangement will therefore become different from that in the "$D_4$" position. When the first shift valve $12_1$ is moved to the left position and the second shift valve $12_2$ is moved to the right position (a condition of the first speed in the "$D_4$" position), No. 13 oil passage L13 for the first speed hydraulic clutch C1 is connected to No. 4 oil passage L4 (this connection is the same as that in the "$D_4$" position), and No. 14 oil passage L14 for the second speed hydraulic clutch C2 is connected to No. 6 oil passage L6 (in the "$D_4$" position No. 17 oil passage L17 for the fourth speed hydraulic clutch C4 is connected to No. 6 oil passage L6 ). When both the first and the second shift valves $12_1$, $12_2$ are moved to the left position (a condition of the fourth speed in the "$D_4$" position), No. 15 oil passage L15 for the third speed hydraulic clutch C3 is connected to No. 3 oil passage L3 (this connection is the same as that in the "$D_4$" position). No. 14 oil passage L14 for the second speed hydraulic clutch C2 is connected to No. 5 oil passage L5 (in the "$D_4$" position No. 17 oil passage L17 for the fourth speed hydraulic clutch C4 is connected to No. 5 oil passage L5 ). No oil supply is therefore made to the fourth speed hydraulic clutch C4.

Here, the third shift valve $12_3$ is arranged to be urged to the left by that output pressure of the second solenoid proportional valve $17_2$ which is inputted via No. 26 oil passage L26. However, when the electric power supply to the first through the third solenoid valves $16_1$, $16_2$, $16_3$ as well as to the first and the second solenoid proportional valves $17_1$, $17_2$ stops at the time of a system failure due to opening of a fuse or the like, both the first and the second shift valves $12_1$, $12_2$ and the changeover valve 13 are switched to the left position, and also the output pressure of the second solenoid proportional valve $17_2$ becomes the atmospheric pressure. The third shift valve $12_3$ is thus switched in the "2" and the "1" positions to the right position and switched, in the "$D_4$" and the "$D_3$" positions, to the left position by the line pressure from No. 21 oil passage L21. Therefore, in the "1" and the "2" positions, the second speed transmission train G2 is established and, in the "$D_4$" and the "$D_3$" positions, the fourth speed transmission train G4 is established, respectively. The vehicle is able to run at the second speed and the fourth speed even at the time of the system failure.

In the "R" position of the manual valve 11, No. 2 oil passage L2 is opened to the atmosphere. No. 27 oil passage L27 is connected to No. 1 oil passage L1 and the hydraulic oil is supplied to a first oil chamber 15a on the left end of the servo valve 15 via No. 28 oil passage L28 which is connected to No. 27 oil passage L27 via a first servo control valve 27. According to these operations, the servo valve 15 is urged to the rightward reverse running position to thereby switch the selector gear 8 to the reverse running side. Also No. 28 oil passage L28 is connected to No. 29 oil passage L29 via that shaft bore 15b of the servo valve 15 which is communicated with the first oil chamber 15a. The oil passage L29 is connected to No. 16 oil passage L16 which is communicated with the fourth speed hydraulic clutch C4 in the "R" position of the manual valve 11. In this manner, the reverse transmission train GR is established by the hydraulic oil supply to the fourth speed hydraulic clutch C4 and by the switching of the selector gear 8 to the reverse running side.

The first servo control valve 27 is urged, by the hydraulic pressure in No. 20 oil passage L20 on the output side of the third solenoid valve $16_3$ and the hydraulic pressure in No. 25 oil passage L25 on the output side of the first solenoid proportional valve $17_1$, to the leftward open side in which No. 27 oil passage L27 and No. 28 oil passage L28 are connected. It is urged by a spring 27a, the hydraulic pressure in No. 2 oil passage L2 and the hydraulic pressure in No. 29 oil passage L29, to the rightward closed side in which the connection between No. 27 oil passage L27 and No. 28 oil passage L28 is shut off and connect No. 28 oil passage L28 to an oil discharge port 27b. In the "$D_4$", "$D_3$", "2" or "1" position, by means of the line pressure to be inputted via No. 2 oil passage L2, the first servo control valve 27 is held in the right position even if the output pressures of the third solenoid valve $16_3$ and the first solenoid proportional valve $17_1$ may both be increased. The oil supply to No. 28 oil passage L28 is thus blocked, and the servo valve 15 is retained in the leftward forward running position by an engaging member 15c, whereby the establishment of the reverse transmission train GR is blocked.

Further, when the manual valve 11 is switched to the "R" position while the vehicle is running forwards at a speed above a predetermined speed, the output pressures of both the third solenoid valve $16_3$ and the first solenoid proportional valve $17_1$ are made to be atmospheric pressure. The fist servo control valve 27 is thus held in the right position, whereby the hydraulic oil supply to No. 28 oil passage L28, i.e., the establishment of the reverse transmission train GR, is blocked.

When the manual valve 11 is switched to the "R" position below a predetermined vehicle speed, the output pressure of the first solenoid proportional valve $17_1$ is gradually increased to thereby urge the first servo control valve 27 to the leftward open side. As described above, the hydraulic oil is supplied to the fourth speed hydraulic clutch C4 via No. 28 oil passage L28, the servo valve 15 and No. 29 oil passage L29. The first servo control valve 27 is functioned as a pressure regulating valve to thereby control the boosting of the hydraulic pressure in the fourth speed hydraulic clutch C4. Thereafter, the modulator pressure is outputted from the third solenoid valve $16_3$ to thereby urge the first servo control valve 27 to the left endmost position, whereby the hydraulic pressure in the fourth speed hydraulic clutch C4 is maintained at the line pressure. Even if the third solenoid valve $16_3$ fails while it is kept switched on and consequently its output pressure remains in the atmospheric pressure, the hydraulic pressure required to engage the fourth speed hydraulic clutch C4 can be secured by the output pressure of the first solenoid proportional valve $17_1$.

When the manual valve 11 is switched from the "R" position to the "$D_4$", "$D_3$", "2", or "1" position, the line pressure is inputted from No. 30 oil passage L30 which is connected like No. 2 oil passage L2 to No. 1 oil passage L1 in each of the above positions, to a second oil chamber 15d which is present in an intermediate position of the servo valve 15 via the second servo control valve 28 and No. 31 oil passage L31. The servo valve 15 is thus moved to the left and is switched to the forward running position.

The second servo control valve 28 is urged, by the first speed pressure to be inputted via No. 13 oil passage L13, the output pressure of the second solenoid valve $16_2$ to be inputted via No. 19 oil passage L19, and the output pressure of the second pressure regulating valve $14_2$ to be inputted via No. 23 oil passage L23, to the left position in which No. 30 oil passage L30 and No. 31 oil passage L31 are connected. It is urged by a spring 28a and the hydraulic pressure in No. 27 oil passage L27 to the right position in which the connection between No. 30 and No. 31 oil passages L30, L31 is shut off and No. 31 oil passage L31 is connected to an oil discharge port 28b.

In this manner, in the "R" position, the second servo control valve 28 is surely switched to the right position by the line pressure from No. 27 oil passage L27. After switching the manual valve 11 to the "$D_4$", "$D_3$", "2" or "1" position, the second servo control valve 28 is maintained in the right position until the first speed pressure rises to a predetermined value. The inputting of the line pressure to the second oil chamber 15d is thus blocked and the servo valve 15 is retained by an engaging means 15c in the reverse running position. When the first speed pressure has become a predetermined value or above, the second servo control valve 28 is switched to the left position, and the line pressure is inputted to the second oil chamber 15d to thereby switch the servo valve 15 to the forward running position. Therefore, even if the manual valve 11 is switched from the "R" position to the "$D_4$", "$D_3$", "2" or "1" position in a condition in which an accelerator pedal is stepped, the rotation in the reverse direction of the output shaft 7 is being restrained, at the time of switching of the servo valve 15, by a torque transmission in the forward (or positive) direction of rotation via the first speed transmission train G1 due to a rise in the first speed pressure. Consequently, the selector gear 8 and a driven gear G4a of the fourth speed transmission train G4 can smoothly be engaged in a condition in which no large relative rotation occurs. Wear of the meshing (or engaging) portions of both the gears 8, G4a can thus be prevented.

In case of an occurrence of an abnormality in that the second servo control valve 28 is locked in the right position due to an inclusion of a foreign matter or the like, or else the servo valve 15 is locked in the reverse running position even after the servo control valve 28 has been switched to the left position, the selector gear 8 will remain in the reverse running position even if the manual valve 11 is switched from the "R" position to the "$D_4$", "$D_3$", "2" or "1" position. If the hydraulic oil is consequently supplied to the fourth speed hydraulic clutch C4, the reverse transmission train GR will thus be established. As a solution, in this embodiment, there are provided No. 32 oil passage L32 which is in communication with the left end oil chamber of the third shift valve $12_3$, and No. 33 oil passage L33 which is connected, in the reverse running position of the servo valve 15, to the second oil chamber 15d of the servo valve 15 via a notched groove 15e. It is thus so arranged that No. 32 oil passage L32 can be connected to No. 30 oil passage L30 in the right position of the second servo valve 28 and to No. 33 oil passage L33 in the left position of the second servo valve 28, respectively. According to this arrangement, when the above-described abnormality should occur, the line pressure is inputted to the left end oil chamber of the third shift valve $12_3$ via No. 32 oil passage L32. Therefore, the third shift valve $12_3$ is switched and held in the right position regardless of the hydraulic pressures in No. 21 oil passage L21 and No. 26 oil passage L26 which both urge the third shift valve $12_3$ leftwards, whereby the hydraulic oil supply to the fourth speed hydraulic clutch C4 is blocked.

Once switched to the left position, the second servo valve 28 is held in the left position by a self-locking force to be generated by a difference in the pressure-receiving area between right and left lands of an annular groove 28c which connects No. 30 oil passage L30 and No. 31 oil passage L31 together. In case, however, the oil level largely varies due to a sudden cornering whereby the hydraulic pressure from the hydraulic pressure source 10 instantly stops or disappears, the second servo control valve 28 may be switched to right position by the force of the spring 28a. In such a case, if the second servo control valve 28 is arranged to be urged leftwards only by the first speed pressure, the second servo control valve 28 will no longer be returned, at the second through the fourth speeds, to the left position even when the hydraulic pressure restores. As a solution, in this embodiment, the second servo control valve 28 is urged to the left position also by the output pressure of the second pressure regulating valve $14_2$ that becomes high at the second and the fourth speeds, as well as by the output pressure of the second solenoid valve $16_2$ that becomes high at the third and the fourth speeds. At the first through the third speeds, even if the second servo control valve 28 does not return to the left position and the third shift valve $12_3$ is switched to the right position by the input of the line pressure from No. 32 oil passage L32, the oil supply to, and discharge from, each of the hydraulic clutches C1 through C4 are not affected. However, at the fourth speed, the hydraulic oil is supplied to the second speed hydraulic clutch C2 and, consequently, the speed is downshifted from the fourth speed to the second speed. Therefore, at the fourth speed, the second servo control valve 28 is urged leftwards by the output pressure of the second pressure regulating valve $14_2$ and the output pressure of the second solenoid valve $16_2$. Thus, even if one of the output pressures does not rise to a normal value after the restoration of the hydraulic pressure, the second servo control valve 28 is arranged to be surely switched to the left position.

In the "N" position of the manual valve 11, No. 2 oil passage L2, No. 16 oil passage L16, No. 17 oil passage L17, No. 27 oil passage L27, No. 29 oil passage L29, and No. 30 oil passage L30 are all opened to atmosphere, and all of the hydraulic clutches C1 through C4 are disengaged. Further, in the "P" position, No. 27 oil passage L27 is connected to No. 1 oil passage L1, and the servo valve 15 is switched to the reverse running position by the inputting of the line pressure via the first servo control valve 27 and No. 28 oil passage L28. In the "P" position, however, the connection between No. 16 oil passage L16 and No. 29 oil passage L29 is shut off to thereby open No. 16 oil passage L16 to atmosphere. There is therefore no possibility that the reverse transmission train GR is established.

The fluid torque converter 2 contains therein a lock-up clutch 2a. In the hydraulic oil circuit there is provided a lock-up control portion 29 for controlling the operation of the lock-up clutch 2a with the hydraulic oil to be supplied from the regulator 18 via No. 34 oil passage L34 operating as the working oil.

The lock-up control portion 29 is made up of: a shift valve 30 which controls to switch on and off the lock-up clutch 2a; a changeover valve 31 which switches the engaged condition of the lock-up clutch 2a at the time of being switched on between a locked up condition in which no slipping occurs and a slipping condition; and a pressure regulating valve 32 which controls to increase or decrease the engaging force in the slipping condition.

The shift valve 30 is switchable between the following two positions, i.e.: a right position in which No. 34 oil passage L34 is connected to No. 35 oil passage L35 which is communicated with a backpressure chamber of the lock-up clutch 2a and in which No. 36 oil passage L36 which is communicated with an internal space of the fluid torque converter 2 is connected, via a throttled portion 30a, to No. 37 oil passage L37 for oil discharge; and a left position in which No. 34 oil passage L34 is connected to No. 38 oil passage L38 which is communicated with the changeover valve 31 and also to No. 36 oil passage L36 via the throttled portion 30a, and in which No. 35 oil passage L35 is connected to No. 39 oil passage L39 which is communicated with the pressure regulating valve 32. The shift valve 30 is controlled by the fourth solenoid valve $16_4$. The fourth solenoid valve $16_4$ is constituted by a two-way valve which opens to atmosphere No. 40 oil passage L40 which is connected to No. 24 oil passage L24 on the output side of the modulator valve 19 via a throttle $16_4a$. The shift valve 30 is urged to the left position by the hydraulic pressure in No. 24 oil passage L24, i.e., by the modulator pressure, and is urged to the right position by a spring 30b and the hydraulic pressure in No. 40 oil passage L40. When the fourth solenoid valve $16_4$ is closed and the hydraulic pressure in No. 40 oil passage L40 is boosted to the modulator pressure, the shift valve 30 is switched to the right position. When the fourth solenoid valve $16_4$ is opened and the hydraulic pressure in No. 40 oil passage L40 is lowered to the atmospheric pressure, the shift valve 30 is switched to the left position.

The changeover valve 31 is switchable between the following two positions, i.e., a right position in which No. 41 oil passage L41 which is communicated with the internal space of the fluid torque converter 2 is connected to No. 42 oil passage L42 which is communicated with a left end oil chamber of the pressure regulator valve 32, and a left position in which No. 42 oil passage L42 is opened to atmosphere and in which No. 38 oil passage L38 is connected to No. 36 oil passage L36. The changeover valve 31 is urged to the right position by a spring 31a and is urged to the left position by the hydraulic pressure in No. 43 oil passage L43 which is connected to the right-end oil chamber.

The pressure regulating valve 32 is switchable between the following two positions, i.e., a right position in which No. 39 oil passage L39 is connected to No. 34 oil passage L34 and in which No. 41 oil passage L41 is connected to No. 37 oil passage L37 via a throttle 32a, and a left position in which the connection between No. 39 oil passage L39 and No. 34 oil passage L34 is shut off and connect No. 39 oil passage L39 to a throttled oil discharge port 32b, and in which the connection between No. 41 oil passage L41 and No. 37 oil passage L37 is shut off. The pressure regulating valve 32 is urged rightwards by a spring 32c and the hydraulic pressure in No. 42 oil passage L42, and is urged leftwards by the hydraulic pressure in No. 39 oil passage L39 and the hydraulic pressure in No. 43 oil passage L43. Here, let the pressure receiving area to receive the hydraulic pressure in No. 39 oil passage L39 and the pressure receiving area to receive the hydraulic pressure in No. 42 oil passage L42 be both s1, the pressure receiving area to receive the hydraulic pressure in No. 43 oil passage L43 be s2, the hydraulic pressures in No. 39 oil passage L39, No. 42 oil passage L42 and No. 43 oil passage L43 be Pa, Pb and Pc, respectively, and the urging force of the spring 32c be F. Then, we have $$s1 \cdot Pb + F = s1 \cdot Pa + s2 \cdot Pc$$

$$Pb - Pa = (s2 \cdot Pc - F)/s1$$

The differential pressure between the hydraulic pressure in No. 42 oil passage L42 and the hydraulic pressure in No. 39 oil passage L39 is increased or decreased depending on the hydraulic pressure in No. 43 oil passage L43.

No. 43 oil passage L43 is connected, in the right position of the changeover valve 13, to No. 25 oil passage L25 on the output side of the first solenoid proportional valve $17_1$ and, in the left position of the changeover valve 13, to No. 26 oil passage L26 on the output side of the second solenoid proportional valve $17_2$. In this manner, the changeover valve 31 and the pressure regulating valve 32 are controlled by the first solenoid proportional valve $17_1$ at the time of the first and the third speeds in which the changeover valve 13 is in the right position, and by the second solenoid proportional valve $17_2$ at the time of the second and the fourth speeds in which the changeover valve 13 is in the left position.

When the shift valve 30 is in the right position, the working oil from No. 34 oil passage L34 is supplied to the back pressure chamber of the lock-up clutch 2a via the shift valve 30 and No. 35 oil passage L35. Also, the internal space of the fluid toque converter 2 is connected to No. 37 oil passage L37 via No. 41 oil passage L41 and the pressure regulating valve 32 as well as via No. 36 oil passage L36 and the throttled portion 30a of the shift valve 30. Due to the oil discharge from the internal space via No. 37 oil passage L37, the internal pressure in the internal space is lowered, whereby the lock-up clutch 2a becomes a condition of being switched off, i.e., in a condition in which the engagement is released.

When the shift valve 30 is switched to the left position, the back pressure chamber of the lock-up clutch 2a is connected to No. 39 oil passage L39 via No. 35 oil passage L35 and the shift valve 30. While the changeover valve 31 is in the right position, the internal space of the fluid torque converter 2 is connected to No. 34 oil passage L34 via No. 36 oil passage L36 and the throttled portion 30a of the shift valve 30, as well as to No. 42 oil passage L42 via No. 41 oil passage L41 and the changeover valve 31. The differential pressure between the internal pressure in the internal space and the internal pressure in the back pressure chamber can be controlled for increase or decrease by that hydraulic pressure in No. 43 oil passage L43 which is inputted to the pressure regulating valve 32. In this manner, the lock-up clutch 2a is engaged, in a slipping condition, with an engaging force corresponding to the output pressure of the first solenoid proportional valve $17_1$ or the second solenoid proportional valve $17_2$.

When the hydraulic pressure in No. 43 oil passage L43 has become a predetermined value and above whereby the changeover valve 31 is switched to the left position, No. 42 oil passage L42 is opened to atmosphere and consequently the pressure regulating valve 32 is switched to, and retained in, the left position. The back pressure chamber of the lock-up clutch 2a thus remains connected to the oil discharge port 32b of the pressure regulating valve 32 via No. 35 oil passage L35, the shift valve 30, and No. 39 oil passage L39. On the other hand, the hydraulic oil is supplied from No. 34 oil passage L34 to the internal space of the fluid torque converter 2 via the shift valve 30, No. 38 oil passage L38, the changeover valve 31, and No. 36 oil passage L36. Further, since the connection between No. 41 oil passage L41 and No. 37 oil passage L37 is shut off by the switching of the pressure regulating valve 32 to the left position, the internal pressure inside the internal space is maintained at a relatively high pressure that is set by a check valve 33 which is connected to No. 41 oil passage L41. The lock-up clutch 2a is thus engaged in the locked up condition.

In the figure, numeral 34 denotes an oil cooler interposed in No. 37 oil passage L37, numeral 35 denotes a check valve for the oil cooler, numeral 36 denotes a throttle member which is interposed in a lubricating oil passage LB which supplies leaked oil from the regulator 18 to lubricated portions in each of the shafts 3, 5, 7 of the transmission.

Explanation will now be made about the control of the first and the second solenoid proportional valves $17_1$, $17_2$ at the time of speed changing. In the following explanations, the following definitions are used. Namely, the output pressure of the solenoid proportional valve which controls the hydraulic pressure of the hydraulic clutch on the engaging side to be engaged at the time of speed changing is defined to be an ON pressure. The output pressure of the solenoid proportional valve which controls the hydraulic pressure of the hydraulic clutch on the disengaging side to be disengaged or released at the time of speed changing is defined to be an OFF pressure.

The speed change control is largely classed into an upshifting control, a downshifting control, and an in-gear control (i.e., a control of gear-in or of gear engagement) at the beginning of switching from the "P" or "N" range (position) to the "$D_4$", "$D_3$", "2", "1" or "R" range. These controls are performed in the following manner by using the following values: i.e., proportional valve monitor values MAT which represent, as shown in FIG. 5A, the relationship in magnitude (high or low) of the output pressures of the first solenoid proportional valve $17_1$ and the second solenoid proportional valve $17_2$, and the control modes during the in-gear control; upshifting monitor values MUP which represent, as shown in FIG. 5B, the control modes of the ON pressure and the control modes of the OFF pressure at the time of upshifting; and downshifting monitor values MDN which represent, as shown in FIG. 5C, the control modes of the ON pressure and the control modes of the OFF pressure at the time of downshifting.

Figure 6:
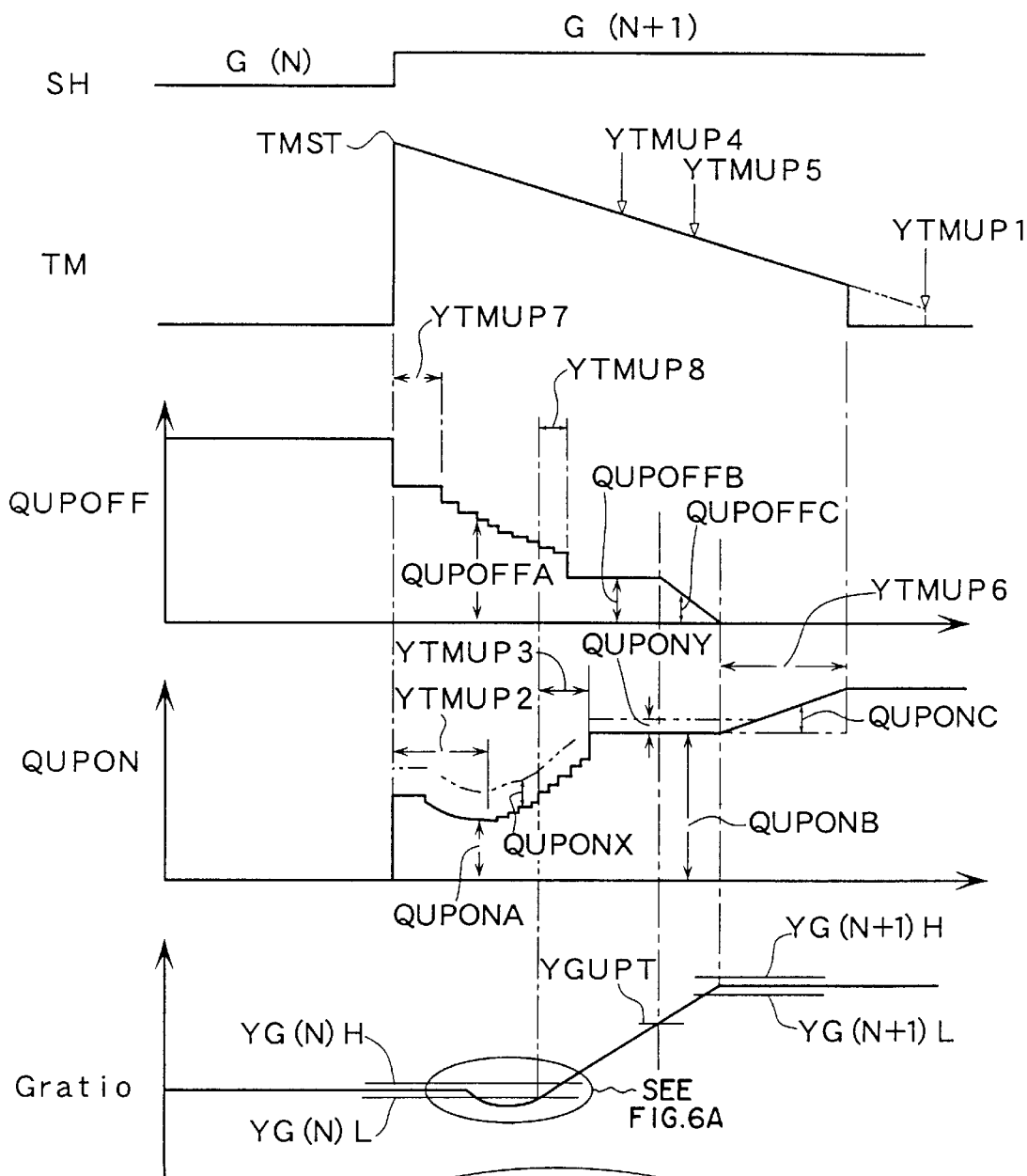
FIG. 6 is a time chart to show the changes in ON pressure, OFF pressure, and "Gratio" at the time of upshifting.
Figure 6A:
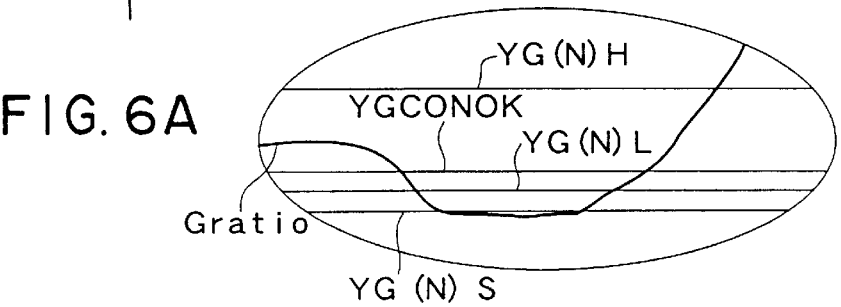

The upshifting control is performed in the procedures shown in FIG. 7. Details of this upshifting control will now be explained with reference to FIG. 6 which schematically shows the changes in the ON pressure, the OFF pressure, and the input and output speed ratio "Gratio" (Nout/Nin) of the transmission, respectively, at the time of upshifting. The "Gratio" may vary or fluctuate slightly depending on the pulsations in the speed detecting pulses, noises, or the like. However, when a hydraulic clutch has completely been engaged, "Gratio" will fall within a range between a predetermined upper limit value YG(N)H and a lower limit value YG(N)L which are based on a gear ratio of each speed stage.

The upshifting control is started when a speed stage designation signal SH which designates a speed stage to be established is switched to a signal which designates a higher speed stage G(N+1) than the speed stage G(N) that is now being established. In the upshifting control, MAT is first set to "A, B" in step S1. Once MAT has thus been set, the first and the second shift valves $12_1$, $12_2$ are switched to a condition in which the upshifting can be made. Then, in step 2, a discrimination is made whether the value (MUP(ON)) on the side of ON of MUP is "0" or not. MUP is initially set to "0,0" and, after making a judgement of "YES" in step S2, the program (or process) proceeds to step S3. In step S3, the remaining time TM of a subtractive timer (subtraction type of timer) built in the electronic control circuit 20 is set to a predetermined initial value TMST. Also, in step S4, initial setting is made of various kinds of values to be used in the operation (or computation) of the ON pressure and the OFF pressure. Then, in step S5, a setting of MUP(ON)=1 is made. Further, in step S6, a standard (or reference) value QUPONA of the ON pressure in a response pressure mode is computed (S6). The response pressure mode is a control mode in which a play of a piston in a hydraulic clutch on the engaging side is removed to thereby perform a subsequent clutch pressure increase with a good response. The value QUPONA is set to an appropriate value according to the vehicle speed and the throttle opening, and decreases with the lapse of time.

Then, the program proceeds to step S7, in which a check is made of a value of a flag FTIP which is set to "1" at the time of manual speed changing, i.e., at the time of speed changing by switching the ranges, or at the time of speed changing by lever operation in a transmission in which a step-wise speed changing (i.e., one speed stage at a time) by a lever operation is enabled. If FTIP=0, the program proceeds to step S8, in which the processing is performed of setting QUPON which is a command value of the ON pressure to QUPONA. If FTIP=1, the program proceeds to step S9, in which a processing is performed of setting QUPON to a value which is obtained by adding a predetermined boosting correction value QUPONX to QUPONA (S9). After the processing in steps S8 and S9, the program proceeds to step S10, in which a processing is performed of computing a command value QUPOFF of the OFF pressure, which is described in detail hereinafter. Then, the program proceeds to step S11, in which the following processing of selecting the proportional valves is performed. Namely, a command value of the output pressure of that solenoid proportional valve, between the first and the second solenoid proportional valves $17_1$, $17_2$, which controls the hydraulic pressure of the hydraulic clutch on the engaging side in the speed changing at this time is made to be QUPON, and a command value of the output pressure of the solenoid proportional valve which controls the hydraulic pressure of the hydraulic clutch on the disengaging side is made to be QUPOFF. The first upshifting control processing is thus completed.

In the next upshifting control processing, since the setting of MUP(ON)=1 has already been made in step S5 last time, a judgement of "NO" is made in step S2. At this time, the program proceeds to step S12 and a discrimination is made whether or not the time of lapse from the start of the upshifting (TMST−TM) has reached a predetermined time YTMUP1. The time YTMUP1 is set longer than an ordinary time required for upshifting. When TMST−TM≧YTMUP1, a judgement is made that an upshifting control has failed, and the program proceeds to step S13. In step S13, a processing to complete the upshifting in which MAT is set to "A,0" (at the time of upshifting from the second speed to the third speed), or to "0,B" (at the time of upshifting other than from the second speed to the third speed), and MUP is set to "0,0", and also TM is reset to zero is performed. When MAT is set to "A,0" or "0,B" in this processing, the changeover valve 13 is switched to a position which is different from the present position, whereby the hydraulic pressure in the hydraulic clutch on the engaging side becomes the line pressure and the hydraulic pressure of the hydraulic clutch on the disengaging side becomes atmospheric pressure.

Figure 8:
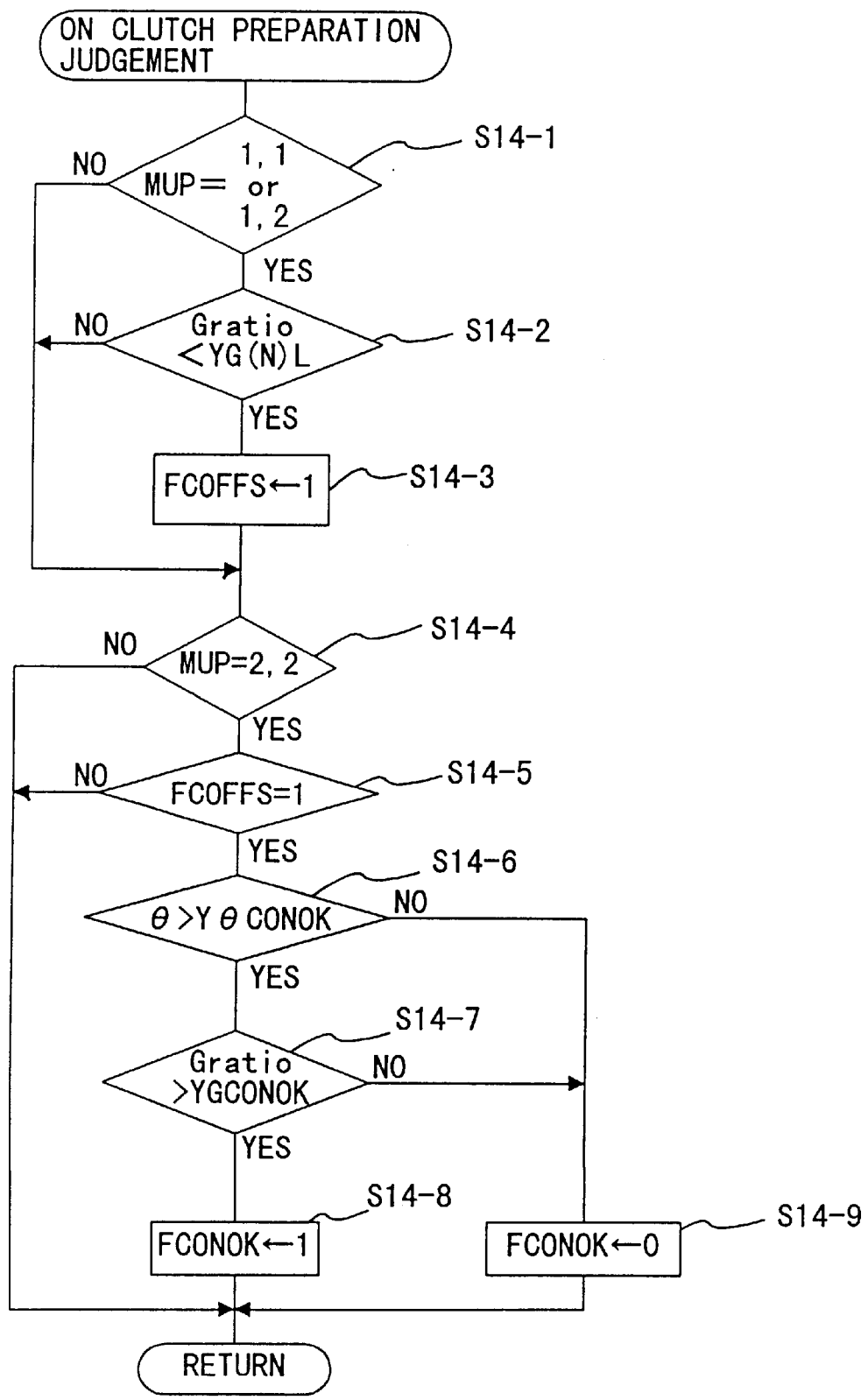
FIG. 8 is a flow chart to show the contents of control in step S14 in FIG. 7.

If TMST−TM<YTMUP1, the program proceeds to step S14 to judge whether the preparation for engagement of the hydraulic clutch on the engaging side (ON clutch) has been made or not. Details of this processing are shown in FIG. 8. First, a discrimination is made in step S14-1 whether or not MUP is "1,1" or "1,2". If the result of the discrimination is "YES", the program proceeds to step S14-2. In step S14-2, a discrimination is made whether "Gratio" has fallen below that lower limit value YG(N)L for judging the clutch engagement which is set based on the gear ratio of the speed stage established before speed changing. If "Gratio"<YG(N)L, the program proceeds to step S14-3, in which a flag FCOFFSto be reset to "0" in the above-described step S4 is set to "1". Then, in step S14-4, a discrimination is made whether MUP is "2,2" or not. If the result of this discrimination is "YES", the program proceeds to step S14-5 to discriminate whether FCOFFS=1 or not. If FCOFFS=1, a discrimination is made in step S14-6 whether the throttle opening θ exceeds a predetermined value YθCONOK or not. If θ>YθCONOK, the program proceeds to step S14-7, in which a discrimination is made whether "Gratio" exceeds a predetermined value YGCONOK which is set a little larger than YG(N)L. If "Gratio">YGCONOK, the program proceeds to step S14-8, in which a flag FCONOK to be reset to "0" in step S4 is set to "1". In case θ≦YθCONOK or "Gratio"≦YGCONOK, the program proceeds to step S14-9, in which FCONOK is reset to "0".

It is when slipping has occurred in the hydraulic clutch on the disengaging side by the control of the OFF pressure in a subtraction mode, which is described hereinafter, that the condition of "Gratio"<YG(N)L is satisfied when MUP is "1,1" or "1,2". Further, it is when the hydraulic clutch on the engaging side has begun to secure an engaging force, i.e., when the preparation for engaging the hydraulic clutch on the engaging side has been completed by the control of the ON pressure in an addition mode, which is described hereinafter, that the condition of "Gratio">YGCONOK is satisfied when MUP is "2,2". If the condition of "Gratio"<YG(N)L is not satisfied when MUP is "1,1" or "1,2", then FCOFFS is not set to "1". In this case, even if the condition of "Gratio">YGCONOK has been satisfied when MUP is "2,2", FCONOK remains to be zero (FCONOK=0).

The degree of change in the engine output torque with the degree of throttle opening becomes large in a small throttle opening region. When the throttle opening becomes small, the output torque largely decreases. As a consequence, the slipping of the hydraulic clutch on the disengaging side decreases to thereby sometimes satisfy the condition of "Gratio">YGCONOK. Therefore, in the small throttle opening region in which θ≦YθCONOK, FCONOK is made to be zero (FCONOK=0), and the setting of FCONOK based on "Gratio" is made only in the medium/large throttle opening region in which the output torque does not largely vary. The setting of FCONOK=1 is thus prevented when the preparation for engagement of the hydraulic clutch on the engaging side has not been made yet.

After having made the processing of judging whether the preparation for engagement of the hydraulic clutch on the engaging side has been made or not as described above, a discrimination is made in step S15 whether MUP(ON)=1 or not. Since in the second upshifting control processing, MUP(ON) has already been set to 1 (MUP(ON)=1), a judgement of "YES" is made in step S15. The program proceeds to step S16, in which a discrimination is made whether the time of lapse from the start of upshifting (TMST–TM) has reached a predetermined time YTMUP2 or not. If TMST–TM<YTMUP2, the program proceeds to S5 and following steps (i.e., steps that follow). When TMST–TM≧YTMUP2, the program proceeds to step S17, in which the value of MUP on the ON side is set to "2". Then, ΔQUPONA is set to a relatively small value in step S18' and the program proceeds to step S18, in which an adding processing is performed to make QUPONA to a value which is obtained by adding ΔQUPONA to the preceding value of QUPONA. The program then proceeds to step S7 and following steps. In this manner, a control in the addition mode to increase stepwise the ON pressure is started.

When a setting of MUP(ON)=2 is made in step S17, a determination of "NO" is made in step S15 in the next upshifting control processing. The program thus proceeds to step S19, in which a discrimination is made whether MUP (ON)=2 or not. Here, a discrimination of "YES" is made and the program proceeds to step S20, in which a discrimination is made whether "Gratio" has exceeded that upper limit value YG(N)H for Judging the engagement of the hydraulic clutch which is set based on the gear ratio of the speed stage established before speed changing. Then, if "Gratio"<YG (N)H, the program proceeds to step S21 to discriminate whether FCONOK=1 or not. If FCONOK=0, the program proceeds to step S17 and following steps to continue the control in the addition mode.

If FCONOK=1, the value of TM at that time is stored in step S22 as TMSTA. Then, after setting MUP to "3,3" in step S23, the program proceeds to step S25 and following steps. In the next upshifting control processing, a determination of "NO" is made in step S19. The program thus proceeds to step S24, in which a discrimination is made whether MUP (ON)=3 or not, and a discrimination of "YES" is made therein. At this time, YTMUP3 is set in step S25, and the program then proceeds to step S26, in which a discrimination is made whether the time of lapse from the time when CONOK=1 has been attained, i.e., from the time when the preparation for engagement of the hydraulic clutch on the engaging side has been completed (TMSTA–TM) has reached YTMUP3 or not. The value YTMUP3 is set to a table value which has the vehicle speed V as a parameter, such that YTMUP3 becomes longer with the increase in the vehicle speed. While TMSTA–TM<YTMUP3, ΔQUPONA is set to a relatively large value in step S18", and the program proceeds to step S18 and following steps. The control in the addition mode is thus continued.

When TMSTA–TM≧YTMUP3, the program proceeds to step S27, in which a discrimination is made whether FTIP=1 or not. If FTIP=0, the program proceeds to step S28, in which a reference value QUPONB of the ON pressure in a bottom up mode is set to a value which is obtained by adding to the final value of QUPONA a value QUPONB0 to be obtained depending on the vehicle speed and the throttle opening. If FTIP=1, the program proceeds to step S29, in which QUPONB is set to a value which is obtained by further adding to the above-described value a predetermined boosting correction value QUPONY. The value QUPONY is set to a value which is smaller than the boosting correction value QUPONX to be added in step S9. When the processing of setting QUPONB in step S28 or S29 is completed, the program proceeds to step S30, in which a setting of MUP (ON)=4 is made. Then, in step S31, QUPON is set to QUPONB, thereby starting the control of the ON pressure in the bottom up mode. When a discrimination of "Gratio">YG (N)H is made in step S20, MUP is set to "3,3" in step S32 and the program proceeds directly to step S27.

In the next upshifting control processing, since the setting of MUP(ON)=4 has already been made in step S30 last time, a judgement of "NO" is made in step S24. The program thus proceeds to step S33 for discriminating whether MUP (ON)=4 or not, and a judgement of "YES" is made therein. At this time, the program proceeds to step S34, in which a discrimination is made whether the time of lapse from the start of upshifting (TMST–TM) has reached a predetermined time YTMUP4. While TMST–TM<YTMUP4, the program proceeds to step S27 and following steps and the control in the bottom up mode is continued. When TMST–TM≧YTMUP4, a discrimination is made in step S35 whether "Gratio" has exceeded a predetermined value YGUPT or not. While "Gratio"<YGUPT, the program proceeds to step S27 and following steps to continue the control in the bottom up mode.

When "Gratio"≧YGUPT, the program proceeds to step S36 to set MUP to "5,5" and then proceeds to step S37, in which the value of TM at that time is stored as TMSTB. Then, the program proceeds to step S38, in which QUPON is set to a value which is obtained by adding QUPONC to the final value of QUPONB. Since the value of QUPONC has already been reset to zero in step S4, QUPON becomes equal to QUPONB (QUPON=QUPONB), and the control in the bottom up mode is continued.

In the next upshifting control processing, since MUP has already been set to "5,5" in step S36 last time, a judgement of "NO" is made in step S33, and the program proceeds to step S39 for discriminating whether MUP(ON)=5 or not, and a judgement of "YES" is made therein. At this time, a discrimination is made in step S40 whether the time of lapse from the start of upshifting (TMST−TM) has reached a predetermined time YTMUP5. If TMST−TM≧YTMUP5, the program proceeds to step S41, in which a discrimination is made whether "Gratio" is above that lower limit value YG(N+1)L for judging the clutch engagement which is set based on the gear ratio of the speed stage established after speed changing. If TMST−TM<YTMUP5 or "Gratio"<YG (N+1), the program proceeds to step S36 and following steps, and the control in the bottom up mode is continued.

When "Gratio"≧YG(N+1)L, MUP is set to "7,7" in step S42 and the program then proceeds to step S43, in which QUPONC is set to a value which is obtained by adding a predetermined value ΔQUPONC to the previous value of QUPONC. Then, in step S44, a discrimination is made whether "Gratio" lies within a range between those lower limit value YG(N+1)L and upper limit value YG(N+1)H for judging the clutch engagement which are set based on the gear ratio of the speed stage established after speed changing. If the result of this discrimination is "NO", the program proceeds to step S37 and following steps. In this case, since QUPONC increases by ΔQUPONC in the operation (or computation) in step S43, QUPON to be obtained in step S38 also gradually increases, and the control of the ON pressure in an end mode is started.

In the next upshifting control processing, since MUP has already been set to "7,7" in step S42 last time, a judgement of "NO" is made in step S39, and the program proceeds to step S42 and following steps. In this case, if YG(N+1) L≦"Gratio"≦YG(N+1)H, i.e., if the clutch on the engaging side has completed engagement, the program proceeds to step S45. In step S45, a discrimination is made whether the time of duration of engagement completion (TMSTB−TM) has reached a predetermined time YTMUP6. While TMSTB−TM<YTMUP6, the program proceeds to step S38 and the control in the end mode is continued. When TMSTB−TM≧YTMUP6, the program proceeds to step S13, in which a processing of upshifting completion is performed.

Figure 9:
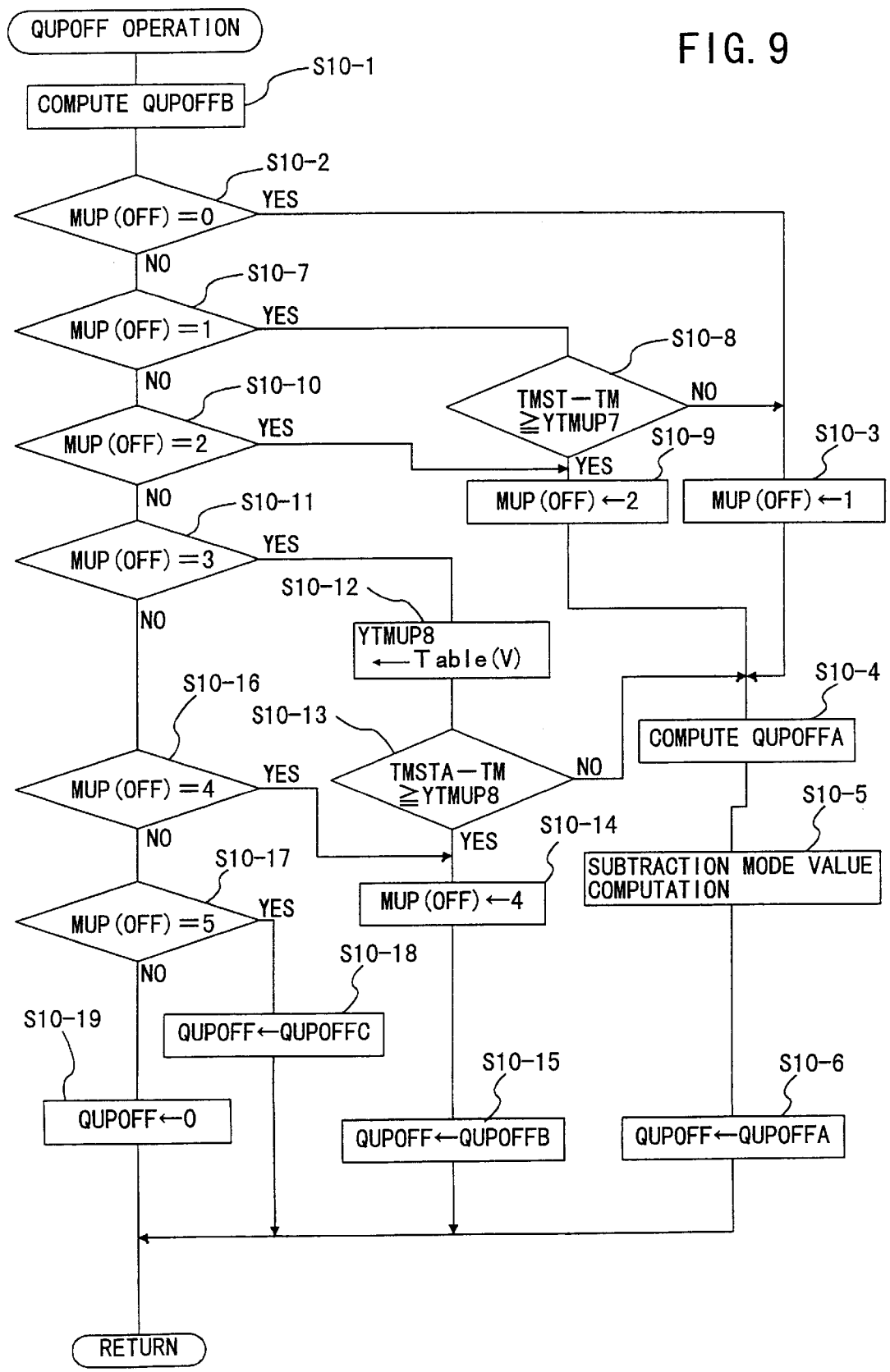
FIG. 9 is a flow chart to show the contents of control in step S10 in FIG. 7.
Figure 10:
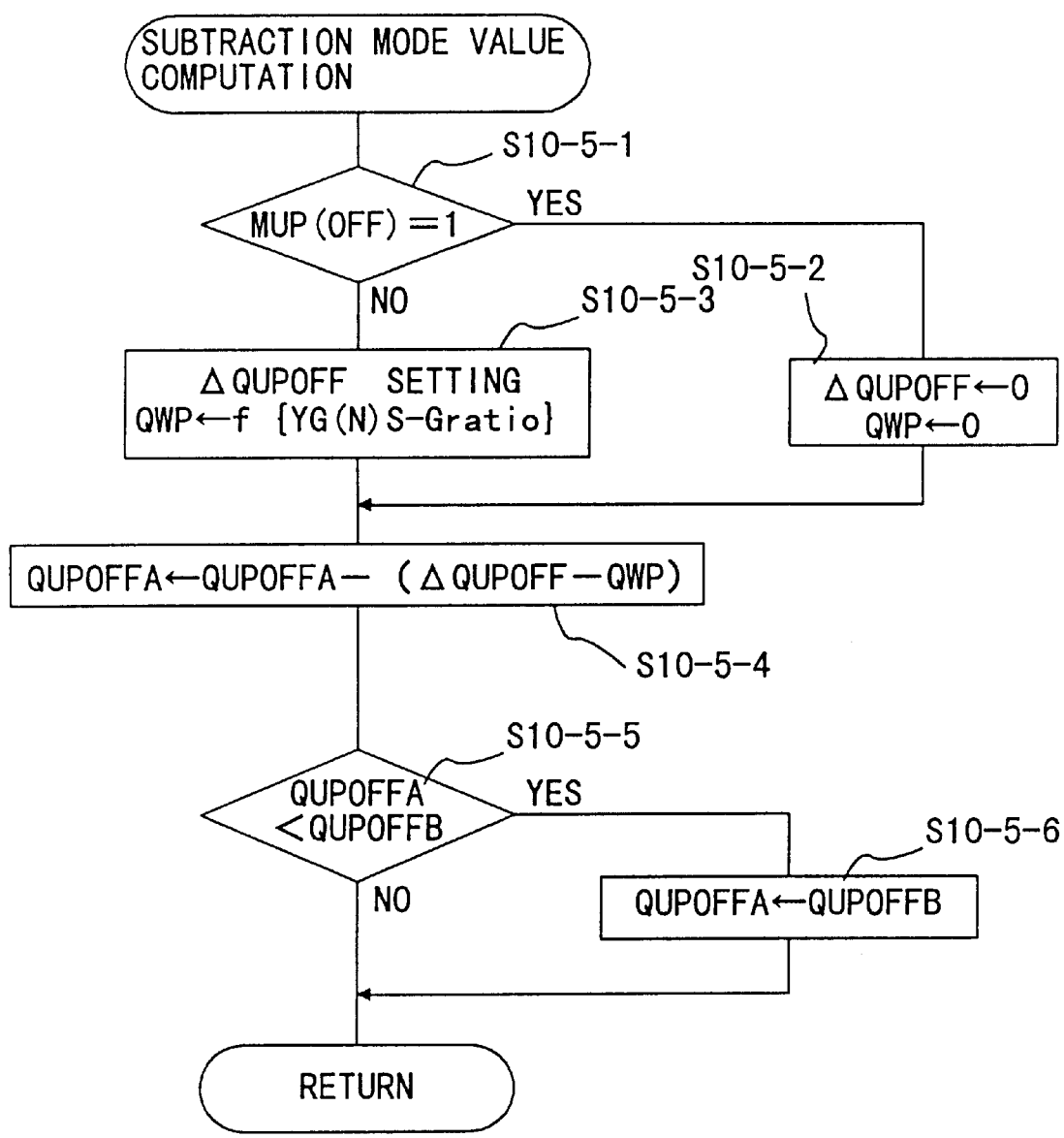
FIG. 10 is a flow chart to show the contents of control in step S10-5 in FIG. 9.

Details of operational processing of QUPOFF in step S10 are shown in FIG. 9. First, in step S10-1, the value QUPOFFB of the OFF pressure in a bottom down mode is set to an appropriate value depending on the throttle opening. Then, in step S10-2, a discrimination is made whether the value of MUP on the OFF side (MUP(OFF)) is "0" or not. Since MUP(OFF) has already been set to zero (MUP (OFF)=0) in the upshifting control processing in the first time, a judgement of "YES" is made in step S10-2. The program thus proceeds to step S10-3, in which a setting of MUP(OFF)=1 is made. Then, the program proceeds to step S10-4, in which a standard (reference) value QUPOFFA of the OFF pressure in an initial pressure mode is set to an appropriate value depending on the throttle opening and the speed ratio of the fluid torque converter 2. Further, in step S10-5, a processing of operating (computing) a value of the OFF pressure in the subtraction mode is performed. Details of this processing are shown in FIG. 10. First, in step S10-5-1, a discrimination is made whether MUP(OFF)=1 or not. If MUP(OFF)=1, both a subtraction value ΔQUPOFF and a feedback correction value QWP are reset to zero in step S10-5-2. If MUP(OFF)≠1, ΔQUPOFF is set to a predetermined value in step S10-5-3 and, also, QWP is computed by a functional operation from a deviation between "Gratio" at the present time and that target value of clutch slipping YG(N)S which is set a little lower than the lower limit value YG(N)L for judging the clutch engagement, the lower limit value being set based on the gear ratio of the speed stage established before speed changing. Then, in step S10-5-4, there is performed a processing to make QUPOFFA to a value which is obtained by subtracting ΔQUPOFF− QWP from the value of QUPOFFA that is set in step S10-4. Finally, by the processing in steps S10-5-5 and S10-5-6, QUPOFFA is made so as not fall below QUPOFFB.

After the processing in step S10-5 has been completed as described above, in step S10-6, a processing is made of making QUPOFF to QUPOFFA. An operational processing of QUPOFF in the first time of upshifting control processing is thus completed. In the second time of upshifting control processing, since the setting of MUP(OFF)=1 has already been made in step S10-3 last time, a judgement of "NO" is made in step S10-2. The program thus proceeds to step S10-7 for making a discrimination as to whether MUP (OFF)=1 or not, and a judgement of "YES" is made therein. At this time, the program proceeds to step S10-8, in which a discrimination is made whether the time of lapse from the start of upshifting (TMST−TM) has reached a predetermined time YTMUP7. If TMST−TM<YTMUP7, the program proceeds to step S10-3 and following steps. In this case, QUPOFF becomes equal to the value of QUPOFFA which is obtained in step S10-4, and the control in the initial pressure mode is performed.

When TMST−TM ≧YTMUP7, a setting of MUP (OFF)=2 is made in step S10-9 and then the program proceeds to step S10-4. In this case, QUPOFF becomes a value which is obtained in step S10-4 by subtracting ΔQUPOFF−QWP from QUPOFFA, and a control in the subtraction mode is started. In the next processing of upshifting control, since the setting of MUP(OFF)=2 has already been made in step S10-9 last time, a judgement of "NO" is made in step S10-7. The program thus proceeds to step S10-10 for making a discrimination as to whether MUP(OFF)=2 or not. A judgement of "YES" is made therein and the program proceeds to step S10-9 and following steps, and the control in the subtraction mode is continued. In the subtraction mode, QUPOFF sequentially decreases, and the hydraulic clutch on the disengaging side begins to slide, with the result that "Gratio" falls below YG(N)L. When "Gratio"<YG(N)S, a condition of QWP>0 is attained and the subtraction range of QUPOFFA becomes smaller. A feedback control is thus made so as to attain a condition of "Gratio"=YG(N)S.

When MUP is set to "3,3" in the above-described step S23 or S32, a discrimination of "NO" is made in step S10-10. The program thus proceeds to step S10-11 for making a discrimination as to whether MUP(OFF)=3 or not, and a judgement of "YES" is made therein. At this time, after setting YTMUP8 in step S10-12, the program proceeds to step S10-13, in which a discrimination is made whether the time of lapse from the time of completion of preparation for engagement of the hydraulic clutch on the engaging side (TMSTA−TM) has reached YTMUP8. The value YTMUP8 is set to a table value with the vehicle speed V as a parameter so that it becomes shorter with the increase in the vehicle speed. While TMSTA−TM<YTMUP8, the program proceeds to step S10-4 and following steps and the control in the subtraction mode is continued. When TMSTA− TM≧YTMUP8, a setting of MUP(OFF)=4 is made in step S10-14, and the program then proceeds to step S10-15. In step S10-15, QUPOFF is set to QUPOFFB, and the control in the bottom down mode is started. In the next processing of upshifting control, since the setting of MUP(OFF)=4 has already been made last time in step S10-14, a judgement of "NO" is made in step S10-11. The program thus proceeds to step S10-16 for making a discrimination as to whether MUP(OFF)=4 or not. A judgement of "YES" is made therein and the program proceeds to step S10-14 and following steps, and a control in the bottom down mode is continued.

When MUP is set to "5,5" in the above-described step S36, a judgement of "NO" is made in step S10-16. The program thus proceeds to step S10-17 for making a discrimination as to whether MUP(OFF)=5 or not, and a judgement of "YES" is made therein. At this time, the program proceeds to step S10-18, and QUPOFF is set to a value QUPOFFC which gradually decreases from QUPOFFB depending on "Gratio". A control in a tail mode is thus performed. Then, when MUP has been set to "7,7" in the above-described step S42, a judgement of "NO" is made in step S10-17. The program thus proceeds to step S10-19, and a control is performed in the end mode in which QUPOFF is made to zero.

In the above-described upshifting control, by the control of the OFF pressure in the subtraction mode, the OFF pressure is feedback-controlled so that "Gratio" becomes YG(N)S. A slight slipping thus occurs in the hydraulic clutch on the disengaging side. Since the control of the ON pressure in the addition mode is performed in this condition, "Gratio" sensitively varies with the engaging force of the hydraulic clutch on the engaging side. Therefore, the point of time of completion of preparation for engagement of the hydraulic clutch on the engaging side can be detected by the increase in "Gratio" to YGCONOK. Conventionally, the following arrangement is also known. Namely, in order to prevent the engine from racing, the ON pressure is gradually increased while controlling the OFF pressure such that the hydraulic clutch on the disengaging side does not slip, i.e., such that the "Gratio" lies within a range between YG(N)L and YG(N(H). When "Gratio" has exceeded YG(N)H as a result of decrease in the rotational speed of the input shaft due to simultaneous engagement of the hydraulic clutch on the disengaging side and the hydraulic clutch on the engaging side, a judgement is made that the speed change condition has transferred to an inertia phase. The OFF pressure is then rapidly decreased and, further, the ON pressure is rapidly increased. However, if the rate of gradual increase in the ON pressure is made large, the engaging force of the hydraulic clutch on the engaging side at the time of transferring to the inertia phase becomes excessive, resulting in the occurrence of shocks. Therefore, the rate of gradual increase in the ON pressure cannot be made so large and, consequently, it takes much time for the speed change condition to transfer to the inertia phase. This results in a longer time required in the speed changing. On the other hand, in the present embodiment, the completion of preparation for engagement of the hydraulic clutch on the engaging side is detected as described above, and the OFF pressure is rapidly decreased by switching to the bottom down mode at a lapse of YTMUP8 from the point of time of completion of preparation for engagement. Therefore, the speed change condition can be transferred at an early time to the inertia phase (a condition of "Gratio">YG(N)H) while preventing the engine from racing, thereby enabling to reduce the time required for speed changing. Further, in the present embodiment, since the rate of gradual increase in the ON pressure in the addition mode is increased from the point of time of completion of preparation for engagement, the transferring to the inertia phase can still further be accelerated.

When the vehicle speed becomes high, a delay occurs in the decrease or drop in the hydraulic pressure in the hydraulic clutch on the disengaging side under the influence of centrifugal force. In the present embodiment, however, since YTMUP8 is set so as to become shorter with the increase in the vehicle speed, the timing of switching of the OFF pressure to the bottom down mode is accelerated at a high vehicle speed. Therefore, the occurrence of shocks is prevented as a result of increase in simultaneous engagement due to a delay in the pressure decrease in the hydraulic clutch on the disengaging side at a high vehicle speed. Further, in the present embodiment, in order to accelerate the speed changing after having transferred to the inertia phase, the ON pressure is rapidly increased by the switching to the bottom up mode at a lapse of YTMUP3 from the point of time of completion of preparation for engagement of the hydraulic clutch on the engaging side. However, since YTMUP3 is set so as to become longer with the increase in the vehicle speed, the occurrence of shocks due to an increase in simultaneous engagement at a high vehicle speed can surely be prevented.

If the control of the OFF pressure in the subtraction mode has failed, a condition of "Gratio">YG(N)H sometimes occurs by the simultaneous engagement due to an increase in the ON pressure while giving rise to slipping in the hydraulic clutch on the disengaging side. In such a case, by judging that the speed change condition has transferred to the inertia phase, the control mode of the OFF pressure and the control mode of the ON pressure are immediately switched to the bottom down mode and the bottom up mode, respectively.

At the time of manual speed changing in which a condition of FTIP=1 is satisfied, it is desired to shorten the speed change time below that at the time of automatic speed changing. For that purpose, in the present embodiment, the ON pressure is corrected by boosting at the time of manual speed changing, thereby shortening the speed change time. Further, in the present embodiment, the boosting correction value QUPONX in the response pressure mode and the addition mode before the transferring to the inertia phase is set to a relatively large value, thereby shortening the time to the transferring to the inertia phase. Further, the boosting correction value QUPONY in the bottom up mode after transferring to the inertia phase is set to a relatively small value, thereby preventing the shocks from becoming large.

Figure 11:
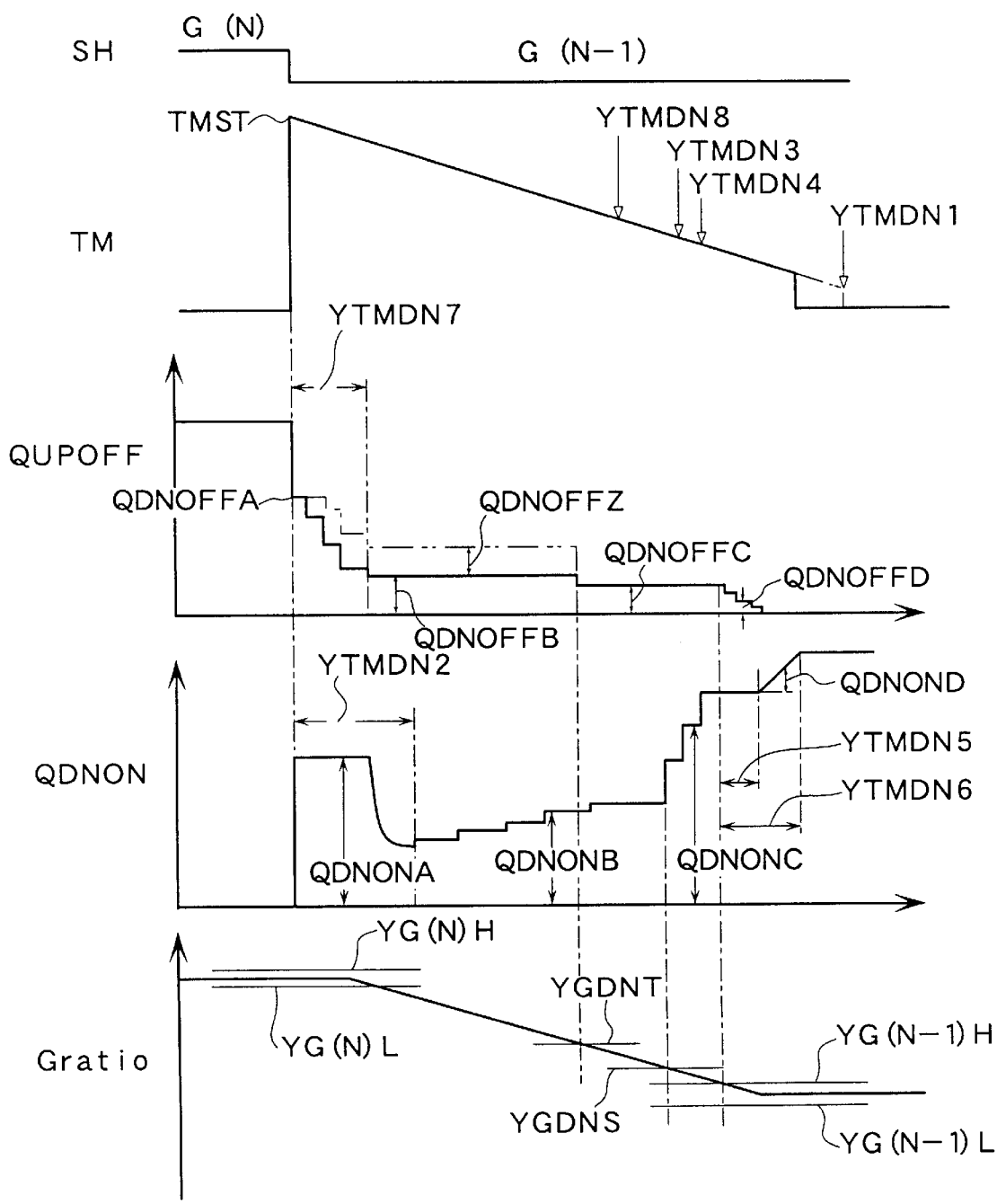
FIG. 11 is a time chart to show the changes in ON pressure, OFF pressure, and "Gratio" at the time of downshifting.

The downshifting control is performed in the procedures shown in FIG. 12. Details thereof are explained with reference to FIG. 11 which schematically shows the changes in the ON pressure, the OFF pressure, and the "Gratio", respectively, at the time of downshifting.

The downshifting control is started when the speed stage designation signal SH is switched to a signal which designates a lower speed stage G(N−1) than the speed stage G(N) that is now being established. In the downshifting control, MAT is first set to "A,B" in step S101. When MAT has thus been set, the changeover valve 13 is switched to a position which is different from the present position. Then, a discrimination is made in step S102 whether the value of MDN on the ON side (MDN(ON)) is "0" or not. Since MDN is initially set to "0,0", a judgement of "YES" is made in step S102. The program thus proceeds to step S103, in which TM is set to TMST. Further, in step S104, initial setting is made of various values to be used in the operation (or computation) of the ON pressure and the OFF pressure. Then, after passing through a step of S104' which is described hereinafter, the program proceeds to step S105, in which a setting of MDN(ON)=1 is made. Further, in step S106, a value QDNONA of the ON pressure in the response pressure mode is set to an appropriate value depending on the vehicle speed and the throttle opening. The value QDNONA decreases with the lapse of time. Then, in step S107, a command value QDNON of the ON pressure is set to QDNONA, and an operational processing of the command value QDNOFF of the OFF pressure to be described hereinafter is performed in step S108. Thereafter, the program proceeds to step S109, in which the selection processing of proportional valves is performed in the following manner. Namely, between the solenoid proportional valves $17_1$, $17_2$, a command value of the output pressure of the solenoid proportional valve which controls the hydraulic pressure of a hydraulic clutch on the engaging side in the speed change at this time is made to be QDNON, and a command value of the output pressure of the solenoid proportional valve which controls the hydraulic pressure of a hydraulic clutch on the disengaging side is made to be QDNOFF. The downshifting control processing of the first time is thus completed.

In the next downshifting control processing, since the setting of MDN(ON)=1 has already been made in step S105 last time, a judgement of "NO" is made in step S102. At this time, the program proceeds to step S110, in which a discrimination is made whether the time of lapse from the start of downshifting (TMST-TM) has reached a predetermined time YTMDN1. The value YTMDN1 is set to a value which is slightly longer than an ordinary time required for downshifting. When TMST-TM $\geq$ YTMDN1, a judgement is made that the downshifting control has failed, and the program thus proceeds to step S111. In this step, there is performed a downshifting completion processing in which MAT is set to "0,B" (at the time of downshifting from the third speed to the second speed) or to "A,0" (at the time of downshifting other than from the third speed to the second speed). Further, MDN is reset to "0,0", and TM is reset to zero. When MAT is set to "0,B" or "A,0" in this processing, the positions of the first and the second shift valves $12_1$, $12_2$ are switched to the condition of performing the downshifting. The hydraulic pressure in the hydraulic clutch on the engaging side becomes the line pressure, and the hydraulic pressure in the hydraulic clutch on the disengaging side becomes atmospheric.

If TMST-TM<YTMDN1, the program proceeds to step S112 and a discrimination is made whether MDN(ON)=1 or not. In the second downshifting control processing, since MDN(ON)=1, a judgement of "YES" is made in step S112. The program thus proceeds to step S113, in which a discrimination is made whether "Gratio" has exceeded a predetermined value YGDNS or not. If "Gratio">YGDNS, the program proceeds to step S114, in which a discrimination is made whether the time of lapse from the start of downshifting (TMST-TM) has reached a predetermined time YTMDN2. If TMST-TM<YTMDN2, the program proceeds to step S105 and following steps to thereby perform the control of the ON pressure in the response pressure mode.

When "Gratio"$\leq$YGDNS or TMST-TM$\geq$YTMDN2, the program proceeds to step S115, in which a setting of MDN(ON)=2 is made, and then proceeds to step S116, in which the value QDNONB of the ON pressure in a low pressure correction mode is set to an appropriate value depending on the vehicle speed and the throttle opening. In step S117, there is performed an annealing processing in which QDNONB is gradually changed from QDNONA to a value to be set as above. Then, in step S118, QDNON is set to QDNONB to thereby start the control of the ON pressure in the low pressure correction mode.

In the next downshifting control processing, since the setting of MDN(ON)=2 has already been made in step S115 last time, a judgement of "NO" is made in step S112. The program thus proceeds to step S119 for making a discrimination as to whether MDN(ON)=2 or not, and a judgement of "YES" is made therein. At this time, the program proceeds to step S120 and a discrimination is made whether "Gratio" has exceeded YGDNS or not. If "Gratio">YGDNS, the program proceeds to step S121, and a discrimination is made whether the time of lapse from the start of downshifting (TMST-TM) has reached a predetermined value YTMDN3. If TMST-TM<YTMDN3, the program proceeds to step S115 and following steps to continue the control in the low pressure correction mode.

Once "Gratio"$\leq$YGDNS, MDN is set to "3,3" in step S122 and the program then proceeds to step S123. If the condition of TMST-TM$\geq$YTMDN3 is satisfied while "Gratio">YGDNS, the program proceeds directly to step S123, in which a setting of MDN(ON)=3 is made. Then, in step S124, a standard (reference) value QDNONC of the ON pressure in a synchronous mode is set to an appropriate value depending on the vehicle speed and the throttle opening. In step S125, an annealing processing to gradually change QDNONC from QDNONB to the above-described value is performed. Then, the program proceeds to step S126, in which a check is made of a value of a flag FTBD which is set to "1" when the speed stage designating signal SH is switched, during the downshifting control, to a signal specifying a speed stage G(N-2) of further lower speed. Then, if FTBD=0, the program proceeds to step S127, in which QDNON is set to a value which is obtained by adding QDNOND to QDNONC. The value QDNOND is set to zero in the initial setting and, therefore, the condition becomes QDNON=QDNONC. The control of the ON pressure in the synchronous mode is thus started.

In the next downshifting control processing, since the setting of MDN(ON)=3 has already been made in step S123 last time, a judgement of "NO" is made in step S119. The program thus proceeds to step S128 for making a discrimination as to whether MDN(ON)=3 or not, and a judgement of "YES" is made therein. At this time, the program proceeds to step S129, in which a discrimination is made whether the time of lapse from the start of downshifting (TMST-TM) has reached a predetermined time YTMDN4. If TMST-TM<YTMDN4, the program proceeds to step S123 and following steps and the control in the synchronous mode is continued.

Once TMST-TM$\geq$YTMDN4, the program proceeds to step S130, in which a discrimination is made whether "Gratio" has fallen below that upper limit value YG(N-1)H for judging the engagement of hydraulic clutch which is set based on the gear ratio of the speed stage to be established after speed changing. When "Gratio"$\leq$YG(N-1)H, the program proceeds to step S131, in which, by using a timer value TMSTC which is set to a value of TM at the time when a condition of "Gratio"$\leq$YG(N-1)H has been satisfied, a discrimination is made whether the time of lapse from the point of time when the condition of "Gratio"$\leq$YG(N-1)H has been satisfied (TMSTC-TM) has reached a predetermined time YTMDN5. Then, when "Gratio">YG(N-1)H or TMSTC-TM<YTMDN5, the program proceeds to step S123 and following steps, and the control in the synchronous mode is continued. Once TMSTD-TM$\geq$YTMDN5, the program proceeds to step S132 and a discrimination is made whether FTBD=1 or not. If FTBD=0, a setting of MDN (ON)=4 is made in step S133 and then QDNONC is set to an appropriate value in step S134 depending on the vehicle speed and the throttle opening. Further, in step S135, QDNOND is set to a value which is obtained by adding $\Delta$QDNOND to the previous value of QDNOND. Then, in step S136, a discrimination is made whether "Gratio" lies within a range of the upper limit value YG(N−1)H and the lower limit value YG(N−1)L for judging the engagement of hydraulic clutch, which values are set based on the gear ratio of the speed stage to be established after speed changing. If the result of this discrimination is "NO", TMSTD is set in step S137 to the value of TM at that time, and the program then proceeds to step S127. In this case, since QDNOND increases by ΔQDNOND by the operation (or computation) in step S135, QDNON to be obtained in step S127 also gradually increases, and the control of the ON pressure in the end mode is started.

In the next downshifting control processing, since the setting of MDN(ON)=4 has already been made in step S133 last time, a judgement of "NO" is made in step S128. The program thus proceeds to step S132 and following steps and the control in the end mode is continued. Then, when a judgement of "YES" is made in step S136, the program proceeds to step S138. In this step, a discrimination is made whether the time in which "Gratio" continuously lies within the range of YG(N−1)H and YG(N−1)L, i.e., the time of duration of the condition of engagement completion of the hydraulic clutch on the engaging side (TMSTD−TM) has reached a predetermined time YTMDN6. Once TMSTD−TM≧YTMDN6, the program proceeds to step S111 and a downshifting completion processing is performed.

If a judgement of FTBD=1 is made in step S126 or S132, the program proceeds directly to step S111 and the downshifting completion processing is performed. The processing of setting FTBD is shown in FIG. 27. During downshifting control processing to downshift to a speed stage of one lower speed stage G(N−1), if a downshifting command is issued to downshift to a still lower speed stage G(N−2) (S1201, S1202), a setting of FTBD=1 is made (S1203). In the cases other than the above, a resetting of FTBD=0 is made (S1204).

Figure 13A:
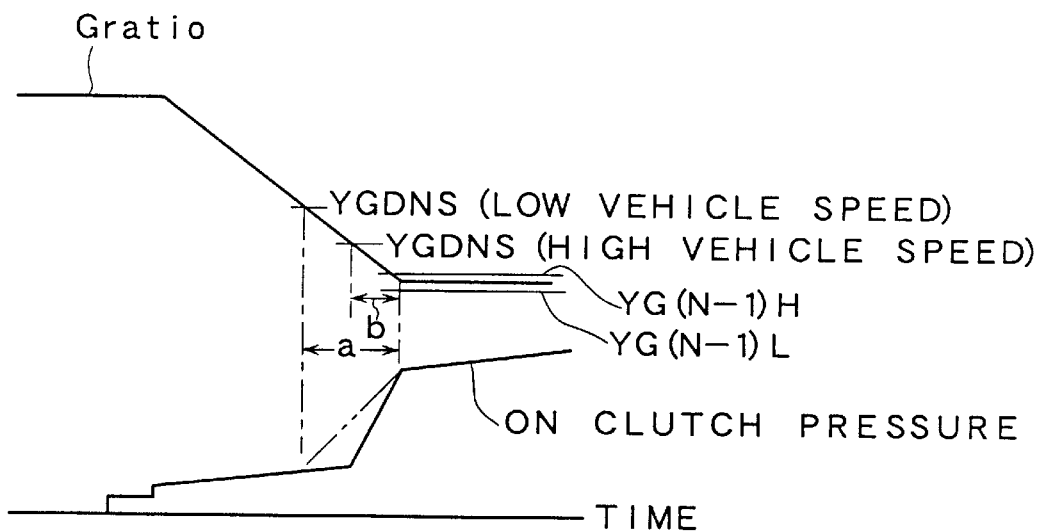
FIG. 13A is a graph to show the setting by "Gratio" of a value YGDNS for discriminating the speed change progress condition depending on the vehicle speed.

According to the above-described control, when "Gratio"≦YGDNS, the ON pressure rises by the transfer to the synchronous mode. There is, however, a response delay until the actual hydraulic pressure of the hydraulic clutch on the engaging side (hereinafter referred to as ON clutch pressure) rises. This response delay is short at a high vehicle speed and long at a low vehicle speed due to the influence of a centrifugal force. Therefore, as shown in FIG. 13A, the following arrangement is made. Namely, considering the difference between the response delay "a" at a low vehicle speed and a response delay b at a high vehicle speed, YGDNS is set relatively high at a low vehicle speed and is set relatively low at a high speed, so that at the time when "Gratio" has entered the synchronous region between YG(N−1)H and YG(N−1)L, the ON clutch pressure is boosted, regardless of the vehicle speed, to a predetermined pressure at which no slipping in the hydraulic clutch occurs.

Figure 13B:
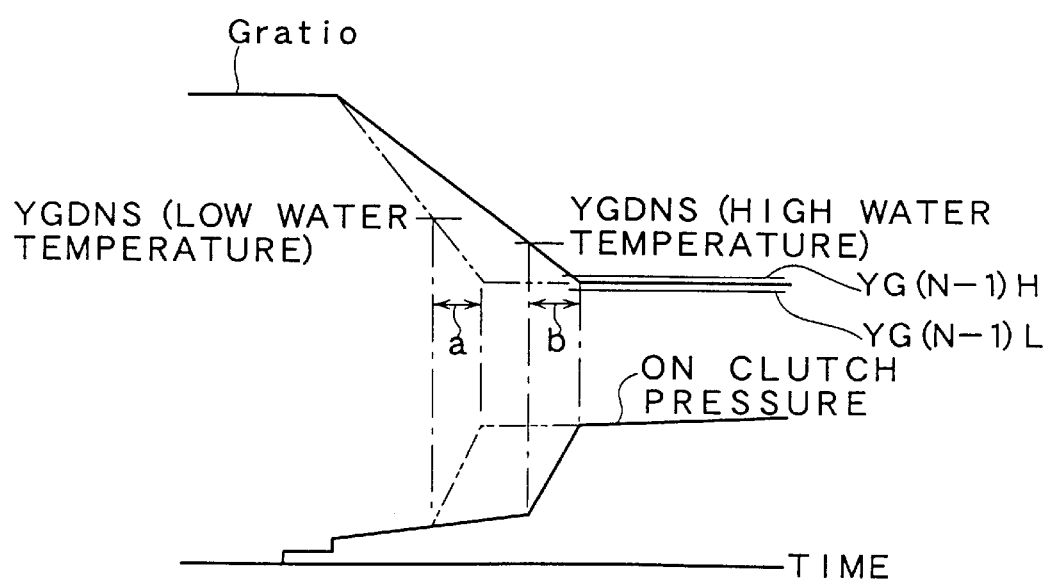

In addition, when the engine temperature is low, the output torque of the engine increases by a fast idle operation and, therefore, the speed of decrease in "Gratio" at the time of downshifting becomes larger than at the time of high engine temperature, as shown in FIG. 13B. Therefore, the following arrangement is made. Namely, by detecting the engine temperature, i.e., the engine cooling water temperature TW, YGDNS is set higher at a low cooling water temperature than at a high cooling water temperature, so that even at the time of low cooling water temperature, the ON clutch pressure is boosted, at the time when "Gratio" has entered the synchronous region, to a predetermined pressure at which no slipping in the hydraulic clutch occurs. The boosting response delay "a" of the ON clutch pressure is constant irrespective of the engine temperature. In this embodiment, however, in order to enable to deal with the difference in the boosting response delay in the ON clutch pressure due to the vehicle speed, YGDNS is computed in step S104' from the map, for example, with the vehicle speed and the cooling water temperature as parameters.

Details of operational processing of QDNOFF in step S108 are shown in FIG. 14. First, in step S108-1, a discrimination is made whether MDN(OFF)=0 or not. Since MDN has been set to "0,0" in the first downshifting control processing, a judgement of "YES" is made in step S108-1. The program thus proceeds to step S108-2, in which an initial value QDNOFFA of the OFF pressure in the initial pressure mode is set to an appropriate value depending on the vehicle speed and the throttle opening. Then, in step S108-3, a setting of MDN(OFF)=1 is made and, in step S108-4, a speed ratio "etr" of the torque converter 2 (rotational speed of input shaft 3/rotational speed of engine) at that time is stored in memory as "etrm". Then, the program proceeds to step S108-5, in which there is computed a boosting correction value QDNOFFZ. This boosting correction value QDNOFFZ varies with a degree of development (or progress) of speed change of the engine rotational speed at the time of start of downshifting, which degree of development being dependent on an increase in the rotational speed of the engine due to slipping in the fluid torque converter 2. The value QDNOFFZ is computed by multiplying a reference (standard) value QDNOFFZO depending on the throttle opening by a speed change developing degree function K which is obtained by a functional operation with "etrm" as a parameter. The function K will be described in detail hereinafter. When QDNOFFFZ has been computed, the program proceeds to step S108-6, in which QDNOFFB which is a value of the OFF pressure in a low pressure holding mode is set to a value which is obtained by adding QDNOFFZ to a reference value QDNOFFBO depending on the throttle opening. Then, in step S108-7, an annealing processing is performed for gradually decreasing QDNOFFB from QDNOFFA down to a value to be set as described above. Thereafter, in step S108-8, QDNOFF is set to QDNOFFB. In this manner, there is started a control in the initial pressure mode in which the OFF pressure is gradually decreased from QDNOFFA.

In the next downshifting control processing, since the setting of MDN(OFF)−1 has already been made in step S108-3 last time, a judgement of "NO" is made in step S108-1. The program thus proceeds to step S108-9 for discriminating as to whether MDN(OFF)=1 or not and a judgement of "YES" is made therein. At this time, the program proceeds to step S108-10, in which a discrimination is made whether "Gratio" has fallen below that lower limit value YG(N)L for judging the engagement of clutch which is set based on the gear ratio of the speed stage established before speed changing. If "Gratio">YG(N)L, a discrimination is made in step S108-11 whether the time of lapse from the start of downshifting (TMST−TM) has reached a predetermined time YTMDN7. While TMST−TM<YTMDN7, the program proceeds to step S108-3 and following steps, and the control in the initial pressure mode is continued. When "Gratio"≦YG(N)L or TMST−TM≧YTMDN7, a setting of MDN(OFF)=2 is made in step S108-12 and the program proceeds to step S108-5 and following steps. A control of the OFF pressure in the low pressure holding mode is started.

In the next downshifting control processing, since setting of MDN(OFF)=2 has already been made last time in step S108-12 last time, a judgement of "NO" is made in step S108-9. The program thus proceeds to step S108-13 for making a judgement as to whether MDN(OFF)=2 or not, and a judgement of "YES" is made therein. At this time, the program proceeds to step S108-14, in which a discrimination is made whether "Gratio" has fallen below a predetermined value YGDNT. If "Gratio">YGDNT, a discrimination is made in step S108-15 whether a time of lapse from the start of downshifting (TMST−TM) has reached a predetermined time YTMDN8. While TMST−TM<YTMDN8, the program proceeds to step S108-12 and following steps and the control in the low pressure holding mode is continued. Then, when "Gratio"≦YGDNT or TMST−TM≧YTMDN8, a setting of MDN(OFF)=3 is made in step S108-16. The program then proceeds to step S108-17, in which a value QDNOFFC of the OFF pressure in the tail mode is set to an appropriate value depending on the throttle opening. Then, in step S108-18, QDNOFF is set to QDNOFFC, and the control is started in the tail mode in which the OFF pressure is held in a lower pressure than in the low pressure holding mode.

In the next downshifting control processing, since the setting of MDN(OFF)=3 has already been made in step S108-16 last time, a judgement of "NO" is made in step S108-13. The program thus proceeds to step S108-19 for making a discrimination as to whether MDN(OFF)=3 or not, and a judgement of "YES" is made therein. At this time, the program proceeds to step S108-20, in which a discrimination is made whether the time of lapse from the start of downshifting (TMST−TM) has reached a predetermined time YTMDN4. If TMST−TM≧YTMDN4, the program proceeds to step S108-21, in which a discrimination is made whether "Gratio" has fallen below YG(N−1)H or not. If TMST−TM<YTMDN4 or "Gratio">G(N−1)H, the program proceeds to step S108-16 and following steps, and the control in the tail mode is continued. Then, when TMST−TM≧YTMDN4 and also when "Gratio"≦YG(N−1)H, the program proceeds to step S108-22, in which the value of TM at that time is set to TMSTC which is used in a time counting processing in the above-described step S131. Then, in step S108-23, a setting of MDN(OFF)=4 is made and also, in step S108-24, the value QDNOFFD of the OFF pressure in the end mode is set to a value which gradually decreases from QDNOFFC. In step S108-25, QDNOFF is set to QDNOFFD, and the control of the OFF pressure in the end mode is performed.

The above-described speed change developing degree function K is obtained as follows. Let a scheduled (or estimated) speed ratio of the fluid torque converter 2 at the time of downshifting completion be a standard (or reference) speed ratio Yetr. Let the rotational speed of the engine to be obtained by Yetr and the rotational speed Nin of the input shaft 3 of the transmission at the time of starting the downshifting be a standard (or reference) rotational speed of the engine NeG(N). And let the rotational speed of the engine at the time of downshifting completion which is obtained by NeG(N) and the speed change ratio YG(N) before starting the downshifting and the speed change ratio YG(N−1) after the completion of the downshifting be a target rotational speed of the engine NeG(N−1). Then, the speed change developing degree function K can be obtained by the following formula as a ratio of the difference between NeG(N) and the actual rotational speed Ne of the engine at the time of starting the downshifting to the difference between NeG(N−1) and NeG(N).

$$K=(Ne-NeG(N))/(NeG(N-1)-NeG(N)) \quad (1)$$

In other words, the speed change developing degree function K denotes a ratio of an increase amount in the rotational speed of the engine due to slipping of the fluid torque converter 2 at the time of starting of downshifting, to the change amount in the rotational speed of the engine when downshifting is carried out while the speed ratio "etr" of the fluid torque converter 2 is held at Yetr.

Here, NeG(N) and NeG(N−1) are respectively expressed as follows.

$$NeG(N) = Nin / Yetr \quad (2)$$

$$NeG(N-1) = NeG(N) \cdot YG(N-1)/YG(N) \quad (3)$$
$$= (Nin \cdot YG(N-1)/(YG(N) \cdot Yetr)$$

Ne can be expressed as $$Ne=Nin/etrm \quad (4)$$

where etrm is an actual etr at the time of starting of downshifting. If rearrangement is made by substituting formulas (2), (3), and (4) into formula (1), the following is obtained.

$$K=\{(Yetr/etrm-1)\}/ \{(YG(N-1)/YG(N)-1)\} \quad (5)$$

When the accelerator pedal is stepped slowly, if the vehicle speed does not change, only the rotational speed of the engine increases due to slipping in the fluid torque converter 2, with the result that rotational speed of the engine sometimes exceeds NeG(N) at the time of starting of downshifting. In such a case, when slipping occurs to the hydraulic clutch on the disengaging side after the starting of downshifting, the rotational speed of the input shaft 3 rapidly increases so as to approach the rotational speed of the engine that has already been increased, and the speed of decrease in "Gratio" becomes large. As a result, while the ON clutch pressure has not risen sufficiently, "Gratio" enters into the synchronous region, and the hydraulic clutch on the engaging side therefore can no longer be engaged at the time of synchronization. Therefore, in the present embodiment, the following arrangement is employed. Namely, the boosting correction value QDNOFFZ is operated (or computed) by using the speed change developing degree function K to be obtained by formula (5) with "etrm" as a parameter, and the value QDNOFFB is added by the amount of QDNOFFZ. The decrease in "Gratio" is thereby restrained by the engaging force of the hydraulic clutch on the disengaging side so that the hydraulic clutch on the engaging side can be sufficiently engaged at the time of synchronization. Since "etr" at the time of completion of speed change varies delicately with the operating conditions of the engine, it is preferable to replace the value of Yetr to be substituted into formula (5) depending on the operating conditions of the engine.

Further, in the present embodiment, if the speed stage designation signal SH is switched (or changed), during downshifting control from G(N) to G(N−1), to a signal to designate a speed stage which is a still lower speed stage G(N−2) to thereby make a setting of FTBD=1, a downshifting completion processing is performed when the control of the ON pressure in the low pressure correction mode has been completed (when the control in a synchronous mode has been completed when a setting of FTBD=1 is made during the control of the ON pressure in the synchronous mode), whereby the downshifting control from G(N−1) to G(N−2) is started. Since the downshifting control from G(N) to G(N−1) is completed in this manner at an early time, the time required for the downshifting from G(N) to G(N−2) is shortened, resulting in an improved drivability.

There is a case where, during downshifting control from G(N) to G(N−1), the speed change designation signal SH is switched or changed to a signal designating G(N) or a case where, during upshifting control from G(N) to G(N+1), the speed change designation signal SH is switched to a signal designating G(N). In such a case, the hydraulic pressure of the hydraulic clutch relating to the speed changing can be controlled with the first and the second solenoid proportional valves $17_1$, $17_2$ even without switching the position of the first and the second shift valves $12_1$, $12_2$ or the changeover valve 13.

For this purpose, the following arrangement is made. Namely, when the speed change designation signal SH is switched to a signal designating G(N) during downshifting control from G(N) to G(N−1), the downshifting control is stopped on the way (or in the course of the control), and a switchover upshifting to switch (or transfer) to an upshifting control from G(N−1) to G(N) is performed. When the speed change designation signal SH is switched to a signal designating G(N) during upshifting control from G(N) to G(N+1), the upshifting control is stopped on the way, and a switchover downshifting to switch to a downshifting control from G(N+1) to G(N) is performed.

Details of switchover upshifting control are shown in FIG. 16. An explanation will now be made with reference to FIG. 15 which schematically shows the changes of the ON pressure, the OFF pressure, and the "Gratio", respectively. First, in step S201, MUP is set to "4,4" and MDN is reset to "0,0". Then, in step S202, TM is set to TMST. Thereafter, in step S203, a discrimination is made whether the time of lapse from the start of upshifting (TMST−TM) has reached a predetermined time YTMUP1. Once TMST−TM≧YTMUP1, the program proceeds to step S204, in which the upshifting completion processing is performed. The contents of this processing are the same as those in step S13 shown in FIG. 7.

If TMST−TM<YTMUP1, the value QUPONB of the ON pressure in the bottom up mode in upshifting is computed in step S205. Then, in step S206, a discrimination is made whether MUP(ON)=4 or not. In the first processing, a judgement of "YES" is made in step S206, and the program proceeds to step S207, in which a discrimination is made whether "Gratio" has exceeded YGUPT or not. If "Gratio"<YGUPT, there is performed in step S208 an annealing processing in which QUPONB is gradually changed from the final value of QDNOFF in the preceding downshifting control to the value of QUPONB that was obtained in step S205. In step S209, QUPON is set to QUPONB and, in step S210, an operational processing of QUPOFF is performed. Then, in step S211, the proportional valve selection processing is performed. The operational processing of QUPOFF is performed in the same manner as in the processing in steps S10-16 through S10-19 in FIG. 9. The proportional valve selection processing is the same as the processing in step S11 in FIG. 7.

Once "Gratio"≧YGUPT, MUP is set to "5,5" in step S212 and, in step S213, TMSTB is set to the value of TM at that time. Then, in step S214, QUPON is set to a value which is obtained by adding QUPONC to QUPONB. Since an initial value of QUPONC is zero, a condition of QUPON= QUPONB occurs, and the control of the ON pressure in the bottom up mode is performed.

In the next processing, since MUP has already been set to "5,5" in step S212 last time, a judgement of "NO" is made in step S206. The program proceeds to step S215 for making a discrimination as to whether MUP(ON)=5 or not, and a judgement of "YES" is made therein. At this time, a discrimination is made in step S216 whether "Gratio" has exceeded YG(N)L or not. While "Gratio"<YG(N)L, the program proceeds to step S212 and following steps, and a control of the ON pressure in the bottom up mode is continued. Once "Gratio"≧YG(N)L, MUP is set to "7,7" in step S217, and the program proceeds to step S218 and following steps. Therefore, in the next processing, a judgement of "NO" is made in step S215, and the program proceeds directly to step S217. In step S218, a processing is made to set QUPONC to a value which is obtained by adding ΔQUPONC to the previous value of QUPONC. Then, in step S219, a discrimination is made whether "Gratio" has fallen within a range between YG(N)L and YG(N)H. If the result of this discrimination is "NO", the program proceeds to step S213 and following steps. In this case, since QUPONC increases by ΔQUPONC by the operation (or computation) in step S218, QUPON to be obtained in step S214 also gradually increases, and a control of the ON pressure in the end mode is performed. If YG(N) L≦"Gratio"≦YG(N)H, i.e., if the hydraulic clutch on the engaging side is in a condition of completion of engagement, a discrimination is made in step S220 whether the time of duration of the condition of completion of engagement (TMSTB−TM) has reached a predetermined time YTMUP6 or not. When TMSTB−TM≧YTMUP6, the program proceeds to step S204, in which the upshifting completion control is performed.

Details of the switchover downshifting are shown in FIG. 18. An explanation will now be made with reference to FIG. 17 which schematically shows the changes in the ON pressure, the OFF pressure, and the "Gratio", respectively. First, in step S301, MUP is reset to "0,0" and MDN is set to "2,2". Then, in step S302, TM is set to TMST and, in step S303, a discrimination is made whether the time of lapse from the starting of downshifting (TMST−TM) has reached a predetermined time YTMDN1. Once TMST−TM≧YTMDN1, the program proceeds to step S304, in which the downshifting completion processing is performed. The contents of this processing are the same as those of step S111 shown in FIG. 12.

If TMST−TM<YTMDN1, a discrimination is made in step S305 whether MDN(ON)=2 or not. In the first processing, a judgement of "YES" is made in step S305, and the program proceeds to step S306, in which a discrimination is made whether "Gratio" has exceeded YGDNS or not. If "Gratio">YGDNS, QDNONB is computed in step S307. In step S308, there is performed an annealing processing in which QDNONB is gradually changed from the final value of QUPOFF in the previous upshifting control to the value of QDNONB that was obtained in step S307. In step S309, QDNON is set to QDNONB and then, in step S310, an operational processing of QDNOFF is performed. Then, in step S311, the proportional valve selection processing is performed. The control of the ON pressure in the low pressure correction mode is thereby performed. The operational processing of QDNOFF is performed in a similar manner to that of step S108-13 and following steps in FIG. 14 in a mode in which the steps of S108-15 and S108-20 are omitted therefrom. The proportional valve selection processing is the same as the processing in step S109 shown in FIG. 12.

Once "Gratio"≦YGDNS, MDN is set to "3,3" in step S312 and in step S313, QDNOC is computed. Then, in step S314, there is performed an annealing processing in which QDNONC is gradually changed from the final value of QDNONB to the value that was obtained in step S312. Then, in step S315, QDNON is set to a value which is obtained by adding QDNOND to QDNONC. Since an initial value of QDOND is zero, a condition of QDNONC=QDNON occurs, and the control of the ON pressure in the synchronous mode is started.

In the next processing, since MDN has already been set to "3,3" in step S312 last time, a judgement of "NO" is made in step S305. The program thus proceeds to step S316 for discriminating whether MDN(ON)=3 or not, and a judgement of "YES" is made therein. At this time, a discrimination is made in step S317 whether "Gratio" has fallen below YG(N)H or not. If "Gratio"≦YG(N)H, the program proceeds to step S318, in which a discrimination is made whether the time of lapse from the time when the condition of "Gratio"≦YG(N)H has been satisfied (TMSTC−TM) has reached a predetermined time YTMDN5. If "Gratio">YG(N)H or TMSTC−TM<YTMDN5, the program proceeds to step S313 and following steps, and the control in the synchronous mode is continued.

Once TMSTC−TM≧YTMDN5, a setting of MDN (ON)=4 is made in step S319. Then, in step S320, QDMONC is computed and in step S321, QDNOND is set to a value which is obtained by adding ΔQDNOND to the previous value of QDNOND. Then, in step S322, a discrimination is made whether "Gratio" lies within a range between YG(N)L and YG(N)H. If the result of this discrimination is "NO", TMSTD is set in step S323 to a value of TM at that time, and the program then proceeds to step S315. In this case, since QDNOND increases by ΔQDNOND by the operation in step S321, the value QDNON to be obtained in step S315 also gradually increases, and the control of the ON pressure in the end mode is performed. If a judgement of "YES" is made in step S322, a discrimination is made in step S324 whether the time of duration of the condition of engagement of the hydraulic clutch on the engaging side (TMSTD−TM) has reached a predetermined time YTMDN6. When TMSTD−TM≧YTMDN6, the program proceeds to step S304, in which the downshifting completion processing is performed.

As described above, in the switchover upshifting control or switchover downshifting control, it is only when a discrimination is made as to whether or not the speed change time has reached YTMUP1, YTMDN1 which serve as a basis for discriminating an abnormality that a discrimination is made based on the time of lapse from the start of speed changing (TMST-TM). This is because the switchover speed changing is started in the midst of the previous speed changing and, therefore, the condition of speed change development can no longer be judged from the time of lapse from the start of speed changing. Consequently, the condition of the speed change development must be judged only from "Gratio". And, once "Gratio" can no longer be accurately detected due to troubles in sensors, or the like, it becomes impossible to adequately control the ON pressure or the OFF pressure depending on the condition of speed change development. As a solution, by using a flag FGFAIL which is set to "1" when "Gratio" can no longer be detected accurately, the switchover speed changing is prohibited when FGFAIL=1. Further, in the forward running ranges such as "D$_4$", "D$_3$", etc., the speed changing is performed according to a speed change map which is set with the vehicle speed and the throttle opening as parameters. Here, the vehicle speed sensor 22 detects the vehicle speed based not on the absolute speed but on the rotational speed of the wheels. Therefore, when tire locking has occurred due to braking on a low-$\mu$ road or the like, the vehicle speed V to be detected by the vehicle speed sensor 22 lowers down to nearly zero while the actual vehicle speed makes little or no change. Downshifting is thus performed according to the speed change map, and upshifting is performed depending on the vehicle speed after the gripping of the tires has recovered. This results in an unnecessary speed changing. In addition, in the condition of manual speed changing in which speed changing of one speed stage at a time is performed by the operation of the lever, downshifting to the first speed stage is automatically performed when the vehicle speed becomes extremely low so that the vehicle can start again in the first speed stage after stopping. Upshifting is then performed by a subsequent lever operation. Therefore, once downshifting to the first speed stage has been performed due to locking of tires, the first speed stage remains to be established even after the tire gripping has been recovered. This will force the driver to perform upshifting to a speed stage that suits the vehicle speed. In order to eliminate this kind of disadvantage, the following arrangement is employed. Namely, when the vehicle speed to be detected by the vehicle speed sensor 22 has suddenly decelerated due to locking of tires, i.e., when the vehicle speed has decreased at a deceleration above a predetermined value, a flag FLOCK which is set to "1" for a predetermined period of time is used to thereby prohibit downshifting when FLOCK=1.

FIG. 19 shows shift selection processing using FGFAIL and FLOCK. In this processing, a discrimination is made first in step S401 as to whether the speed stage G(SH) to be designated by the speed stage designating signal SH is the same as the speed stage G(SHO) that has been designated so far. If G(SH)≠G(SHO), a discrimination is made in step S402 whether G(SH) is of a higher speed stage than G(SHO). If G(SH)>G(SHO), the upshifting flag FUP is set to "1" in step S403. If G(SH)<G(SHO), a discrimination is made in step S404 whether FLOCK=1 or not. If FLOCK=0, FUP is reset to "0" in step S405. Then, a discrimination is made in step S406 as to whether MAT is set to "A,B" or not, i.e., whether the control for speed changing is going on or not. If MAT=A,B, a switchover speed change flag FCS is set to "1" in step S407. If MAT≠A,B, FCS is reset to "0" in step S408. Then, in step S409, a discrimination is made as to whether FCS=1 or not. If FCS=0, a discrimination is made in step S410 whether FUP=1 or not. If FUP=1, the program proceeds to step S411 to perform upshifting control. If FUP=0, the program proceeds to step S412 to perform downshifting control. If FCS=1, a discrimination is made in step S413 whether FGFAIL=1 or not. If FGFAIL=0, a discrimination is made in step S414 whether FUP=1 or not. If FUP=1, a switchover upshifting control is performed in step S415. If FUP=0, a switchover downshifting control is performed in step S416. If FGFAIL=1, the processing is terminated or ended to prohibit the switchover speed changing. When a discrimination of FLOCK=1 is made in step S404, the processing is also directly ended to prohibit downshifting. Since FLOCK is reset to "0" after a predetermined period of time, it is only during the predetermined period of time after the occurrence of locking of tires that the downshifting is prohibited. Thereafter, downshifting is allowed in preparation for stopping of the vehicle.

In the setting processing of FGFAIL, there is used a timer value TMG(N) which is obtained by counting the time during which "Gratio" lies between those lower limit value YG(N)L and upper limit value YG(N)H for judging the engagement of hydraulic clutch which are set based on the gear ratio of the speed stage G(N) that has been established at the time of non-speed changing. TMG(N) is prepared for each of the speed stages. As shown in FIG. 20A, a discrimination is made first in step S1100 as to whether MAT is set to "A,0" or "0,B", i.e., whether it is in a non-speed-change time. If it is in non-speed-change time, a discrimination is made in step S1101 whether "Gratio" falls within a range between the upper and lower limit values YG(N)L, YG(N)H of the first speed stage. If it falls within this range, a timer value TMG(1) for the first speed stage is added in step S1102. If it falls outside the above-described range, TMG(1) is subtracted in step S1103. Then, similar processings are performed in steps S1104, S1105, S1106 for the second speed stage, in steps S1107, S1108, S1109 for the third speed stage, in steps S1110, S1111, S1112 for the fourth speed stage, and in steps S1113, S1114, S1115 for the reverse running stage to thereby perform adding or subtracting processing of timer values TMG(2), TMG(3), TMG(4), and TMG(R) for the second speed stage through fourth speed stage and the reverse running stage. Therefore, each of these timer values TMG(1)–TMG(R) becomes a difference between the accumulated time at which "Gratio" falls within the corresponding range of upper and lower limit values YG(1)L, YG(1)H through YG(R)L, YG(R)H and the accumulated time at which "Gratio" falls outside this range. If the detection of "Gratio" is accurate, the timer value TMG(N) for the speed stage G(N) that has been established right before the speed changing prior to the switchover speed changing will become a large enough value. Therefore, as shown in FIG. 20B, a comparison is made in step S1116 between TMG(N) and a predetermined threshold value YTMG. When TMG(N)>YTMG, setting of FGFAIL=0 is made in step S1117 and, when TMG(N)≦YTMG, setting of FGFAIL=1 is made in step S1118.

As shown in FIG. 21A, there is measured the time t for the vehicle speed V which is detected by the vehicle speed sensor 22 to decrease from a first predetermined vehicle speed YVH (e.g, 40 km/h) which is set relatively high down to a second predetermined vehicle speed YVL (e.g., 10 km/h) which is set relatively low. When this time t has fallen below a predetermined value, FLOCK is set to "1" for a predetermined period of time. This predetermined value is set, for example, such that (YVH−YVL)/t becomes about 1 G (the acceleration of gravity). Details of setting processing of FLOCK are shown in FIG. 21B. First, in step S1001, a discrimination is made whether the vehicle speed V has fallen below YVH. If V≧YVH, the program proceeds to step S1002, in which the remaining time tm of a subtractive timer which is different from the above-described timer for speed change control is set to an initial value of tmst. Then, in step S1003, a resetting of FLOCK=0 is made. If V<YVH, a discrimination is made in step S1004 whether the vehicle speed V has fallen below YVL. If V≧YVL, the program proceeds to step S1003. When V<YVL, the program proceeds to step S1005 for discriminating whether FLOCK=1 or not. If FLOCK=0, a discrimination is made in step S1006 whether the time t required for the vehicle speed V to lower from YVH to YVL (tmst−tm) has fallen below a predetermined time Ytmlock. If tmst−tm≦Ytmlock, a discrimination is made in step S1007 whether tm has become zero (whether a time tmst has elapsed from the condition V<YVH has been satisfied). If tm≠0, a setting of FLOCK=1 is made in step S1008. From the next time, as long as V<VHL, the program proceeds from step S1005 to step S1008 and is held to FLOCK=1 for a predetermined period of time until a condition of tm=0 (tmst−Ytmlock) is satisfied. This predetermined period of time is set a little longer, e.g., for about 10 seconds, than the braking time in case a temporary brake is applied without an intention of parking.

Details of in-gear control are shown in FIG. 23. An explanation will now be made with reference to FIG. 22 which schematically shows the changes in the ON pressure and the "Gratio" at the time of gear engagement (or gear-in). In the in-gear control, a discrimination is made first, in step S501, whether MAT is set to one of "2,0", "4,0", and "6,0". In the first processing, a judgement of "NO" is made in step S501. In step S502, TM is set to TMST and, in step S503, QINGA which is a value of the ON pressure in the response pressure mode is set to an appropriate value depending on the throttle opening. The value QINGA decreases with the lapse of time. Then, in step S504, MAT is set to "2,0" and thereafter, in step S505, QING which is a command value of the ON pressure in the in-gear control is set to QINGA. Then, the program proceeds to step S506, in which the proportional valve selection processing is performed. In this processing, the command value of the output pressure of that one of the first and the second solenoid proportional valves $17_1$, $17_2$ which controls the hydraulic pressure of the hydraulic clutch to be engaged at the time of gearing in is made to be QING, and the command value of the output pressure of the other thereof is made to be atmospheric.

In the next processing, since MAT has already been set to "2,0" in step S504 last time, a judgement of "YES" is made in step S501. The program thus proceeds to step S507, in which a discrimination is made whether or not the time of lapse from the start of gear engagement (TMST−TM) has reached a limit value YTMING1 for judging the presence or absence of abnormality. When TMST−TM≧YTMING1, the program proceeds to step S508, in which an in-gear completion processing is performed. In this processing, MAT is set to "A,0" (at the time of gear-in to the first speed stage, third speed stage, and reverse stage), or to "0,B" (at the time of gear-in to the second speed stage) and also TM is reset to zero. If TMST−TM V<YTMING1, the program proceeds to step S509 for discriminating whether MAT has been set to "2,0" or not, and a judgement of "YES" is made therein. At this time, the program proceeds to step S510, in which a discrimination is made whether the time of lapse from the start of gear-in has reached a predetermined time YTMING2. While TMST−TM<YTMING2, the program proceeds to step 503 and following steps, and a control in the response pressure mode is performed.

Once TMST−TM≧YTMING2, the program proceeds to step S511, and MAT is set to "4,0". Then, in step S512, a discrimination is made whether "Gratio" has exceeded a predetermined value YGINGS or not. When "Gratio"<YGINGS, a flag FING is set to "1" in step S513 and further, in step S514, the value of TM at that time is stored in memory as TMD. Then, in step S515, ΔQINGX is set to a relatively large value. Once the hydraulic clutch begins to be engaged and the condition of "Gratio"≧YGINGS is satisfied, a discrimination is made in step S516 whether FING=1 or not. If FING=0, the program proceeds to step S515. If FING=1, the program proceeds to S517, in which a discrimination is made whether the time required for the condition of "Gratio"≧YGINGS to be satisfied from the start of gear-in (TMST−TMD) has exceeded a predetermined time YTMING3. Then, if TMST−TMD<YTMING3, ΔQINGX is set in step S518 to a relatively small value. If TMST−TMD≧YTMING3, ΔQINGX is set in step S519 to an intermediate value. Once ΔQINGX has been set in this manner, the program proceeds to step S520, in which QINGX is set to a value which is obtained by adding ΔQINGX to the previous value of QINGX. Then, in step S521, the value QINGB of the ON pressure in the addition mode is set to a value which is obtained by adding QINGX to the final value of QINGA. And in step S522, QING is set to QINGB. Since MAT has already been set to "4,0" last time in step S511, a judgement of "NO" is made in step S509. The program proceeds to step S523 for discriminating whether MAT has been set to "4,0" or not, and a judgement of "YES" is made therein. At this time, the program proceeds to step S524, in which a discrimination is made whether "Gratio" has exceeded that lower limit value YG(N)L for judgement of the clutch engagement which is set based on the gear ratio of the speed stage to be established at the time of gear-in. While "Gratio"<YG(N)L, the program proceeds to step S511 and following steps, and the control in the addition mode is performed.

When "Gratio"≧YG(N)L, the program proceeds to step S525, and MAT is set to "6,0". From the next time, a judgement of "NO" is made in step S523, and the program proceeds directly to step S525. Then, the program proceeds to step S526, in which a discrimination is made whether or not "Gratio"≧YG(N)L or not. If "Gratio"<YG(N)L, the value of TM at that time is stored in memory as TMSTE in step S527, and the program then proceeds to step S528. If "Gratio"≧YG(N)L, the program proceeds directly to step S528. In step S528, QINGC is set to a value which is obtained by adding ΔQINGC to the previous value of QINGC. Then, the program proceeds to step S529, in which a discrimination is made whether the time of duration of the condition of "Gratio"≧YG(N)L, i.e., the condition of clutch engagement completion (TMSTE−TM) has reached a predetermined time YTMING4. Then, while TMSTE−TM<YTMING4, the program proceeds to step S530, in which QING is set to a value which is obtained by adding QINGC to the final value of QINGB, and the control of the ON pressure in the end mode is performed. Once TMSTE−TM≧YTMING4, the program proceeds to step S508, and the in-gear completion processing is performed.

According to the above-described control, since ΔQINGX is set to a large value until the condition of "Gratio"≧YGINGS has been attained in an in-gear mode, the boosting speed of the ON pressure becomes large. Thereafter, the boosting speed of the ON pressure becomes small. Therefore, it becomes possible to shorten the time lag at the time of gear-in, and also to prevent the in-gear shocks. In addition, in a condition in which the hydraulic pressure is likely to lower due to a high temperature or the like, it takes time for the hydraulic clutch to start engagement. Under this kind of conditions, if the boosting speed of the ON pressure from the time when the condition of "Gratio"≧YGINGS has been satisfied is made small, it take time for the hydraulic clutch to complete engagement, resulting in a large time lag. In the present embodiment, on the other hand, if it takes time to the start of engagement of the hydraulic clutch, the condition becomes TMST−TMD≧YTMING3, and ΔQINGX is set to an intermediate value. Therefore, the boosting speed of the ON pressure after the condition has become "Gratio"≧YGINGS does not lower so much, with the result that the time lag can be shortened.

If a switching is made to the forward range such as "D$_4$" or the like while the vehicle is running in the reverse range "R", "Gratio" sometimes remains to exceed YGINGS. The reason is as follows. Namely, "Gratio" is obtained by Nout/Nin, and the rotational speed of the output shaft 7 is zero while the vehicle is stopped. If the rotational speed of the output shaft is made to be Nout as it is, "Gratio" will remain to be zero even if Nin lowers as a result of lowering of the rotational speed of the engine at the time of gear-in. As a solution, Nout is set to a value obtained by adding a predetermined level-up value to the rotational speed of the output shaft so that "Gratio" can increase as a result of lowering of Nin. When a switchover is made from "R" range to the forward range, the output shaft 7 is switched from the condition of rotating in the reverse direction to the condition of rotating in the normal direction. The rotational speed of the output shaft once becomes zero in the course of this switching but, since Nout has been levelled up as described above, the condition sometimes remains to be "Gratio"≧YGINGS. At the time of switching from the "R" range to the forward range, it is desired to accelerate the boosting of the ON pressure so that the output shaft 7 can be switched at an early stage to the condition of rotating in the normal direction. In the present embodiment, if the condition remains to be "Gratio"≧YGINGS, FING becomes zero (FING=0). The value ΔQINGX is thus maintained in a large value, whereby the above desire can be met.

Further, if a high speed stage which suits a high vehicle speed is established according to the speed change map when switching is made to the forward range such as "D$_4$" or the like while running at a high speed in the "R" range, the transmission torque to the output shaft 7 becomes small, and it takes time before the direction of rotation of the output shaft 7 is switched. During that time, the hydraulic clutch keeps on slipping, and the durability of the hydraulic clutch is deteriorated. In such a case, the above-described disadvantage can be eliminated by making the following arrangement. Namely, by providing a vehicle speed sensor that can discriminate the direction of rotation of the wheels, or by providing a similar means, a discrimination is made whether the running direction of the vehicle is forward or reverse. If the vehicle is discriminated to be running in the reverse direction in the forward range, a speed stage that is lower than usual is established. FIG. 24 shows the control for that purpose. If a discrimination is made in step S601 that the transmission is in the forward range, a discrimination is made in step S602 whether the vehicle is running in the reverse direction or not. If the result of this discrimination is "NO", an ordinary speed change map is selected as the speed change map in step S603. If the vehicle is discriminated to be running in the reverse direction, a speed change map in which a measure is taken against the reverse running (also called a reverse-running-measure speed change map) is selected as the speed change map. The reverse-running-measure speed change map is set, for example, such that the second speed stage or the first speed stage is established when, in an ordinary speed change map, the third speed stage or the second speed stage will be established, respectively.

If there is provided a means for detecting the forward or reverse running such as a vehicle speed sensor equipped with a function for discriminating the direction of rotation, the cost becomes high. Therefore, without using a special sensor, the selection of the speed change map at the time of switching from the "R" range to the forward range may be made by performing the following control. This control is performed by using a flag FREV which is set to, and maintained at, "1" when the vehicle speed exceeds a predetermined value in the "R" range, and also when the vehicle speed never falls below a predetermined value in the "N" range. Details of this control are shown in FIG. 25A. If a discrimination is made in step S701 that the range is in the forward range, a discrimination is made in step S702 whether FREV=1 or not. If FREV=0, an ordinary speed change map is selected as the speed change map in step S703. If FREV=1, a reverse-running-measure speed change map which is similar to the one mentioned hereinabove is selected in step S704. Then, in step S705, a discrimination is made whether MAT is set to any one of "2,0", "4,0", and "6,0". When the result of this discrimination becomes "NO", i.e., when the in-gear control has been completed, FREV is reset to "0" in step S706 and, from the next time, an ordinary speed change map is selected. Details of the setting processing of FREV are shown in FIG. 25B. When the range is discriminated to be "R" range in step S801, a discrimination is made in step S802 whether the reverse transmission train GR has been established or not. If it has been established, a discrimination is made in step S803 whether or not the vehicle speed V has exceeded a predetermined value YVa (e.g., 10 km/h). If V>YVa, FREV is set to "1" in step S804. Then, if the range is discriminated to be "N" range in step S805, a discrimination is made in step S806 whether the vehicle speed V has fallen below the predetermined value YVa. When V<YVa, FREV is reset to "0" in step S807. According to this arrangement, if FREV is set to "1" by satisfying the condition of V>YVa in "R" range, the condition of FREV=1 is maintained unless the condition becomes V<YVa in "N" range. Therefore, when a switchover is made from "R" range to the forward range via "N" range, it can be discriminated that the vehicle is in the reverse running if FREV=1. It follows that, during the reverse running in the forward range, the reverse-running-measure speed change map is selected, and the switching from the reverse running condition to the forward running condition can be accelerated. As a consequence, the durability of the hydraulic clutches can be improved. If an arrangement is made such that, at the time of switching from the forward range to "R" range, the reverse speed stage GR is established when the vehicle speed has fallen below the predetermined value as described above, it cannot make a hasty conclusion that the vehicle is running in the reverse direction even if V>YVa in "R" range. Therefore, in the present embodiment, the following arrangement has been made to prevent a misjudgment. Namely, a setting of FREV=1 is made only when V>YVa in a condition in which the reverse speed stage GR is established in "R" range, and a setting of FREV=1 is not made when the reverse speed stage GR is not established in the "R" range.

There is a case in which, while the vehicle is running, the electronic control unit (ECU) 20 temporarily fails due to voltage drop and, once the voltage is up or restored, ECU20 is re-started after initialization operation. During the failure of ECU20, the electric power supply to all the solenoid valves is stopped, and the first and the second shift valves 12₁, 12₂ and the changeover valve 13 are switched to the left position, whereby the fourth speed stage is established. Further, even if ECU20 is re-started, parameter values such as the vehicle speed, throttle opening, or the like cannot be read out during the initialization of ECU20. Therefore, the speed stage according to the speed change map cannot be designated. Therefore, conventionally, it is so arranged that a high speed stage is established during the initialization (to prevent the engine overrotation by the establishment of a low speed stage while running at a high speed) and that, after completion of initialization, the speed changing is made to a speed stage according to the speed change map. In this system, however, when ECU20 fails while the vehicle is running at a low speed stage, the rotational speed of the engine lowers due to establishment of a high speed stage until the completion of initialization. Consequently, at the time of downshifting to the low speed stage after completion of initialization, it becomes necessary to largely increase the rotational speed of the engine. Much time is therefore required for downshifting, and the restoration of the driving force is delayed.

As a solution, in the hydraulic oil circuit in the present embodiment, an arrangement is made such that the transmission can be made to a neutral condition even when the manual valve 11 has been switched to the running range such as "R", "D₄", "D₃", "2", "1". Namely, if the first and the second shift valves 12₁, 12₂ and the changeover valve 13 are in the condition of speed changing, and if the output pressures of the first and the second solenoid proportional valves 17₁, 17₂ are in the atmospheric pressure, the hydraulic pressure in any of the hydraulic clutches C1–C4 also becomes atmospheric, with the result that the transmission becomes neutral. Then, when ECU20 has been re-started, a discrimination is made in step S901 whether initialization has been completed or not as shown in FIG. 26. While the initialization is going on, a neutral signal is outputted in step S902, and a flag FINT is set to "1" in step S903. The neutral signal makes the first and the second shift valves 12₁, 12₂ and the changeover valve 13 to a condition of speed changing, e.g., to a speed changing condition of third speed ⇔ fourth speed in which the first and the second shift valves 12₁, 12₂ are in the left position and the changeover valve 13 is in the right position, and also in which the output pressures of both the first and the second solenoid proportional valves 17₁, 17₂ are made to be atmospheric, whereby the transmission becomes the neutral condition. When the initialization has been completed, the program proceeds to step S904, in which a discrimination is made whether FINT=1 or not. Since FINT=1 right after the completion of the initialization, a judgement of "YES" is made in step S904. At this time, the program proceeds to step S905, in which a discrimination is made whether the range is in the running range or not. If it is not in the running range, i.e., if it is in "N" or "P" range, FINT is reset to "0" in step S906, and the program proceeds to step S907 to perform an ordinary control. The processing at the time of starting of ECU20 by switching on the ignition key is performed by this route. When it is in the running range, the program proceeds to step S908, and the in-gear control to establish the speed stage according to the speed change map is started. Then, in step S909, a discrimination is made whether MAT is set to one of "2,0", "4,0" and "6,0". If the result of this discrimination has become "NO", i.e., when the in-gear control has been completed, FINT is reset to "0" in step S910. In this manner, after the completion of the in-gear control, a judgement of "NO" is made in step S904, and an ordinary control is performed. According to this arrangement, even if the fourth speed stage is established by the failure in ECU20 while the vehicle is running in a low speed stage, the neutral condition is maintained, once ECU20 is re-started, until the initialization is completed. Therefore, during that period of time, the rotational speed of the engine increases, and the gear-in to a lower speed stage after the completion of the initialization is made in good response, resulting in an early recovery of the driving force.

It is readily apparent that the above-described control apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated vehicular transmission having a plurality of speed stages to be established by a selective operation of a plurality of hydraulic engaging elements, comprising:

means for controlling stepwise speed changing for downshifting one stage at a time such that during downshifting control to one speed stage which is one stage lower, upon receipt of a downshifting command to another speed stage which is one stage lower than said one speed stage, a start of downshifting control to said another speed stage is delayed until the downshifting control to said one speed stage is completed; and means for switching a control mode which performs a control to accelerate a time of completion of the downshifting control to said one speed stage, said control being made upon receipt of that downshifting command to said another speed stage which is issued during the downshifting control to said one speed stage, so that a downshifting to said one speed stage is completed earlier in a case where the downshifting command to said another speed stage is issued during the downshifting control to said one speed stage than in a case where the downshifting command to said another speed stage is not issued during the downshifting control to said one speed stage.

2. A control apparatus according to claim 1, wherein said means for switching the control mode performs a control of switching, in the course of downshifting control, a first hydraulic pressure in an off-going hydraulic engaging element to be disengaged at a time of downshifting to said one speed stage and a second hydraulic pressure of an on-coming hydraulic engaging element to be engaged at the time of downshifting to said one speed stage, to values existing at a time of completion of downshifting.

3. A control apparatus according to claim 2, further comprising delay means for delaying said control of switching the first and second hydraulic pressures by said means for switching the control mode, until an input and output speed ratio of the transmission changes to a predetermined value between a value before said downshifting control to said one speed stage and a value after said downshifting control.

4. A control apparatus according to any one of claims 1 through 3, further comprising:

means for discriminating deceleration of a vehicle speed to be detected by a vehicle speed sensor; and means for prohibiting downshifting for a predetermined period of time after a discrimination has been made that said deceleration is above a predetermined deceleration value.

5. A control apparatus according to claim 4, wherein said means for discriminating deceleration is constituted to measure a time required for the vehicle speed to lower from a first predetermined vehicle speed which is set relatively high to a second predetermined vehicle speed which is set relatively low, and to discriminate whether the deceleration of the vehicle is above said predetermined deceleration value or not based on this time.

* * * * *